United States Patent
Kravets et al.

(10) Patent No.: US 11,035,260 B1
(45) Date of Patent: Jun. 15, 2021

(54) SYSTEM, APPARATUS, AND METHOD FOR ENERGY CONVERSION

(71) Applicant: Veritask Energy Systems, Inc., Bridgewater, NJ (US)

(72) Inventors: Aleksandr Kravets, Bridgewater, NJ (US); Donald Nelson Grace, Boynton Beach, FL (US)

( * ) Notice: Subject to any disclaimer, the term of this patent is extended or adjusted under 35 U.S.C. 154(b) by 0 days.

(21) Appl. No.: 16/835,588

(22) Filed: Mar. 31, 2020

(51) Int. Cl.
  *F01K 25/10* (2006.01)
  *F01K 17/00* (2006.01)
  *F01K 11/02* (2006.01)

(52) U.S. Cl.
  CPC .......... *F01K 25/103* (2013.01); *F01K 11/02* (2013.01); *F01K 17/00* (2013.01)

(58) Field of Classification Search
  CPC .... F02C 1/08; F02C 1/10; F01K 25/00; F01K 25/08; F01K 25/10; F01K 25/103; F01K 23/10; F01K 23/103; F01K 23/06–068; F01K 11/02; F01K 17/00; F17C 2265/07
  USPC ........................... 60/650, 651, 671, 682–684
  See application file for complete search history.

(56) References Cited

U.S. PATENT DOCUMENTS

| | | | |
|---|---|---|---|
| 5,501,162 A | 3/1996 | Kravets | |
| 6,349,551 B1 | 2/2002 | Jirnov | |
| 7,637,093 B2 | 12/2009 | Rao | |
| 7,647,774 B2 | 1/2010 | Shirk | |

(Continued)

*Primary Examiner* — Mark A Laurenzi
*Assistant Examiner* — Mickey H France
(74) *Attorney, Agent, or Firm* — Stephen L. Keefe LLC

(57) ABSTRACT

A method to generate electrical power and cold energy from any grade of thermal energy (e.g., ambient, solar, waste heat, geothermal, combustion products, nuclear, or any combination thereof) in a cryogenic, closed loop (e.g., regenerative) cycle is disclosed. The method includes supplying a first stream of a pressurized first fluid in a liquid state having low or above cryogenic temperature range to absorb an externally supplied energy in the first heat exchanger disposed upstream of the first prime mover where the first fluid expands in a polytropic process and is submitted for full condensation or for cooling only by the second stream of the pressurized second fluid in a liquid state having cryogenic temperature in the second heat exchanger disposed upstream of the secondary prime mover, through which the preheated second fluid expands polytropically producing a cryogenic two phase flow that is further submitted to a combination of separators and Joule-Thompson valves to achieve maximum liquification of the second fluid. Non-condensed cryogenic vapor is pressurized in a compressor, with discharge been cooled by the first and/or second fluid and further combined with the second fluid before expansion in the second prime mover. Both prime movers may be operably connected to an electric generator or a propulsion system to produce required electrical power or work. The first and the second fluid may be of the same or a different origin selected from the substances like Air, $N_2$, $O_2$, Methane, and $CO_2$, etc. The cold energy of the first and the second fluid can be used for a regenerative liquification of hazardous combustion emissions, $CO_2$, and/or liquified industrial gases by individual species for a subsequent storage and sales.

18 Claims, 16 Drawing Sheets

(56) References Cited

U.S. PATENT DOCUMENTS

| | | | |
|---|---|---|---|
| 8,117,852 B2 | 2/2012 | Mak | |
| 9,000,289 B2 | 4/2015 | Vandermeulen | |
| 9,115,605 B2 | 8/2015 | Held | |
| 9,334,761 B2 | 5/2016 | Langson | |
| 9,341,084 B2 | 5/2016 | Xie | |
| 9,377,247 B2 | 6/2016 | Morgan | |
| 9,385,646 B2 | 7/2016 | Fong | |
| 9,458,762 B2 | 10/2016 | Goloubev | |
| 9,494,078 B2 | 11/2016 | Kaufman | |
| 9,638,068 B2 | 5/2017 | Sinatov | |
| 9,816,403 B2 | 11/2017 | Held | |
| 9,823,000 B2 | 11/2017 | Wang | |
| 9,863,287 B2 | 1/2018 | Kacludis | |
| 9,926,811 B2 | 3/2018 | Giegel | |
| 10,001,025 B2 | 6/2018 | Hui | |
| 10,012,448 B2 | 7/2018 | Laughlin | |
| 10,024,198 B2 | 7/2018 | Held | |
| 10,125,637 B2 | 11/2018 | Machler | |
| 10,550,732 B2 | 2/2020 | Bailey | |
| 10,662,821 B2 | 5/2020 | Castelluci | |
| 10,665,355 B2 | 5/2020 | Kim | |
| 10,670,334 B2 | 6/2020 | De | |
| 10,677,160 B2 | 6/2020 | Sundaram | |
| 10,711,695 B2 | 7/2020 | Allam | |
| 10,738,696 B2 | 8/2020 | Conlon | |
| 10,746,461 B2 | 8/2020 | Allam | |
| 10,830,105 B2 | 11/2020 | Gupta | |
| 10,862,370 B2 | 12/2020 | Kobayashi | |
| 10,876,433 B2 | 12/2020 | Brett | |
| 2014/0103661 A1* | 4/2014 | Kacludis | F01K 9/02 290/54 |
| 2015/0101333 A1* | 4/2015 | Bond | F02K 7/16 60/726 |

\* cited by examiner

SYSTEM, APPARATUS, AND METHOD FOR ENERGY CONVERSION

TECHNICAL FIELD

The present disclosure generally relates to a system, apparatus, and method for energy conversion, and more particularly to a system, apparatus, and method for thermal energy conversion to electrical energy and/or useful mechanical work (e.g. propulsion) and industrial gases and/or emissions liquification including $CO_2$.

BACKGROUND

Rising global temperatures over the past 40 years is often attributed (either in part or in total) to the increase of carbon dioxide ($CO_2$) concentrations in the atmosphere due to the use of fossil fuels by the transportation, industrial, power and residential sectors. Such conclusions have raised a world-wide concern regarding the potential impact of such a trend on climate change and future generations. Currently, political and regulatory pressures to limit $CO_2$ emissions continue to grow, forcing closures of many coal-fired power generating facilities, which among other electrical power generators are responsible for the largest $CO_2$ release per MWh of useful energy produced. Switching from coal to natural gas fired operations, while an option to minimize $CO_2$ emissions, is not believed to be sufficient to change current trends.

The U.S. Energy Information Administration (EIA) projects that power demand in the US will grow steadily at about 1.5% per annum for the next 30 years, reaching a total installed Utility and Industrial generating capacity of 1,475 GW by 2050 (vs. current 1,060 GW, as of 2018). In the U.S., the installed capacities of the coal-fired plants and alternative power sources are currently approximately equal at about 230 GW for each. According to the EIA, in 2018 the share of US electricity generation by alternative sources (solar, wind, geothermal) has reached 8.6%, whereas coal plants delivered 27%+ of total electricity generation at a capacity factor of 54%. EIA projects that by 2050 the installed capacity of the alternative power sources will double (hydro plants, wood and biofuel utilization remains the same) and then it would be able to fulfill about 20% of the US power demand. According to the same projections, nuclear and hydro plants together with wood and biofuel collectively will be able to supply another 20% of electrical power demand. Consequently, the remaining 60% will still be provided by the fossil fuel power sector. According to the EIA, even with the closure of the 50% of the coal plants presently in service and almost doubling the installed capacity of plants operating as Natural Gas-fired Combined Cycle (NGCC) plants from 256 GW to 475 GW, the total annual $CO_2$ generation by all fuel sources will remain at about the current level of 5,000 Million Metric Tons (MMT).

Therefore, prudent strategies to address rising $CO_2$ levels are appropriate to reduce public concerns and to mitigate the effects of human activity on the environment. The primary reason the total $CO_2$ generation will remain at the same level is due to the largest $CO_2$ source in the USA, the transportation sector. The transportation sector is responsible for at least 36% (excluding jet and biofuel) of the total US $CO_2$ generated. While the auto industry is striving toward wide implementation of electrical vehicles, in order to make this effort successful, a significantly larger amount of electricity generation would be involved to meet the associated load demand predicted by the EIA.

In addition, the installed capacity growth of alternative energy sources beyond the EIA's prediction referenced above may be economically challenging. While more expensive than NGCC (per kW installed capacity), they have limited availability and would also involve a wide implementation of expensive Diurnal energy storages. Also, to provide grid reliability and resiliency, a 100% back-up by fossil and nuclear power generation sources would still be appropriate. Such a strategy would result in lower capacity factors for the major power generators. This, together with the anticipated elimination of subsidies for the alternative power generators, would then lead to a substantial increase of the electrical energy price and a negative impact on the overall U.S. economy and other world economies.

Therefore, an economical way to sustain a steady high rate of economic growth while substantially minimizing $CO_2$ generation is to develop new, more economical and higher thermal efficiency fossil and nuclear power generation technologies. Doing so would provide a more efficient use of fuel for the same energy currently generated and consequently a lower volume of $CO_2$ generation.

The rates of $CO_2$ emission by generators powered by fossil fuels depends on the type of fuel used and on thermodynamic/thermal plant efficiency: the higher the thermal efficiency, the lower the fuel consumption, which lowers $CO_2$ and other hazardous emissions or pollutants such as, for example, nitrogen and sulfur oxides, mercury, organic and non-organic volatiles, chlorides, and particulate matter.

Two major centralized electrical power generating technologies are Regenerative Rankine Steam Cycle systems and Gas Turbine Brayton Cycle systems. On average, conventional applications of these cycles currently lose nearly ⅔ of the fuel energy primarily in the form of waste heat. Over the past several decades, with incremental improvements of these cycle systems for advanced utility installations, a net efficiency of fuel energy to power conversion of 40% to 45% has been reached (thereby still wasting about 55% or 60% of the higher heating value of fuel). The combination of Rankine and Brayton cycle systems, or a combined cycle system, minimizes such losses by reaching a fuel efficiency of 55%, which still translates into about 40+% of fuel energy loss in the form of waste heat.

Three major shortcomings of conventional power generation technologies lead to their low thermal efficiencies, and thus to higher $CO_2$ release to atmosphere. These shortcomings in conventional technologies are explained below.

Based on thermodynamic laws, the thermal efficiency of a power cycle system is greater when an inlet temperature ($T_1$) of a working fluid is relatively higher and an its outlet temperature ($T_2$) is relatively lower. Therefore, a first shortcoming of current Rankine steam and Brayton cycle systems, which inhibits further advancement in fuel efficiency, is predicated on the availability of materials capable to withstand high temperatures at high pressure. The significant improvements in material science over the past 20 years has made it possible to accommodate steam temperature of up to 1,300° F. and gas temperatures as high as 2,800° F. for gas turbines. The working fluid temperature ($T_2$) leaving the steam turbine is about 110° F. and about 1,400° F. for advanced gas turbines. Yet, the fuel efficiencies even at such high inlet temperatures are still about 44% and below about 38%, respectively.

In steam Rankine cycle systems for nuclear plants, the inlet temperature ($T_1$) is impacted by inherent nuclear safety design limitations and is thereby unable to generate a high steam superheat. This in turn caps the fuel efficiencies of these applications at about 33%. Therefore, about ⅔ of the fuel energy is lost as waste heat through the main steam condenser and from the condenser to the cooling towers. Although nuclear plants are able to substantially offset $CO_2$ generation by the power sector, their high capital and maintenance costs are still economically challenged. For example, the capital cost of a nuclear plant is more costly than the same size NGCC by an order of magnitude. EIA's predictions for 2050 indicate a decline of installed nuclear plant generating capacity. Accordingly, the available improvements using conventional techniques in this area are incremental improvements, as opposed to significant improvements.

A second major shortcoming of conventional technology relates to the loss of useful work or energy associated with a pressurization of a working fluid. For gas or Brayton cycle systems, this is typically a straightforward loss of work in a compressor. This substantial loss of work, which is a parasitic irreversible loss, equates to about 80% (for a low-pressure aeroderivative gas turbine) and up to 135% (for higher pressure gas turbines) in relation to the net available work produced by the cycle system. That is, this compression work can be almost equal to or greater than the net available work that a gas cycle system generates.

For a Steam Rankine cycle system utilized in either a fossil fuel or nuclear power plant, the work used to pressurize working fluid (water/condensate) is much less compared to a Brayton cycle system. The loss of fuel energy in a Steam Rankine cycle system typically comprises a thermal energy loss in a condenser while latent heat of the water is removed. The latent heat is given up to convert steam back to a liquid state to provide a "critical minimization" of the pressurization of the working fluid to thousands of psia.

This loss to a steam condenser also depends on a selection of working fluid for Rankine cycle systems. For example in a typical high efficiency supercritical steam cycle system, the energy (enthalpy) in 1,105° F. steam that enters a turbine at a pressure of 4,200 psig is 1,481 BTU/lb, while the energy in the exhaust steam leaving the steam turbine is 1,014 Btu/lb. Thus only 467 BTU/lb of steam energy is available to produce useful mechanical work, while more than 1,000 Btu/lb per pound of steam must be rejected via the steam condenser to the atmosphere through a cooling tower or into a water body such as a river or lake. For conventional systems, this is an unavoidable, irreversible loss that determines fuel utilization efficiency. In conventional technologies, these irreversible losses are minimized with the help of regenerative working fluid preheating prior to its evaporation in a boiler and through steam reheat between the high and intermediate pressure stages in a steam turbine. Therefore, selection of working fluids that have lower latent heat will benefit thermal efficiency of Rankine cycle systems.

A third shortcoming of conventional fossil power generating technologies is the inability to utilize the total energy of the hydrocarbon fuels. When fuels are burned, they generate significant quantity of water vapor (the quantity of a water vapor produced primarily depends on the hydrogen content, and presence of moisture in a fuel), which then exist as a part of a mixture of non-condensable combustion gases, where their energy is lost in the exhaust stack. Conventional power and fuel utilization technologies typically ignore this significant fuel loss (e.g., each pound of water vapor in flue gas contains 970 Btu of the latent heat), because it involves extremely large and highly expensive heat exchangers and subsequent treatment of resultant acidic condensate. Moreover, when this heat is recovered in the form of a low temperature stream, it is difficult to find a use for it within conventional power cycle arrangements. This situation typically applies to all fossil power generating technologies and most combustion equipment today, thus resulting in under-utilizing energy liberated by the source fuel. For instance, the latent energy of the water vapor in the combustion products of natural gas equates to 10% of its Higher Heating Value (HHV). This alone translates to 10% greater $CO_2$ emissions than if it were efficiently converted into useful electrical energy. For fuels with a relatively high inherent moisture content, or for wet fuels such as coal or wood, the energy loss with latent heat is even greater, while $CO_2$ emissions are further worsened due to high carbon content and relatively larger quantities of fuel to allow production of the same useful heat input into the process.

Summarizing the effect of the above three shortcomings of conventional technologies, the improvements available based on conventional technologies are incremental improvements as opposed to significant improvements of thermal fuel efficiencies in conventional fossil and nuclear power generating technologies. Accordingly, incremental improvements based on conventional technologies do not address public concerns regarding climate change and public pressure to minimize $CO_2$ emissions created by the electric power sector.

Additional disadvantages associated with the use of fossil fuels include the parasitic loads associated with the removal of pollutants that are harmful to human health such as, for example, Nitrogen and Sulfur Oxides, mercury, and chlorides. According to US annual statistics (e.g., forms EIA-860, EIA-923), Selective Catalytic Reduction of NOx (SCR) is responsible on average for 0.6% of net plant efficiency reduction. Selective Non-Catalytic Reduction of NOx (SNCR) reduces net efficiency by about 0.8%. Application of Dry or Wet systems for SOx control typically reaches 2% plant efficiency loss. Collectively these emissions control systems double the power use required to run in-plant equipment, from about 3% to about 6% or more after the environmental systems are installed.

Recently promoted techniques for $CO_2$ emissions suppression, such as so-called Carbon Capture and Sequestration (CCS), are the relatively highest parasitic loads that are incurred with respect to emissions control. As recent DOE studies suggest, the least parasitic CCS system (e.g., Front-end 100% Oxy-Firing) leads to a net plant efficiency drop of almost 10 percentage points. This loss is comparable to efficiency losses of combustion products to stacks of advanced steam power generating systems.

The alternative back-end CCS technology based on aqueous ammonia adds parasitic losses that are almost ten times greater than typical combined parasitic power losses associated with NOx and other pollutants control (such as those discussed above). Therefore, the parasitic losses associated with this CCS technology are comparable to steam plant thermal loss to a condenser (in Rankine cycle systems) or the working fluid compression losses in Brayton cycle systems. For such technology, the operating costs (excluding sequestration costs) are about USD $25 per ton of carbon $CO_2$ captured, and if applied would translate into trillions of dollars for US rate payers such as consumers within the next 20 yrs.

The above-described parasitic losses in combination with large capital costs for NOx, SOx, and mercury emissions controls often exceed 40% of fossil power plant base capital costs (prior to pollutant control technologies installation). Installation of effective CCS technology such as 100% Oxy-firing almost doubles the base cost of each new natural gas-fired steam or combined cycle power plant, according to DOE estimates.

The protection of the environment from hazardous pollutants is also a consideration, and related increase of fuel consumption per MWh generated is tolerable and is on average 3%. Application of CCS systems reaches a "critical point" when further extensive expansion of a chain of technologies for emissions control practically doubles power plants' capital and operating costs. The chain of these technologies, though designed to protect the environment, constitute the major cause of an increased fuel consumption of up to 15%, and thus result in a relatively larger volume of $CO_2$ per MWh of electricity generated.

The Clean Air Act (as of Aug. 3, 2015, Section 111) established an EPA directive for the acceptable specific limits of the $CO_2$ emissions per MWh of gross power generation. The imposed $CO_2$ limits per one MWh of generation were 1,000 lbs/MWh for natural-gas-fired units and 1,400 Lbs/MWh for coal-fired units. Aside from the natural gas-fired combined cycle, these target $CO_2$ limits are considered unobtainable (operating companies do not consider present CCS technologies as a realistic option) given the current level of development of these technologies. Therefore, these limits are presently relaxed.

To illustrate the challenges associated with the limits set by CAA for the envelope of current fossil fuel technologies, the below example is provided. The recently commissioned ultra-super-critical coal-fired plant at Rheinhafen plant Unit 8, Germany has reportedly achieved net thermal efficiency of 47.5% (apparently in reference to the lower heating value of coal) and has a specific $CO_2$ rate of 740 g/kWh or 1,630 lbs/MWh. For the estimated gross heat rate, the correspondent rate of $CO_2$ per MWh is 1540 Lbs, which is about 10% greater than 1,400 Lbs/MWh as established by CAA in 2015.

Besides $CO_2$, another greenhouse gas, water vapor, is generated in relatively large quantities by the fossil energy sector. According to environmental scientists, water vapor generation is the largest contributor to the Earth's greenhouse effect. Environmentalists believe that water vapor does not control the Earth's temperature, but instead its concentration in air is controlled by the global temperature due to effects of non-condensable greenhouse gases such as $CO_2$, methane, and other gases. Such views are correct with respect to water vapor generated from the surface of water bodies such as oceans, seas, and rivers. However, in addition to these natural sources, fossil power plants are responsible for a tremendous discharge of water vapor into the atmosphere, which are greater than the quantities of $CO_2$ they generate. Therefore, if air in the proximity of a plant is not saturated (relative humidity is below 100%), the discharged water vapor will stay in the air and will produce a relatively larger intensity greenhouse effect on a "local" level, especially when local $CO_2$ concentrations are also elevated.

Further, the quantity of water vapor emitted through stack and wet cooling towers by modern supercritical steam power plants having 40% fuel efficiency and burning either coal or natural gas as well as natural gas combined cycles generate between 1,300 lbs and 1,900 lbs of water vapor per MWh produced. Less efficient sub-critical steam plants emit 10% to 15% more than the 1,900 lbs/MWh level corresponding to a coal-fired plant with a wet desulfurization process application and natural gas-fired steam power plants (with wet cooling towers in both cases).

The above water vapor rates generated by fossil plants are primarily a result of combustion of hydrocarbon fuels such as for plants burning natural gas in which 50% or more of water vapor generated per MWh is due to combustion. The balance of water vapor constitutes water consumption from available water resources. Presently the U.S. power sector alone consumes about 40% of the U.S. fresh water supply. Minimization of water used by power plants is already a focus of EPA and DOE. Attention to this area is appropriate based on its potential impact on global temperature increase due to air humidification by power plant operation.

The disadvantages of the current centralized power supply discussed above has led and apparently continues to lead to the substantial increase in capital and operational costs of fossil power plants. In attempting to make fossil-fueled power plants environmentally acceptable, while applying an extensive approach consisting of a chain of processes for individual pollutant control such as those that are currently being considered for future use (e.g. CSS), the fossil power sector is in an economically challenging position. However, the fossil power sector currently is and will continue to be a backbone of power supply in the U.S. and other nations until at least 2070 and possibly beyond. According to ETA's projections for 2050, fossil power will grow substantially and is expected to supply 60% of U.S. energy needs. Therefore, if more economic solutions are not found, the application of expensive conventional technologies may lead to economic stagnation for the next 30 years.

Wide implementation of intermittent alternative power sources such as solar and wind have substantially changed the operation of fossil power plants, including both based load and back-up plants. This involves the plants' ability to respond to sudden load demand changes. Currently, the highest efficiency centralized fossil power plants are designed to handle base power loads and can sustain moderate load changes.

To address the flexibility appropriate to follow large load variations, utility companies typically utilize installation of large energy storages or back-up gensets, while the utilized prime movers are typically either gas turbines or large diesel engines. In parallel with the development of the distributed and microgrid electrical systems including alternative power generation techniques and back-up gensets with prime movers such as reciprocating internal combustion engines (RICE), diesel engines and gas turbines (GT) are finding a fast-growing demand firing primarily natural gas. In addition, many alternative energy producers and also industrial and commercial operators desiring to reduce their dependency on grid availability have switched to a combined heat and power generation and/or utilize waste-heat to power systems. Such systems may serve as a main power source for hospitals, commercial or residential buildings, data centers and/or may serve to provide reliable back-up power.

Yet, the electrical efficiency of such systems such as for gas turbines and RICE in the capacity range of up to 10 MWh typically involve relatively higher fuel consumption than base load units or NGCC. Therefore, the specific $CO_2$ rates per MWh generation of such systems are also relatively high, ranging from 1,300 lbs to 1,400 lbs when firing natural gas. For the same fuel, larger gas turbines (above 40 MW) and diesel generators (of any capacity) have specific $CO_2$ rates below 1,000 lbs/MWh (the EPA cap for a stationary natural gas-fired power plants), ranging from 830 lbs to 980 lbs due to their relatively higher thermal efficiencies. However, this is still more than an average NGCC generates without $CO_2$ sequestration.

To reduce overall $CO_2$ generation and to minimize the burden on the centralized power plants, the prime movers described above are often configured for a Combined Heat and Power (CHP) cogeneration to supply both electrical power and to satisfy thermal and cooling loads of nearby facilities and buildings. In such applications, besides offsetting the power generation by the base load power plants, these prime movers also minimize fuel consumption otherwise used for heating and air conditioning utilizing waste heat contained by combustion products exiting said prime movers. CHP systems are capable of reaching 80% to 85% overall thermal efficiency during the peak of winter heating or summer cooling loads. Yet on average, CHP systems have annual thermal efficiencies rarely reaching 65%. EIA projects that by 2050 the installed capacity of CHP plants will reach 50 GW. However, since the typical electrical efficiency of the CHP systems is lower than the average efficiency of a centralized power plant, the resultant $CO_2$ reduction is either small or negligible.

The reliance of conventional technologies on external seasonal heating and cooling load will involve either use of cooling towers or a second energy sink to provide steady power generation throughout the seasons. Therefore, the annual average efficiency of conventional systems will be significantly lower (due to losses in the cooling tower and other energy sink components).

U.S. Pat. No. 9,458,672 discloses an attempt to improve upon the above shortcomings in the prior art. U.S. Pat. No. 9,458,672 describes energy storage capabilities in an application of an air separation unit used for the oxy-fired or oxygen-enriched combustion in a fossil power plant. An air separation unit stores both oxygen and nitrogen during off-peak power demand. To minimize power consumption during peak operation, an excess of low temperature and relatively high-pressure nitrogen is used to generate electrical power in an expander type genset. The nitrogen is preheated to about 75° C. by utilizing the waste heat generated by the air compression before it enters the air separation unit.

The solution proposed by U.S. Pat. No. 9,458,672 will only help to offset a portion of power losses in similar installations. However, because parasitic energy loss with 100% oxy-fired combustion of typical power plants reaches about 15% of net power generation, still higher fuel consumption will be involved to produce the same power compare to plants without air separation units. Accordingly, the proposed solution of U.S. Pat. No. 9,458,672 does not overcome the above-described disadvantages of conventional technologies.

The exemplary disclosed system, apparatus, and method are directed to overcoming one or more of the shortcomings set forth above and/or other deficiencies in existing technology.

SUMMARY OF THE DISCLOSURE

In one exemplary aspect, the present disclosure is directed to method. The method includes providing a first stream of a first liquefied gas to a power generation system including a first prime mover and a first heat exchanger disposed upstream of the first prime mover in the power generation system, providing a second stream of a second liquefied gas in a cryogenic state to a cryogenic regenerative system including a second prime mover, which is operably connected to the first prime mover, and a second heat exchanger disposed upstream of the second prime mover in the cryogenic regenerative system, pressurizing the first stream of the liquefied gas to a supercritical pressure of the first liquefied gas upstream of the first heat exchanger in the power generation system, and expanding the first stream of the first supercritical liquefied gas through the first prime mover to a sub-critical pressure of the first stream fluidly connected to the second heat exchanger. The method also includes pressurizing the second stream to a first near critical pressure of the second liquefied gas in the cryogenic state upstream of the second heat exchanger, transferring energy from the first stream to the second stream via the second heat exchanger upstream of the second prime mover, increasing the second stream pressure to a second, supercritical pressure upstream of the second prime mover in the cryogenic regenerative system, expanding the supercritical pressurized second stream of the second cryogenic liquefied gas through the second prime mover and transferring the second stream at a cryogenic temperature to a storage or reservoir in the cryogenic regenerative system, and pressurizing a residual vapor (e.g. in a gas phase) of the first or the second liquefied gas collected within the power generation system and the cryogenic regenerative system in a multi-stage compression process to at least the first pressure of the second stream of the liquefied gas and transferring thusly pressurized vapor upstream of the second prime mover, and transferring a thermal energy of the compression from the pressurized residual vapor to the first stream of the first liquefied gas at the supercritical pressure in a third heat exchangers disposed upstream of the first heat exchanger.

In another exemplary aspect, the present disclosure is directed to a system. The system includes a power generation system including a first prime mover connected to an electrical generator, a first heat exchanger disposed upstream of the first prime mover, the first heat exchanger thermally connected to a heating source generated by combustion or industrial processes, or a circulating condenser water from a fossil or nuclear plant, a solar energy either regular or concentrated, or a geothermal source, and a first pressurized transfer assembly fluidly connecting the first prime mover and the first heat exchanger. The system also includes a cryogenic regenerative system including a second prime mover operably connected to the first prime mover and the electrical generator, a second heat exchanger disposed upstream of the second prime mover, a second pressurized transfer assembly fluidly connecting the second prime mover and the second heat exchanger, a tank or a reservoir of the liquified gaseous media fluidly connected to at least the second pressurized transfer assemblies. The system also includes a cryogenic working fluid disposed in the reservoir and the first and second pressurized transfer assemblies, a multi-stage compressor fluidly connected on the suction side to the vent line of the tank or a reservoir and the end seals of the primary and secondary prime movers and the discharge side fluidly connected to the line upstream of the second prime mover; and a third heat exchanger in thermal communication with the first stream of the liquified gas stream line and the intercooling and discharge lines of the multi-stage compressor. The second heat exchanger of the cryogenic regenerative assembly is thermally connected to the first pressurized transfer assembly at a location that is downstream of the first prime mover and upstream of the first heat exchanger.

DETAILED DESCRIPTION AND INDUSTRIAL APPLICABILITY

Figure 1:
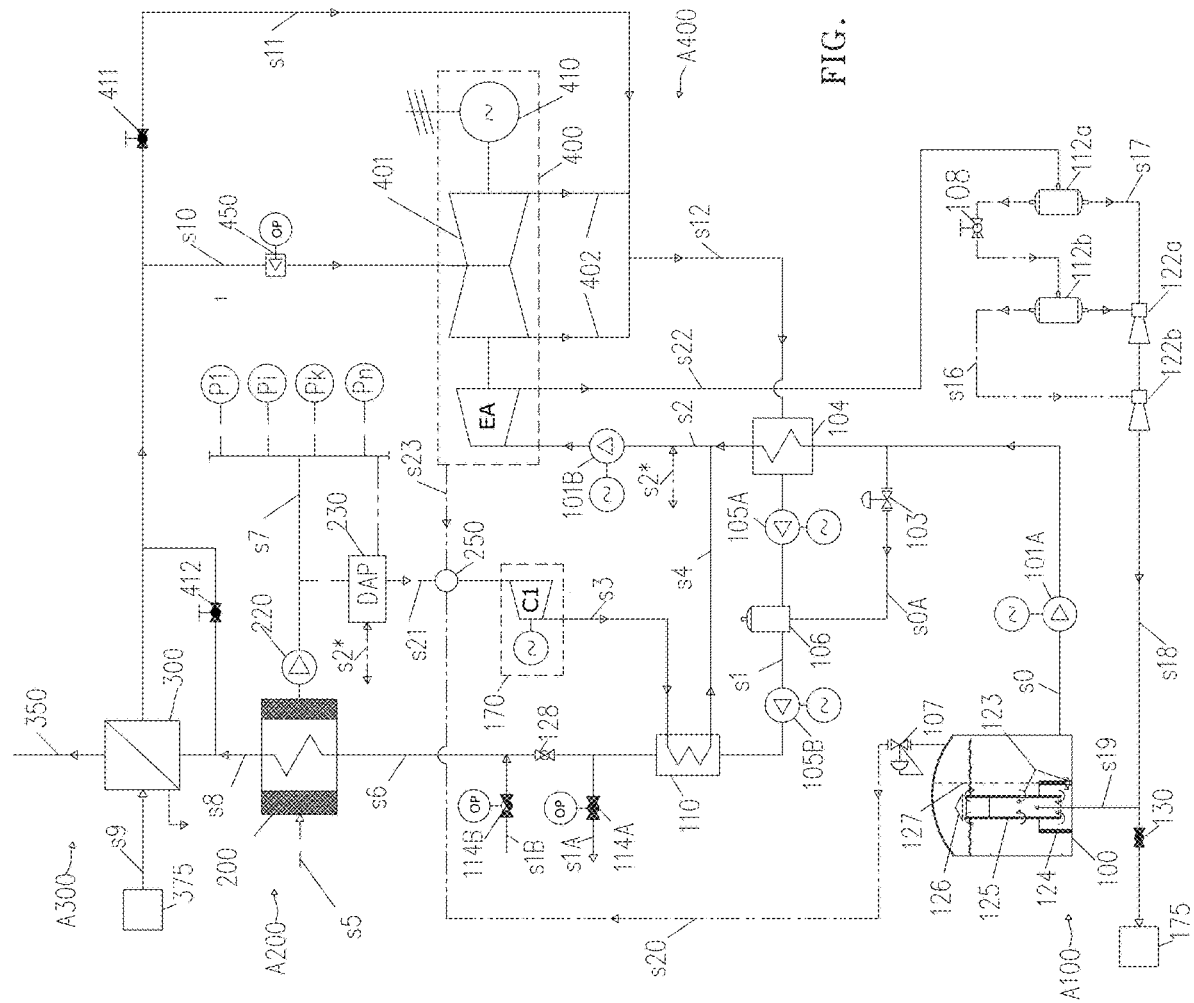
FIG. 1 illustrates a schematic view of at least some exemplary embodiments of the present disclosure (e.g., an exemplary system of a Cryogenic Regenerative Power Cycle)

In at least some exemplary embodiments, the present disclosure is directed to a cryogenic, closed-loop power cycle system. The exemplary disclosed system, apparatus, and method is a cryogenic, closed-loop regenerative gas power cycle system that may serve as a prime mover for propulsion and/or electrical power generation, and also as a concurrent heat and cold energy supply. The exemplary disclosed system, apparatus, and method is a cryogenic regenerative power generation cycle system. There supercritical working fluid after expansion (polytropic cooling) in a prime mover will perform a useful work and then may be condensed by an internal heat-sink produced by the excess of a cryogenic fluid that may be used in the system as may be appropriate in view of process conditions. The largely liquified working fluid is then pressurized to repeat the power generation cycle which will substantially minimize parasitic compression losses in a typical cryogenic liquification systems and/or Brayton gas power generation processes and in such way will increase efficiency of thermal energy conversion to power. The exemplary thermal energy conversion to power may be derived from any suitable combination of energy sources such as, for example, fossil or man-made fuels or municipal waste, waste heat (e.g., flue gas, including its latent heat, and condenser circulating water in a steam cycle), and/or ambient energy such as solar, ambient air, and geothermal energy.

In at least some exemplary embodiments, in addition to an increase of electrical efficiency that leads to proportional emissions and $CO_2$ reduction, the exemplary disclosed system, apparatus, and method may provide suitable power and cold energy to liquify most of the hazardous emissions and $CO_2$ of propulsion or power generation, thereby achieving a substantially zero-emissions operation in applications deriving their thermal energy input from fossil and manmade fuels and municipal waste incineration. For example, the exemplary disclosed system, apparatus, and method may reclaim pollutants primarily in a liquid state as valuable commodities of a technical grade purity. Alternatively, the exemplary disclosed system, apparatus, and method may be used for industrial gas liquification with no external (e.g. grid) power supply or consumption.

In at least some exemplary embodiments, the exemplary disclosed system, apparatus, and method may be a thermodynamic power cycle system utilizing a gaseous working fluid such as, for example, Air, Nitrogen, Oxygen, $CO_2$, and/or methane in both sub- and super-critical states while integrated with a cryogenic liquification process. The exemplary disclosed system, apparatus, and method as the closed regenerative power cycle will produce a significant mechanical work by conversion of any thermal source energy in the temperature range from minus 100° F. to plus 800° F.

The exemplary disclosed system, apparatus, and method may be used in transportation applications to propel large vessels (e.g., ships and trains) and/or for various power generation applications in both stand-alone electric power generation and/or a combined power, heat, and cold energy generation to satisfy both internal loads (e.g. electrical generator cooling HVAC loads, compressed air supply, hazardous emissions liquification) and external loads (e.g. grid demand, residential and commercial facilities use of power, heating and air conditioning loads, and/or industrial gases liquification and separation). The exemplary disclosed system, apparatus, and method may regenerate cold energy and/or power to provide an adequate internal heat-sink to substantially or completely condense or liquify working fluid thus regenerating the mass of working fluid in a liquid state. This condensing or liquifying will substantially minimize scope of equipment involved in power plant construction and therefore capital and operating costs based on using the liquified gaseous working fluid compression The exemplary disclosed system will avoid typical Rankine cycle heat losses to a condenser. The heat of condensation will be absorbed (regenerated) by an isobaric preheating of a pressurized cryogenic working fluid supplied for power generation purposes. In so doing, the useful power output will be significantly increased.

Thermal energy input supplied by either ambient sources (e.g., solar, ambient air, and/or geothermal) may be utilized, for example in combination with energy released by any suitable organic fuel (e.g. fossil, manmade, or municipal waste) and/or energy contained in any grade of a waste heat. The share of an ambient energy used in combination with fossil fuel or waste heat input will reduce fuel consumption and $CO_2$ release to atmosphere per MWh of power generated.

The exemplary disclosed system, apparatus, and method will reduce all regulated environmental emissions in a direct proportion to the improved cycle fuel efficiency. In addition, said emissions may be also suppressed in a single process of a regenerative cryogenic emissions removal/condensation by individual species in the form of valuable liquid by-products, which will achieve substantially zero-emissions performance. The sale of thusly liquefied byproducts will also increase a power plant profitability.

The exemplary disclosed system, apparatus, and method may use pressurization of a largely liquified working fluid that may reach several thousands of PSIA and subsequently heating the said working fluid at a sub- or supercritical pressures to avoid irreversible losses to a condenser and/or minimizing gaseous working fluid pressurization thus substantially improving efficiency of fuel utilization as compared to advanced Rankine and Brayton cycles. The exemplary disclosed system, apparatus, and method coupled with a cryogenic source for gaseous working fluid liquification and the use of cryogenic working fluid liquification will allow to approach a liquification yield Y of 100% (where $Y=\dot{m}^f/\dot{m}=1.0$, and where $\dot{m}_f$, $\dot{m}^*$—are respectively a liquefied mass fraction of the working fluid after completion of the mechanical work and the mass of working fluid supplied for mechanical work generation).

In at least some exemplary embodiments, the exemplary disclosed system, apparatus, and method will involve a partial initial liquified working media presence in a storage prior to a power generation process starting. Within power generation process a regeneration of the liquid working fluid will be possible to at least maintain its inventory to compensate unavoidable system leakages by generating working fluid surplus from the appropriate sources. This may be accomplished by means of absorbing thermal energy of the said sources by preheating a portion of the working fluid before entering a prime mover. The cooled source fluid may merge a dedicated cold portion of working fluid of the exemplary system and then performs mechanical work in a separate, auxiliary prime mover (e.g., an expander), that allows to bring the temperature of the merged flows to a low, near-cryogenic temperature, thus minimizing use of cold energy from storage associated with condensation of the exhausted working thus generating a surplus of working fluid inventory in the storage.

In at least some exemplary embodiments, the exemplary disclosed system, apparatus, and method may provide for absorption of thermal energy by a working fluid from the exemplary sources described for example herein (e.g. air) having temperatures of about minus 100° F. and plus 800° F. and correspondingly pressurized to about 1500 psia and 7000 psia (based on currently available equipment), will reach the working fluid exhaust temperatures of approximately minus 300° F. and minus 80° F. respectively. Thus, less energy will be used to achieve 100% liquification based on exchanging residual working fluid energy with the cold energy of a cryogenic working fluid liquid supplied from a liquified gas storage of a power generation plant by realizing a regenerative heating and liquid working fluid regeneration processes. Accordingly, the exemplary disclosed system, apparatus, and method may achieve substantially 100% liquification on a continuous basis (e.g., achieve a closed loop power gas cycle while producing work/power substantially greater than the work used to pressurize the working fluids). This way the exemplary disclosed system, apparatus, and method will also provide for continuous, stand-alone operation that may include compensating/regeneration for working fluid losses during regular operation and idling.

The exemplary disclosed system, apparatus, and method may account for differences of working fluid thermodynamic properties in the super- and sub-critical states (e.g., at cryogenic and low temperatures at the discharge of the expanders). By exploiting working fluids higher thermal capacities near critical pressure, the quantity of the working fluid from the storage can be minimized to achieve a desired 100% liquification of the exhausted working fluid thus minimizing a parasitic pressurization loss.

The exemplary disclosed system, apparatus, and method may account for a presence of a relatively small fraction of working fluid in an undesirable gas phase at low temperatures near or within the cryogenic range (i.e. below minus 150° C. or minus-238° F.). Such presence results from working fluid leakages from end-seal of prime movers (e.g. expander, reactive turbine, etc.) and constant evaporation of the working fluid from its storage. This stream of a cryogenic or near-cryogenic gaseous working fluid when recovered will allow to maintain a higher efficiency of the disclosed power generation method and the working fluid inventory in a working fluid storage. The recompression of such low temperature gaseous working fluid streams in a multi-stage compressor of any kind with an interstage cooling by transferring compression heat to a low temperature working fluid prior to its admission to a prime mover will provide a supplement energy to the working fluid stream. In such way typical parasitic intercooling losses of the working fluid pressurization will be converted into a useful energy to be realized in the proposed power generation method. The pressurization of the non-condensed working fluid presents the major parasitic losses of the disclosed power generation method. However, due to essentially lower temperatures and a small fraction of the non-condensed working fluid to be pressurized vs. total quantity of working fluid used by the disclosed power generation process the said losses will be considerably smaller than pressurization losses of the working fluid associated with advanced Brayton gas cycle or advanced gas liquification process such as Claude process.

FIG. 1 illustrates an exemplary embodiment of the exemplary disclosed system (e.g., a cryogenic regenerative power cycle system). The exemplary disclosed method of power generation may utilize working fluids such as air, Nitrogen, Oxygen, $CO_2$, methane, and/or any other suitable gaseous media predominantly in a or liquid or supercritical state, whereas thermal energy used to realize the exemplary disclosed Cryogenic Regenerative Power Cycle (CRPC) system is applied to a working fluid indirectly (e.g. through a solid boundaries or heat transfer surface). The exemplary disclosed system may include any suitable subsystem such as a Cryogenic Regenerative System A100, an ambient regenerative heating and working fluid make-up system A200, a High Thermal Energy absorption system A300, and a power generation (e.g., prime mover and electrical generator) system A400.

The exemplary disclosed Cryogenic Regenerative Cycle may include at least one storage 100. Storage 100 may be any suitable storage assembly for storing cryogenic liquid working fluid (e.g., air, Nitrogen, Oxygen, $CO_2$, methane, and/or any other suitable cryogenic gas or liquid) such as a cryogenic liquid containers (e.g., liquid cylinders such as multi-walled vessels such as double-walled pressurized vessels). Cryogenic liquid working fluid stored in storage 100 may be pressurized to a different pressures to concurrently serve two purposes, whereas one is to generate power by converting working fluid thermal and potential energy into mechanical energy in the prime mover 401 and Auxiliary mover (EA) and the second one is to serve as a heat sink to remove residual heat from a working fluid streams s12 and s22 after they complete their expansion (polytropic cooling) in a prime mover 401 and Auxiliary Mover (EA) of power generation system A400. Prime movers 401 and EA may be mechanically connected between themselves and an electrical generator 410 of power generation system 400 (e.g., a genset) or directly to a propulsion system.

Prime mover 401 and Auxiliary mover EA may be interconnected by their output shafts and may be any suitable device to convert a working fluid thermal and potential energy (enthalpy) into mechanical work preferably in the form of the rotational motion applied to the outlet shaft of said device that may be mechanically coupled to a rotary electrical generator and/or propulsion system. Prime movers 401 and EA may be for example an expander or any type of reaction turbine (including Tesla turbine), single or a multi-cylinder piston driven machine or any combination thereof. In at least some exemplary embodiments, prime movers 401 and EA may be a combination of the high-pressure reaction turbine and an expander for the low pressure. Electrical generator 410 may be any suitable type of electrical generator that may operate based on any desired technique and is capable of converting mechanical energy into electrical energy.

Cryogenic working fluid in storage 100 may be maintained at a pressure of about 30 to 40 psia. At least one pump 101A (that may be an electrically-driven pump, as shown, or driven by any type of turbine or expander) may pressurize a cryogenic working fluid stream s0 from the pressure in the storage 100 to about critical pressure (e.g., or somewhat lower or higher pressure). The pressurized stream s0 may then be directed into heat exchanger 104 where it absorbs energy from preferably a sub-critical working fluid stream s12 that may be exhausted through at least one prime mover 401 (e.g., any type listed above or their combination) through exhaust lines 402 and may have negative (e.g., essentially negative) exhaust temperatures.

Pumps 101A 101B, 105A, and 105B may be any suitable cryogenic type of pump for pressurizing working fluids of the exemplary disclosed system. For example, the said pumps may be of a centrifugal or a positive displacement type. Said pumps may be of any suitable hermetically sealed design preferably with oil free magnetic bearings or any other suitable pump type for pressurizing fluid in a system utilizing cryogenic liquids. The said pumps electrical drives may be equipped with a variable speed (or frequency) control devices to minimize power usage.

The working fluid stream s12 exiting the prime mover 401 may be in either sub- or supercritical state. When s12 is in substantially subcritical state to achieve a full 100% liquification of the vapor phase in stream s12, the mass of stream s0 may be at least greater than the mass of gaseous working fluid stream s12 leaving prime mover 401 through exhaust lines 402. A discharge pressure of stream s12 may be greater than fluid disposed in storage 100 and may correspondingly have a condensation temperature of at least 25° F. greater than a temperature of incoming liquid working fluid stream s0. Stream s0 having the exemplary parameters described above (e.g., may have a relatively large thermal capacity) will cause substantially full condensation and subcooling of stream s12 in the regenerative heat exchanger 104. Heat exchanger 104 may be any suitable heat exchanger for use in the exemplary disclosed system such as, for example, phase-change heat exchangers, coil or tube and shell heat exchangers, and/or plate and frame or a braised heat exchanger, or any other suitable type of heat exchanger for use in power generation and/or cryogenic industry. Downstream of heat exchanger 104, stream s0 may merge with a stream s4 (e.g., near critical pressure liquid working fluid stream s4) recovered from a working fluid vapor as described briefly above and, in more details, below. Streams s0 and s4 will form stream s2 (e.g., a near critical pressure stream s2) that may be further pressurized in a pump 101B to a supercritical pressure (e.g., several folds greater than the working fluid critical pressure) that may have low negative or near cryogenic temperature before entering an auxiliary expander EA, which may be connected to a same shaft as prime mover (e.g., expander, etc.) 401. Auxiliary expander EA may be generally similar to prime mover 401 and pump 101B may be generally similar to pump 101A. At auxiliary expander EA, stream s2 may expand to a pressure at which up to 50% by mass or more of cryogenic exhaust flow s22 may be in a liquid state. A stream s0A as a portion of stream s0 serves as a working fluid make-up to compensate end-seal working fluid losses in genset 400 and disclosed power system uncontrolled losses. Stream s12 after condensation in heat exchanger 104 is pressurized to about critical pressure by pump 105A enters intermediate working fluid storage 106 whereas quantity of stream s0A is controlled by a control valve 103 based on a feedback signal from level control device (not shown) installed on the storage 106. The level control device can be any suitable device to be used in a cryogenic application such as floater, acoustic, etc. A gas vapor trap installed at the top of storage 106 may be connected through a back-pressure regulator 107 (not shown) whereas access of vapor may be discharged into stream s4 or the last stage of a multistage compressor C1 of the compressor set 170. Combined streams s0A and s12 form a working stream s1 which is controlled by a power grid demand control device (not shown).

For operating conditions when stream s12 is in a supercritical (e.g. 10 psig or more above the working fluid critical pressure) state the stream s0 may be substantially minimized and be supplied in a minimum quantity s0A required to compensate genset 400 end-seal and a disclosed power system uncontrolled leakages or may be increased to optimize a power consumption by the pumps 105A and 105B with respect to overall system operation. In case of supercritical s12 the storage 106 may be placed upstream of heat exchanger 104 while pump 105A may be optional.

A two-phase flow stream s22 having up to 50% of the working fluid in a liquid state may then enter at least one liquid-gas separator 112a or a series of separators 112a and 112b. Liquid-gas separator 112a and 112b may be any suitable cryogenic liquid-gas separator and/or any other such as, for example, impingement devices, chevron devices, or cyclone devices. A gas phase of stream s22 may exit liquid-gas separator 112a through a downstream valve 108 that may be a Joule-Thomson valve or any other suitable pressure control valve. Some or all of the exemplary disclosed valves described herein may be valve assemblies including a valve (e.g., a self-contained pressure control valve). The gas phase of stream s22 will expand isoentropically at valve 108, thereby producing two-phase stream having working fluid largely in a liquid state of a lower pressure and a lower temperature than working fluid stored in storage 100. Said stream then may enter separator 112b to achieve final separation of gas and liquid phase. High-pressure liquid stream s17 after exiting liquid-gas separator 112a at a high pressure greater than the pressure in the storage 100 may serve as a motive liquid to drive jet compressor 122a to evacuate a lower pressure liquid from the separator 112b and increase their common static pressure that is still greater than the pressure in the storage 100 or separator 112b. Low pressure gas stream s16 may be evacuated from separator 112b and pressurized by high-pressure liquid stream exiting jet compressor 122a, which may generate static pressure suitable (e.g., sufficient) to deliver stream s18 into storage 100 via a stream s19 (e.g., injection line s19). Compressors 122a and 122b may be any suitable type of compressor for use in the exemplary disclosed system such as a gas jet compressor, a liquid jet gas compressor, or low speed positive displacement pump that may be driven by an external power source such as electrically driven pumps. Downstream of compressor 122b, the subcooled gas phase in stream s18, which may have a temperature of up to 30° F. lower than working fluid stored in the storage 100, may cause the liquid phase in stream 18 to evaporate inside the gas phase bubbles. The gas phase in stream s18 may thereby be a cooling source for the liquid phase in stream s18. Also, based on being at a higher pressure in stream 18 than in stream 16, the subcooled gas bubbles may also undergo condensation.

Stream s19 may primarily comprise a liquid phase for example of up to 85% and may also have a temperature that is greater (e.g., somewhat greater) than the working fluid temperature of storage 100. To further minimize a gas phase content and to stabilize the working fluid temperature in storage 100, a raiser 125 may be provided. Raiser 125 may be surrounded by an internal circumferential barrier 124. Due to the relatively lower density of a two-phase stream 19 (in at least some exemplary embodiments) as compared to the liquid working fluid disposed in storage 100, an upward convection flow causes liquid from storage 100 to move above barrier 124 and strategically placed bottom openings in the barrier 124 as shown by arrows 123 and to enter inside raiser 125 (e.g., where remaining bubbles may provide evaporation of the surrounding liquid casing mixture to cool). A deflector 126 and a partition 127 may be disposed at a top of raiser 125. Deflector 126 and partition 127 may be constructed from a perforated plate and/or V-shape channels and may minimize mist carryover (e.g., substantially minimize any mist carryover) into a section connected to a pressure control valve 107. Valve 107 may be a back-pressure control valve that will maintain constant pressure in storage 100 by evacuating an excess of vapor through stream s20 that may be a vent line. Valve 107 may be any suitable pressure control valve that may maintain a desired pressure in storage 100.

The cryogenic or near cryogenic section of the power generating section (e.g., power generation system A400) of the CRPC system may receive condensate of working fluid stream s12 after its latent heat and sensible heat are removed in condensing heat exchanger 104. Stream s12 (e.g., that has been cooled by heat exchanger 104) may then be pressurized by a pump 105A (e.g., a first pump 105A that may be similar to pump 101A) to about a critical pressure (e.g., a correspondent critical pressure) of the given/selected working fluid and may be transferred to a storage 106 (e.g., a high-pressure storage 106). High-pressure storage 106 may be any suitable storage for storing working fluid such as any suitable high-pressure storage vessel. At storage 106, stream s12 may merge with a power system make-up stream s0A (a portion of a stream s0) to form a main working fluid stream s1. The rate of stream s0A is determined by the level of the working fluid in the storage 106. Stream s1 will receive a final supercritical pressurization via a pump 105B (e.g., that may be similar to pump 101A).

Stream s3 may be a re-compressed vapor of cryogenic working fluid collected from storage 100 via stream s20 (e.g., line s20 described above), end-seal leakages from expander EA and prime mover 401 (e.g., leaked vapor from expander EA and prime mover 401 may be transferred via a stream s23), and stream s21 (e.g., a working fluid make-up, near-cryogenic stream s21 as described below). Streams s20, s21, and s23 may be collected in a recovery header 250 (e.g., which may be any suitable header having an adequate layer of thermal insulation) and then will be pressurized in a compressor set 170 (e.g., a multistage electrically-driven compressor set 170). Compressor 170 may be fluidly connected with several inter-stage and discharge coolers that for clarity are shown as a heat exchanger 110 that may be any type of tube and shell or coil heat exchanger. Heat exchanger 110 will transfer the compression energy (e.g., from stream s3) to cryogenic working fluid stream s1 (e.g., that presents an energy credit from the stand-point of the thermodynamic performance, and is not be a parasitic energy loss as it is in a current art for a stand-alone gas compressors and gas turbine compressors). The stream s3 may merge with stream s2 to compensate working fluid inventory losses through end-seals of the genset 401 and from working fluid vaporization from storage 100 including near cryogenic make-up steam s21 (see a more detailed description of flow s21 below) that may compensate any unrecoverable/uncontrolled losses of the working fluid incurred during cycle operation and provide working fluid surplus.

Stream s1 (e.g., supercritical working fluid stream s1), after absorbing waste heat from re-pressurized working fluid vapor in compressor 170 via heat exchanger 110, will become stream s6. Stream s6 may absorb energy from the environment (e.g., the environment surrounding the exemplary disclosed system in the vicinity of stream s6) via assembly A200 that may include a heat exchanger 200 (e.g., further described below). Heat exchanger 200 may for example use (e.g., absorb) energy from the adjacent ambient air and/or solar radiant energy. Stream s5 (e.g., ambient air stream s5) may be introduced into heat exchanger 200 via an operation of a blower 220. Blower 220 may be any suitable type of blower for use in the exemplary disclosed system such as, for example, a draft fan or any other suitable type of fan or blower. Stream s5 may provide (e.g., give up its sensible and latent heat) to stream s6 (e.g., supercritical working fluid stream s6) and may thereby produce (e.g., generate) stream s7. Stream s7 may for example be a low dew point cold air stream s7. Stream s7 (e.g., cold energy stream s7) may be used in any suitable manner such as, for example, cooling electrical generator 410, supplying cold air for plants compressors, air-conditioning (e.g., air-conditioning for personnel operating the exemplary disclosed system), and/or direct DC power generation. The various exemplary uses of stream s7 are schematically shown as $P_1$, Pi, Pk, and Pn in FIG. 1.

In at least some exemplary embodiments, when air is used as the working fluid of the exemplary disclosed system, a portion of cold stream s7 may be a source for stream s21

(e.g., that may be a makeup air stream s21) may be transferred to (e.g., introduced into) header 250 via a purification system 230 (e.g., a Deep Air Purification system or DAP 230) in which remaining moisture and $CO_2$ may be removed via cryogenic cooling using a small portion of a stream s2* (shown schematically in FIG. 1, with more exemplary details being shown in the following figures). Alternatively, molecular sieves may be used to remove remaining moisture and $CO_2$.

Stream s1 may also remove pollutants from combustion products as will be further described below. For example, valves 114A and 114B (e.g., that may be motor-operated valves whereas 114A may be any suitable valve for controlling flow of working fluid and 114 B is an isolation valve) may direct a cryogenic or near cryogenic flow to at least one heat exchanger (e.g., that may be similar to heat exchanger 104), thereby causing a condensation of at least one pollutant having a liquification temperature greater than temperature of the stream s1. As illustrated in FIG. 1, valves 114A and 114B may be in a closed position and bypass valve 128 may be in an open position. Valves 114A and 114B may move between an open and closed position to selectively allow and block flow of at least a portion of stream s1 to a supply stream s1A and a return stream s1B, respectively.

Following absorption of ambient energy in heat exchanger 200, a working fluid stream s6 becomes a stream s8 may flow into main energy supply heat exchanger 300. Heat exchanger 300 may be a main heat exchanger that may be generally similar to heat exchanger 104. An origin of an energy source 375 of stream s9 may be any suitable thermal source or combination of thermal sources such as, for example, a flue gas coming from a heating source such as a burner, a boiler, a gas turbine, an industrial furnace, a combustion engine, one or more geothermal energy sources, and/or a solar energy. After the absorbing of such energy including both sensible and latent heat (e.g., of stream s9) by a stream s8 (e.g., supercritical working fluid stream s8), the cooled stream s9 may be exhausted back to environment via conduit 350. In a combustion application, stream s9 may leave heat exchanger 300 at relatively low temperatures of around 100° F. to allow for a desired (e.g., a minimum suitable) flue gas buoyancy. Thusly heated stream s8 forms stream s10 (e.g., a supercritical stream s10) that will attain its highest thermal energy and then will expand in the prime mover 401 (e.g., expander 401), thereby producing a major part of the mechanical work that can be transferred to electrical generator 410 or can be used directly to propel a large object such as a ship or a train.

A pressure reducing valve 411 (e.g., a Joule-Thomson bypass valve 411 that may be similar to valve 108) will be installed to assist in a startup of the exemplary disclosed system. In order to start the exemplary disclosed system, an initial fill (e.g., initial, one-time fill) of the working fluid to about 30% of a capacity of storage 100 may be provided. After the initial fill, the exemplary disclosed system may be capable of replenishing its working fluid for example either as illustrated in FIG. 1 (e.g., directly from air), by condensing a source fluid from one or more combustion gases containing $CO_2$, and/or by assisting an air liquification or air separation unit to generate working fluids (e.g., such as liquid air, $N_2$ and/or $O_2$), and/or by natural gas liquification to produce liquid methane. Valve 411 may be fluidly connected via a stream s11 to stream s12. Another bypass valve 412 can be used during start-up to bypass a heat exchanger 300 and to avoid a high temperature shock to the prime mover during start-up following a gradual opening of a motor operated throttling valve 450.

The exemplary arrangement illustrated in FIG. 1 may operate using (e.g., on) the same working fluid in both the exemplary disclosed power generating subsystems (e.g. A200, A300 and A400) and cryogenic energy sink subsystem (e.g. A100). For example, a working fluid for the exemplary system illustrated in FIG. 1 may be a liquefied air, and a make-up source may be ambient air.

Figure 1A:
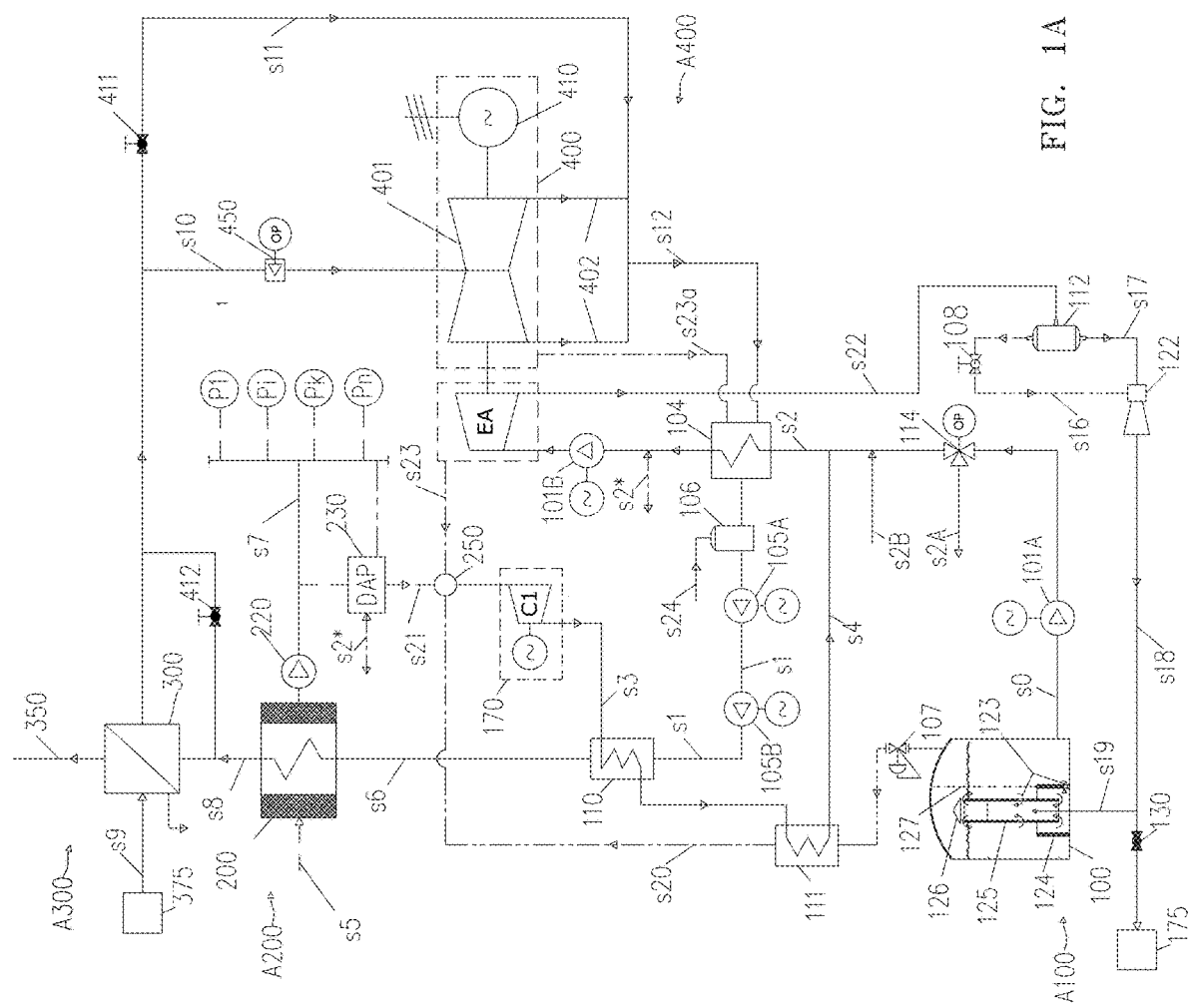
FIG. 1A illustrates a schematic view of at least some exemplary embodiments of the present disclosure (e.g., another exemplary embodiment of a Cryogenic Regenerative Power Cycle system)

Also, for example, the working fluid may include one or more liquified gases such as, for example, Air, Nitrogen, Oxygen, Carbon Dioxide, and Methane (e.g., or a binary combination of working fluids, or a combination of any number of working fluids). Several combinations of working fluids may be used. For example, an exemplary combination may include a pair of gases having a first gas used for the power generating subsystem and having relatively higher condensation temperature and a second gas having a relatively lower (e.g., inherently lower) condensation temperature for a cryogenic energy sink. Exemplary embodiments of combinations (e.g., binary combinations) of a first gas and a second gas as described above may include Carbon Dioxide-Air, Carbon Dioxide-Nitrogen, Carbon Dioxide-Oxygen, Carbon Dioxide-Hydrogen, Air-Nitrogen, Air-Hydrogen, and or other suitable combination. FIG. 1A illustrates an exemplary embodiment of the exemplary disclosed system utilizing binary working fluids.

The exemplary disclosed system of FIG. 1A may operate generally similarly to the exemplary disclosed system illustrated in FIG. 1. As illustrated in FIG. 1A, a difference in operation as compared to the system of FIG. 1 may involve a segregation of the working fluids for power and heat-sink operation. As illustrated in FIG. 1A, exhaust from prime mover 401 (e.g., main expander 401) and related end-seals leakage may be directed to condensing heat exchanger 104 (e.g., via a stream s23a). An operation of the exemplary disclosed system may remain the same as illustrated in FIG. 1, including re-compression of the second working fluid via compressor 170 and intermediate cooling heat exchangers 110 (e.g., with a suitable piping system rearrangement when air is used as the second working fluid). The relatively large quantities of cold energy and waste cold energy generated by the exemplary disclosed CRPC system may replenish cryogenic storage working fluids in power working fluid storage 106 by utilizing cold energy supplied by a stream s2A that may be bifurcated via a three-way valve 114 to a gas separation unit similar to the unit described below regarding FIG. 7 after providing a cooling load stream s2A which may be a portion of the stream s0 is retuned back as a heated stream s2B. For example, as illustrated in FIG. 1A, high-pressure storage 106 may be in fluid communication with a stream s24 to receive the make-up flow from the sources suitable to compensate uncontrolled leakages of the working fluid for power generation that may be liquified in full by the cooling provided by stream s2A.

The recovery of the second working fluid used primarily for the heat sink operation will involve collection of the end seal leakage from an auxiliary prime mover EA (i.e. stream s23), vaporization flow s20 from cryogenic storage 100 and a makeup steam s21 (should the secondary working fluid be air) in the header 250 followed by collected vapor re-pressurization by a multi-stage compressor 170 with the interstage cooling by the power working fluid in heat exchanger 110. Another modification of the disclosed system in FIG. 1A as compared to the exemplary system shown in FIG. 1 is an addition of the heat exchanger 111 to produce a lower temperature stream s4, which may be hydraulically connected to stream s2 upstream of heat exchanger 104. Such configuration may be especially beneficial for applications were the first working fluid has essentially higher inherent condensation temperature compare to the second working fluid. Although the work in compressor 170 may be the largest parasitic loss for the exemplary disclosed system, the associated loss is significantly less (e.g., five times less) than other systems. For example, at a highest re-compression ratio, the discharge pressure above critical pressure may result in the loss of up to 12% of gross power generated by prime movers EA and 401, which may be five times less than for an advanced Brayton cycle. Additionally, typical losses to the condenser in the Rankine cycle may be reduced or eliminated in the exemplary disclosed system (e.g., overcoming the second shortcoming of current art discussed above) as the condensation energy of streams s12 and s23a absorbed in heat exchanger 104 by stream s2 is then transformed into a larger work/electrical output generated by the prime mover EA.

Further, based on relatively high thermal efficiency operation at low temperatures (e.g., not exceeding 800° F.), the exemplary disclosed system may not involve use or development of expensive (e.g., exotic) materials, which may overcome the first shortcoming of conventional systems discussed above. Also, at supercritical conditions having higher-than-steam densities, smaller-sized power generating equipment and piping may be involved in the exemplary disclosed system, thereby reducing a cost of the exemplary disclosed system.

Because the liquified working fluid of the exemplary disclosed system may have a low temperature (e.g., well below ambient), the latent heat of water present in typical combustion products may be effectively utilized, thereby absorbing the total energy of fossil fuels (e.g., which may overcome the third shortcoming of conventional systems discussed above). This effect may also apply to industrial and commercial facilities that burn fuel and/or have relatively large latent water energy content in their waste heat stream, which may thereby increase an efficiency of waste heat to power conversion and preserve the environment by removing water vapor from the discharged flue gas products (e.g., reduce greenhouse gas emissions).

As described above, the availability of the low temperature working fluid may be used to liquify or provided a substantial assistance in producing liquified working fluids make up streams. In the similar fashion working fluid having low or near cryogenic and cryogenic temperatures may practically sequester hazardous emissions (e.g., substantially all hazardous emissions) from the combustion sources in a liquid state to improve the environmental performance and/or considerably reduce energy losses in industrial gas liquification processes (e.g., such as air separation units to support partial combustion air enrichment or 100% oxy-firing combustion technology that may also be used to generate make-up working fluid involved in the exemplary disclosed cryogenic power cycle system).

Figure 1B:
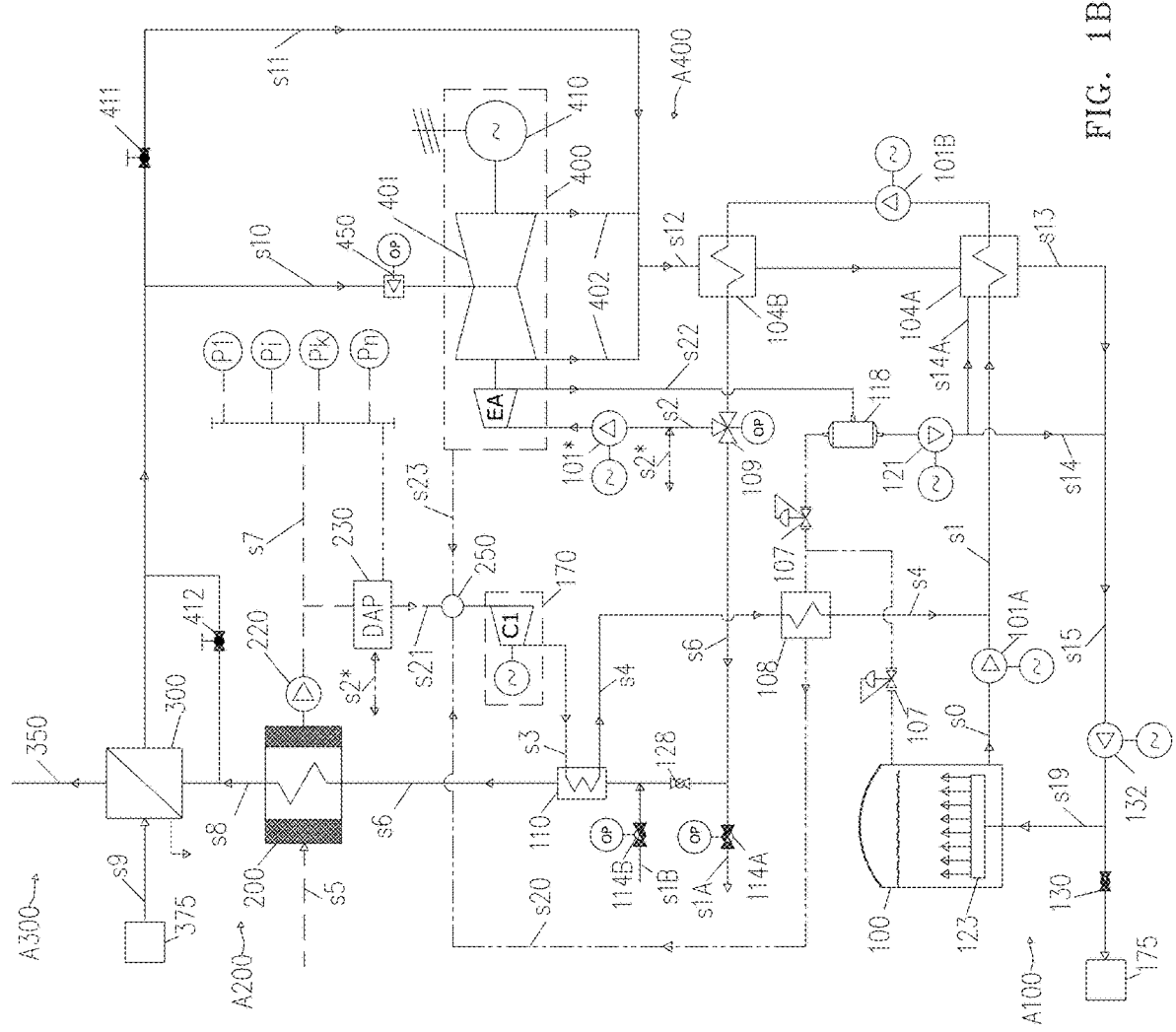
FIG. 1B illustrates a schematic view of at least some exemplary embodiments of the present disclosure (e.g., another exemplary embodiment of a Cryogenic Regenerative Power Cycle system)

FIG. 1B illustrates another exemplary embodiment of the exemplary disclosed system. Liquid working fluid disposed in storage 100 will serve both as a source of the working fluid supply and a complementary energy sink to achieve substantially total liquification of the working fluid at a completion of a power generation cycle of the exemplary disclosed system. Stream s0 from storage 100, which may have a pressure up to 40 psig, may be first pressurized by at least one pump 101A to about a critical pressure of the selected working fluid (e.g., one of the working fluids discussed above being utilized) whereas said pressure of stream s0 will be set to correspond to a higher range of thermal capacities of said working fluid. Stream s0 may then merge with stream s4 (e.g., recovered supercritical and subcooled working fluid stream s4) that may be generated from working fluid vapor as described for example above. Following a system start-up, the quantity of stream s0 may decrease as the quantity of stream s4 increases, thereby appreciably minimizing the work performed by pump 101A. Streams s0 and s4 will produce subcooled stream s1 (e.g. compare to stream s0) that may enter the first condensing heat exchanger 104A that may allow a complete liquification of stream s12 exhausted from at least one prime mover 401 (e.g. expander) at a discharge pressure that is greater (e.g., slightly greater or somewhat greater) than a pressure in storage 100. The expansion to a lower pressure in prime mover 401 will provide a greater available enthalpy head as compare with the exemplary embodiment of FIG. 1 and FIG. 1A, thereby increasing the work/power generated by prime mover 401. A flow rate of stream s1 may be greater than stream 12 and may have a temperature of at least 15° F. lower than a condensation temperature of stream s12 at its pressure in the condensing heat exchanger 104A. A thermal capacity of the liquified gases at near critical pressure in cryogenic range of temperatures of stream s1 will be higher than for stream s12, thereby allowing a flow rate of s1 to be minimized. Following removal of the sensible and latent heat from stream s12 at a substantially constant pressure in heat exchanger 104A, stream s1 may be further pressurized to an ultra-super-critical pressure by pump 101B (e.g., up to 12 times above working fluid critical pressure, and/or as high as process design requires or a current art allows) and transferred (e.g., directed) into heat exchanger 104B. Heat exchanger 104B will provide pre-cooling and partial condensation of stream s12 before it enters condensing heat exchanger 104A. Downstream of heat exchanger 104B, flow s1 may be bifurcated by a valve 109 (e.g., a three-way valve 109 that may be similar to three-way valve 114) into two near cryogenic flows s2 and s6. At the relatively moderate supercritical pressures of stream s1 (e.g., and correspondingly for stream s6) that may be determined by parameters of a main energy source delivered to module 300 (e.g., main heat exchanger 300), a pressure of stream s2 may be increased by utilizing a supercritical booster pump 101* (e.g., that may include components that may be generally similar to the exemplary pumps described above). A cooling capacity of a complementary energy sink provided by the stream s22 after expansion in prime mover EA (e.g. preferably an expander) thereby be increased, while also maximizing a power generation by genset 400, minimizing temperature of all streams that are in fluid and thermal communication with s22 following its phase separation in separator 118 thus improving overall operation of cryogenic system A100.

After expansion of stream s2 (e.g., supercritical stream s2) in auxiliary expander EA, which may be mechanically connected to main prime mover 401, power generation by power generation system or genset 400 will be augmented, and a cryogenic two-phase stream s22 may have a liquid phase concentration reaching about 50% by mass at a pressure for example equal to or lower than a pressure in storage 100 (e.g., or lower than a pressure in storage 100). Following a separation of the gas and liquid phases of the stream s22 in a separator 118 that may be similar to separator 112, a subcooled vs. storage temperature the gas phase stream from separator 118 may be used in heat exchanger 108 (e.g., that may be similar to heat exchanger 104) to cool down stream s4. Stream s14, which is a liquid phase of stream s22 exits separator 118, may be transferred (e.g., sent) to condensate stream s13 having a pressure that may be lower than a pressure in storage 100 and a temperature lower than stream s13 therefore producing a stream s15 that may be cooler than working fluid stored in storage 100. The pressure in storage 100 may be controlled by back-pressure regulator 107 thus maintaining an adequate working fluid vapor evacuation flow rate.

The stream s14 may have a lower pressure than the stream s13 and the pressure in heat exchanger 104A thus requiring a booster pump 121 (e.g. a low-pressure centrifugal or positive displacement pump) to be used whereas a portion or substantial portion of stream s14 may be injected (e.g. sprayed) into heat exchanger 104A at the inlet of stream s12 to provide an evaporative cooling and subsequently rapid condensation of the vapor portion of stream s12 therefore minimizing the excess of stream s1 rate as compared to rate of stream s12.

A stream s15 is pressurized by pump 132 (e.g., a low-pressure high-volume positive displacement pump) that may transfer subcooled stream s19 into a distribution header 123 located inside storage 100. Distribution header 123 may be any suitable distribution header for storage 100 such as, for example, a header distribution manifold. Subcooled stream s19 may thereby substantially minimize (e.g., minimize) an evaporation rate from storage 100 (e.g., whereas a vapor pressure in storage 100 may be controlled by back-pressure regulator 107) that will discharge an excess of the vapor into a stream s20 that may be a vent line s20 or be directed into heat exchanger 108 (as shown) to support or enhance cooling of stream s4. When the working fluid level in storage 100 rises above a predetermined level (e.g., its designed capacity), the excess working fluid may be transferred to a long-term liquid working fluid storage 175 via a transfer line controlled by a valve 130 (e.g., that may be any suitable control valve for controlling flow from the exemplary disclosed system).

Figure 6:
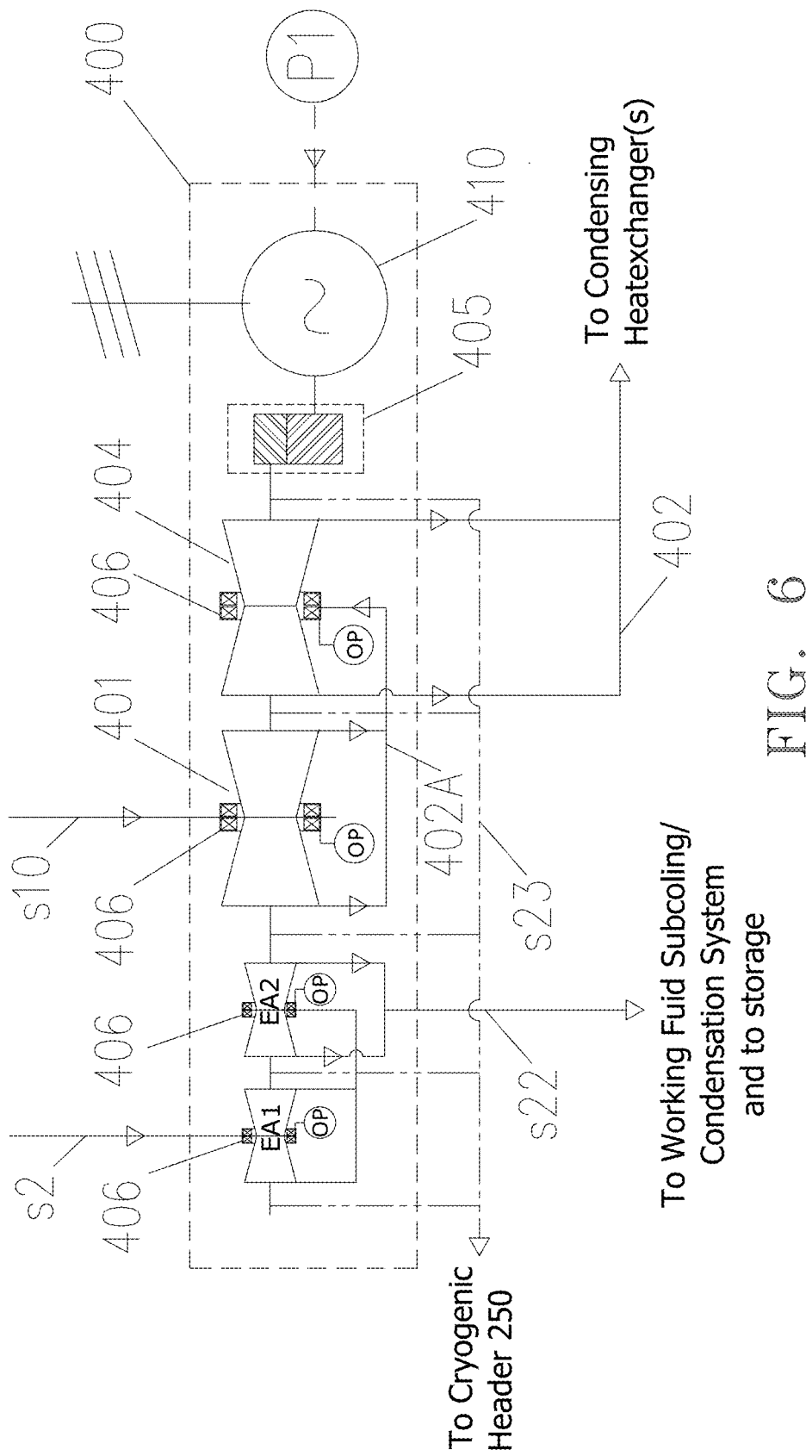
FIG. 6 illustrates a schematic view of at least some exemplary embodiments of the present disclosure (e.g., an exemplary Expander and Genset Design for Supercritical Gas Operation)

The mixture of working fluid vapor from storage 100 and the vapor from separator 118 will have cryogenic temperatures that may be below the temperature of the working fluid in the storage 100. Following cooling of stream s4 in heat exchanger 108 will be evacuated via vent stream s20 (e.g., line s20) into header 250 (e.g., cryogenic header 250) by suction created by compressor 170 (e.g., an electrically-driven multistage compressor set 170) that may have a plurality of inter-stage and the discharge coolers (e.g., illustrated in FIG. 1B as a single heat exchanger 110). The pressure regulators 107 that may be a self-regulated back-pressure regulator type preventing excess of vapor to be overdrawn into said cryogenic header 250. Stream s21 (e.g., near cryogenic temperature streams s21, further described below, which may be a make-up working fluid if air is used as a working fluid) and stream s23 (e.g., near cryogenic temperature streams s23) from end seals of the exemplary disclosed expanders (e.g., as illustrated in FIG. 6) that are along with stream s20 may be pressurized to a near critical pressure (e.g., somewhat lower or somewhat greater), thereby producing stream s3. Compression heat may be transferred from stream s3 to power stream s6, thereby providing a thermal energy credit (e.g., as opposed to be a parasitic loss as for example in conventional gas pressurization systems).

Similar to the exemplary embodiment illustrated in FIG. 1, stream s6 may also be used to remove pollutants from combustion products for example as described further below. Because stream s6 may have a relatively low working fluid temperature, substantially all regulated pollutants (e.g., including $CO_2$) may be removed from substantially any and all process gas or products of any organic fuel combustion providing low temperature heat input in a negative range of temperatures to stream s6 upstream of a plurality of the interstage coolers (i.e. shown as a single heat exchanger 110) hydraulically connected to the multi-stage compressor 170. For example, valves 114A and 114B (e.g., motor operated valves 114A and 114B) may be provided to direct a cryogenic or near cryogenic flow to at least one heat exchanger, thereby causing condensation of at least one pollutant having liquification temperature greater than a temperature of a stream s1A (e.g., or initial stream s6). As illustrated in FIG. 1B, valves 114A and 114B may be in a closed position and bypass valve 128 may be in an open position.

Following preheating in heat exchanger 110 (e.g. may be plurality of interstage cooling heat exchangers), stream s6 may absorb energy for example from ambient air (stream s5) including its sensible and latent heat and/or energy from the sun in assembly A200 (heat exchanger 200). Water from the ambient air may be condensed (e.g., may be a service grade water). Stream s6, after absorbing ambient energy in assembly 200, may generate a relatively large volume of cold, low dewpoint air stream s7 (e.g., at a temperature of about minus 40° F. or −40° F.) that may be used for various purposes. These purposes may include for example electrical generator sub-cooling and/or air-conditioning, compressed air supply, and/or any other suitable use. The share of ambient air energy as compared to solar energy utilization may be based on desired cooling loads to minimize energy consumption for the said purposes listed above and/or for industrial gases and/or air separation processes, that may be used as a working fluid make-up flow in disclosed system when working fluid is other than air. In exemplary embodiments in which air if the working fluid, a portion of the stream s7 may provide a preconditioned low humidity air to DAP unit 230 that may serve as make-up air steam s21 having less than 50 ppm $CO_2$ concentration and a dew point below minus −100° F. due to cooling by a slip stream s2\* (depicted for simplicity in FIG. 1B as a two way stream 2\* as described above). Stream s21 may compensate for working fluid leakages of the exemplary disclosed system. For exemplary embodiments utilizing exemplary disclosed working fluids other than air, make-up stream s21 may be supplied in a liquified state directly to working fluid storage 100 via assisted cooling that may be provided by stream s1A.

After leaving assembly or heat exchanger 200, stream s8 may enter assembly A300 (main heat exchanger 300), where stream s8 will absorb a maximum energy derived for example from fuel combustion or a waste heat from industrial processes (e.g., including both sensible and latent heat while condensing any residual water vapor in a waste heat stream) and/or from a regular or a concentrated solar energy. In at least some exemplary embodiments, the recovered water may be acidic and may involve filtration and neutralization for subsequent use. The exemplary disclosed system may operate on ambient energy and/or solar energy (e.g., intermittent solar energy) at a reduced power output that may be sufficient to operate the disclosed system as a liquid energy storage (e.g., as Air Liquid Energy Storage-LAES).

Figure 2:
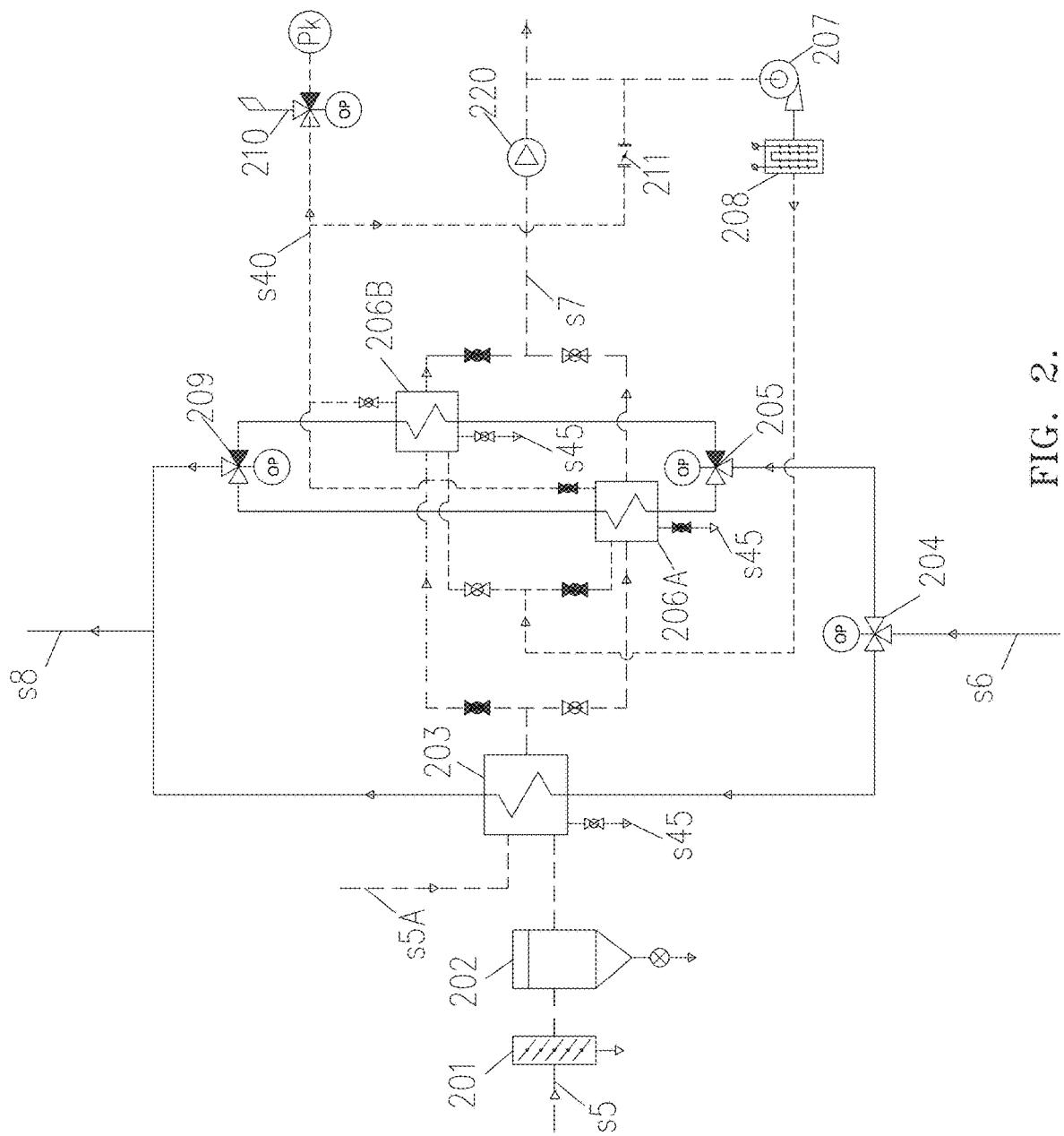
FIG. 2 illustrates a schematic view of at least some exemplary embodiments of the present disclosure (e.g., an exemplary Ambient Air Sensible and Latent Heat Energy Absorption Assembly)

Stream s10 (e.g., preheated stream s10) may be admitted into at least one prime mover (e.g., expander 401) via throttling valve 450 to generate electrical power via generator 410 (e.g., mechanically connected electrical generator 410). Power generation system 400 (e.g., generator 410) may be cooled by dry low temperature fluid (e.g., air) supplied by assembly 200 (e.g., from stream s7). For at least some electrical generators (e.g., generators 410 that may be 350 MW and smaller), direct use of subcooled stream s7 may reduce electrical resistance/losses in a rotor and/or stator and thereby minimize drag forces, which may lead to a relatively higher generator electrical efficiency. For relatively larger hydrogen-cooled electrical generators 410, an indirect cooling by a portion of stream s7 may be used to achieve the same low temperature effects. Then heated stream s7 (e.g., low dew point) may be recirculated back into module A200 or heat exchanger 200 (e.g., as shown in FIG. 2).

Figure 4:
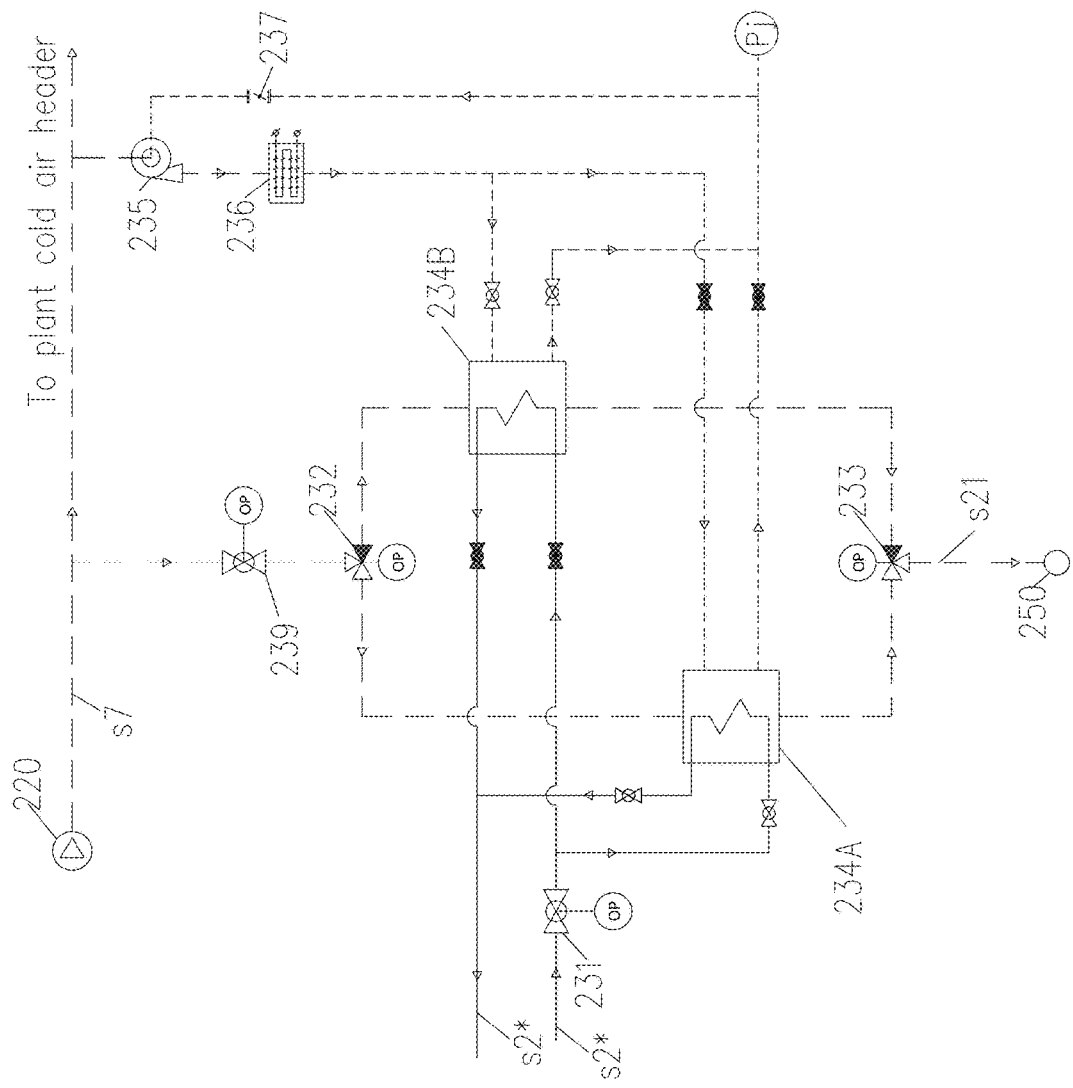
FIG. 4 illustrates a schematic view of at least some exemplary embodiments of the present disclosure (e.g., an exemplary assembly for Make-Up Ambient Air Purification Module for Removal of Residual Water Vapor and $CO_2$)

In at least some exemplary embodiments (e.g., and as shown by performance analysis), as the exemplary disclosed system approaches its steady state operation, the flow rate of stream s0 may decrease as compared to its initial start-up rate, thereby indicating that an inventory of the working fluid in storage 100 may be increasing at a maximum rate that may be substantially equal to the make-up working fluid stream s21 less the losses to adjacent surroundings (e.g., based on suitable construction such that the make-up flow stream s21 is greater than uncontrolled leakages in the system). The exemplary disclosed system may support substantially total working fluid condensation to sustain a continuous 100% liquefaction and also may provide a surplus of working fluid (e.g., in the case of at least some exemplary embodiments in which air is being used as a make-up flow extracted from stream s7 after cooling in heat exchanger 200 and subassembly DAP 230 as shown in FIG. 4).

In at least some exemplary embodiments, a direct coupling of compressor 170 and expander EA may be provided. For example, an electrical motor driving compressor 170 may be replaced by a motor-generator supplying an excess of power generated to a busbar to which power generation system A400 (e.g., genset 400) will be connected.

In all exemplary embodiments the disclosed system will be able to operate at lower loads to meet a reduced power demand that may be as low as 15% of system rated output, a flow of working fluid flow s1, s2, and s6 will be adjusted to match a reduced heat input of stream s9 (e.g., while the source of waste heat, e.g. from a utility or industrial power plant, may be in a standby operational mode). Should the energy source (e.g., stream s9) be shut down completely, the exemplary disclosed system may continue to operate on ambient energy (e.g., maintaining desired internal system load) while bypassing assembly A300 (main heat exchanger 300) through bypass valve 412 and by coordinating open and closed positions of shut or isolation dampers around heat exchanger 300 (not shown for clarity). The exemplary disclosed system may thereby produce a surplus of liquid working fluid and transfer the excess of working fluid to long-term-storages via valve 130 (e.g., commodity transfer valve 130). In some exemplary embodiments for example in which available ambient energy is not sufficient to maintain desired internal loads of the exemplary disclosed system, stream s9 (e.g., input s9) may be supplemented by burning an auxiliary fuel upstream of assembly A300 or main heat exchanger 300 to match desired heat input levels of the CRPC system (e.g., in such a charging mode of operation) for example as described below. A surplus of the working fluid may be used by the exemplary disclosed system itself for various transient regimes of operations (e.g., during initial operation when operating personnel may be going through a learning curve), and/or may be sold as a commodity to industrial facilities, and/or may be used in LAES (liquid air energy storage) to minimize their power consumption and to improve their round trip efficiency.

FIG. 2 illustrates an exemplary embodiment of assembly 200. Assembly 200 may serve as a regenerative heat exchanger that may transfer energy from ambient air to working fluid stream s6 (e.g., to substantially minimize fuel energy involved in the power generation process). Ambient air (e.g., after exchanging its energy with the working fluid) may also serve as a source of cold energy to various users and as working fluid make-up (e.g., when air is used as working fluid). Air stream s5 may be drawn into assembly 200 via blower 220 (e.g., that may be located on a cold air side of assembly 200 to minimize power consumption). Ambient air stream s5 may be admitted through a damper 201 (e.g., a louver damper 201) of a waterproof design (e.g., rain waterproof design that may remove an excess of moisture) and then may enter a precipitator 202 (e.g., dust precipitator), which may be for example an electrostatic type precipitator. After removal of the excess of moisture and dust from the ambient air (e.g., from ambient air stream s5), a heat exchanger 203 (e.g., first heat exchanger 203 that may be finned tubes) may cool down incoming air (e.g., stream s5) to a temperature that may be about 2° F. to about 3° F. above a water freezing temperature (e.g., about 34° F.). A valve 204 (e.g., a modulating three-way valve 204 that may be generally similar to valve 114) may adjust a flow rate of stream s6 (e.g., the supercritical working fluid s6) to heat exchanger 203. A balance of stream s6 may be directed to one of a heat exchanger 206A and a heat exchanger 206B based on their regeneration (e.g., de-icing) status. For example, as illustrated in FIG. 2, heat exchanger 206A may be in operation (for example, valves are shown in FIG. 2 with a dark solid fill that represent a current closed position).

At heat exchanger 206A, stream s6 may continue to take energy from the already-cooled air after being discharged from heat exchanger 203. Downstream of heat exchanger 206A, the ambient air may be cooled down to have a dew point of about minus 40° F. (−40° F.), which may result in ice formation on a surface of heat exchanger 206A. As illustrated in FIG. 2, stream s7 (e.g., low dew point air stream s7) may then be supplied by blower 220 into the exemplary disclosed header (e.g., see above discussion regarding FIG. 1). A portion of stream s6 heated by ambient energy in heat exchanger 203 and heat exchangers 206A or 206B may join to form preheated stream s8 (e.g., based on three way on-off valves 205 and 209 being in positions based on and coordinated with an operating status of heat exchangers 206A and 206B). All heat exchangers are provided with the water drain lines represented by stream s45. Heat exchanger 206B as shown in FIG. 2 may be in a regeneration (de-icing) mode of operation that may be hydraulically connected to a stream s40 (e.g., vent lines s40) via an individual vent valve to a common three-way on-off vent valve 210. At the initial phase of de-icing operation mode valve 210 is opened to atmosphere with individual vent and drain valves (via stream s45) being opened while being isolated from a cold ambient air inlet from heat exchanger 203 and the inlet of blower 220. A fan 207 (e.g., a draft fan or any other suitable type of fan or blower sealed against the atmosphere) may extract a portion (e.g., a relatively small portion) of cold and dry air from stream s7, which may be preheated to a temperature above an ice-melting temperature (e.g., above 32° F.) by a heater 208 (e.g., any suitable heating device such as an electrical heater) and may supply this preheated stream into heat exchanger 206A or 206B depending on their de-icing status. The ice collected (e.g., as described above) in heat exchangers 206A and/or 206B is then melted and drained in a liquid form through stream s45 and water vapor may be vented back to the atmosphere through stream s40 (e.g., line s40) and three-way on-off valve 210. During an initial stage of the de-icing, a portion of stream s40 may be recirculated back to fan 207 through a control damper 211 to minimize electrical power consumption by heater 208.

After the flow through the exemplary disclosed drain stops, the exemplary disclosed drain valve closes and an operational phase of drying and cooling may begin to prepare the exemplary disclosed heat exchanger for the next operational cycle. By controlling power to heat exchanger 208 (e.g., electrical heat exchanger 208), an internal surface may be first dried and then cooled down by stream s7 (e.g., low temperature and low humidity stream s7). In a cooling mode, valve 210 may redirect effluent vent flow from heat exchanger 206B back into stream Pk (e.g., a low temperature low dew point stream Pk as illustrated in FIG. 1) to be used by desired systems of the exemplary disclosed system (e.g., the plant systems). Modes of operation of heat exchangers 206A and 206B such as in-service or de-icing (e.g., surface cleanliness regeneration) may be sequenced by a programmable controller based on monitoring (e.g., continuous monitoring) of dew point and/or temperature in streams s7 and s40. The exemplary disclosed arrangement of heat exchangers 203, 206A and 206B may minimize capital and operational costs of assembly 200 by reducing a size of the exemplary disclosed heat exchangers undergoing surface regeneration (e.g., de-icing).

To minimize power consumption by fan 207 and/or heater 208 while minimizing losses of cold air stream s7 in at least some exemplary embodiments, one or more electric heaters may be installed inside heat exchangers 206A and 206B, thereby not involving a cold dry air supply from fan 207 during an ice melt-down phase of operation. Accordingly, cold dry air may be used during dry-out operation and during initial cooldown phase (e.g., and not in other phases in at least some exemplary embodiments).

Figure 3:
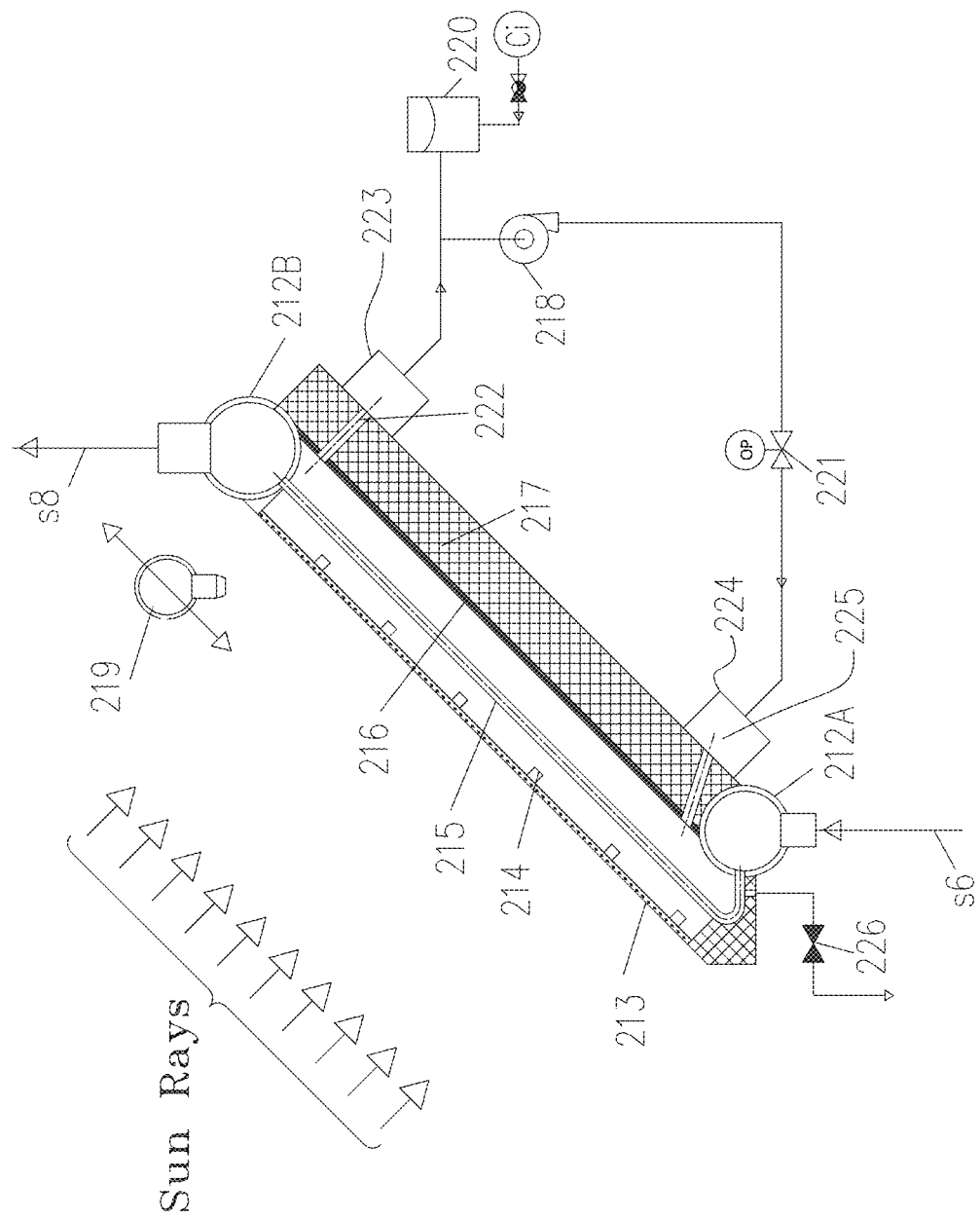
FIG. 3 illustrates a schematic view of at least some exemplary embodiments of the present disclosure (e.g., an exemplary Solar Energy Absorption assembly)

In at least some exemplary embodiments (e.g., depending on geographical region) and as illustrated in FIG. 3, some or all of stream s6 (e.g., supercritical stream s6) may be preheated using a solar radiator. For example, due to lower daily availability of solar energy compare to ambient air, a solar radiator may be used in parallel with the exemplary disclosed convective heat exchanger (e.g., as described above) to absorb ambient air energy.

For example, FIG. 3 illustrates an exemplary embodiment of a solar radiator. Some or substantially all of stream s6 may enter a header 212A connected by tubes 215 that may be bent (e.g., to compensate for thermal stresses due to tube material thermal expansion or contraction). Tubes 215 carrying cold supercritical working fluid may be hydraulically connected to an outlet header 212B that will supply preheated supercritical working fluid into stream s8. To minimize a temperature stratification within tubes 215 that may be caused by uneven (e.g., shaded) surface irradiation, a twisted-type turbulator may be inserted in tubes 215 to provide (e.g., promote) stream rotation around its centerline (e.g., to provide even flow heating and a suitable rate of solar energy absorption). For example, to prevent ice formation from moisture present in the surrounding air (e.g., near or around inlet header 212A and a lower portion of tubes 215) and to provide suitable de-icing operation, bundles of tubes 215 may be installed within a gas-tight enclosure formed by sheets 213 (e.g., made of a strong and transparent polycarbonate plastic or other suitable material) and by high-reflectivity sheets 216 (e.g., thermally isolated from ambient air by insulation 217) to provide desired utilization (e.g. reflection) of incident sun energy across a total area of the reflective sheets 216 of the exemplary disclosed solar radiator. Any suitable technique in addition to the exemplary technique described above may be used to maintain a substantially ice-free inner surface of sheet 213. A space within enclosed tubes 215 may be filled with a diatomic gas having low water vapor content (e.g., having dewpoint of about minus 70° F.). The exemplary diatomic gas may be recirculated by fan 218 (e.g., through an enclosure) from a hot side through a plurality of supply suction nozzles 222 embraced by suction header 223, toward a relatively colder section of the exemplary disclosed radiator to discharge nozzles 225 that are embraced by a header 224. For example, a storage of a low-dew-point diatomic gas 220 may serve as an accumulator that may compensate for daily and seasonal pressure fluctuations. Also for example, an adjustable pressure modulator (e.g., for both frequency and amplitude) may be included downstream of fan 218 to provide pulsation impulses (e.g., that may contribute to cracking ice formed on the surface of sheet 213). Also for example, one or more adjustable low-frequency mechanical vibrators 214 may be included to assist in cracking ice that may be formed on an exterior surface of sheet 213. Further for example as illustrated in FIG. 3, a spray 219 (e.g., a robotic spray 219) may move along an inclined radiator surface to physically remove ice via a plurality of air jets and/or spray of suitable de-icing solutions. Spray 219 may also perform a washdown operation of the exemplary disclosed radiator. The exemplary disclosed radiator may also include any suitable valves such as, for example, valves 221 to assist in desired modulation of diatomic gas pressure and 226 for draining possible moisture accumulation within enclosed space of the exemplary disclosed radiator as illustrated in FIG. 3.

Any suitable exemplary disclosed working fluid may be used such as, for example, ambient air. For example, makeup fluid (e.g., make-up air) may be preconditioned and may be substantially free (e.g., technically free) of moisture and carbon dioxide (e.g., less or equal 50 ppm). For example, this may be achieved utilizing molecular sieves in combination with air pressurization in the exemplary disclosed compressor (e.g., or compressors) and swing operation of moisture and $CO_2$ absorbers (e.g., or any other suitable cryogenic air separation technique). Alternatively, assembly 230 illustrated in FIGS. 1, 1A and 1B may be arranged according to any suitable practices to utilize low-dew-point cold stream s7 to produce a make-up working fluid from air to reduce related power consumption.

FIG. 4 illustrates an exemplary embodiment of assembly 230 (e.g., DAP 230). In at least some exemplary embodiments, assembly 230 may generate relatively low moisture and relatively low $CO_2$ make-up air stream to minimize power consumption from gases that may condense or become solid well above a cryogenic temperature range such as above minus 150° C. (minus 238° F.). A portion of stream s7 may be supplied to assembly 230, which may include a plurality of heat exchangers 234A and 234B (e.g., two low-temperature tubular heat exchangers 234A and 234B). One of heat exchangers 234A and 234B may remain in operation when the other undergoes surface regeneration (e.g., removal of frozen residual moisture and $CO_2$). As illustrated in FIG. 4, a portion of stream s7 may be fed through a valve 232 (e.g., an on-off three-way valve 232) installed downstream of flow control valve 239 into heat exchanger 234A that may be cooled down by a relatively small fraction of supercritical low temperature stream s2* (e.g., while converting to ice residual moisture and $CO_2$ that may primarily be collected on tubes of heat exchangers 234A and 234B, thereby achieving a deep purification of the make-up air). The purified stream will flow through an open pass of three-way valve 233 forming stream s21 into header 250 (e.g., a non-condensed gas collector 250, e.g., as also illustrated in FIGS. 1, 1A, and 1B). A flow rate for cooling flow s2* will be controlled by a valve 231 based on pressure and temperature of the air make-up flow supplied to header 250. Stream s2* may be returned to stream s2 upstream of a boost pump 101B as illustrated in FIGS. 1, 1A, and 1B.

Heat exchanger 234B may undergo surface regeneration. Heat exchanger 234B may be isolated from both stream s7 by on-off three-way valves 232 and 233 and from the exemplary disclosed cooling media (e.g., a portion of stream s2, i.e. stream s2*). Fan 235 may take a portion of stream s7 and deliver this portion into heat exchanger 234B at temperatures that is greater than an ice melt-down (e.g., ice melt-down temperature) causing evaporation and removal of frozen $CO_2$ and residual water ice from a surface of heat exchanger 234B, which will form a gaseous mixture. This gaseous mixture may be discharged into a cold air stream Pj and may become available for any desired use in the exemplary disclosed system (e.g., plant use). A heater 236 (e.g., an electric heater 236) that may be provided with a recirculation line having control valve 237 may be used to accelerate (e.g., speed up) the regeneration process. Sequences of the exemplary disclosed operating valve positions and heating devices may be coordinated by any suitable controller (e.g., a programmable controller) based on pressure, temperatures, and/or $CO_2$ concentration supplied to cold air header Pj.

As described above, the power used by the exemplary disclosed deep air purification assembly may be relatively low as compared to an average for a cryogenic air separation process. The exemplary disclosed DAP may also allow for not including a relatively costly molecular sieve. In addition, the electric heater 236 may be replaced by individual electrical heaters installed inside the heat exchangers 234A and 234B to raise temperature within the heater that undergoes de-icing operation at about minus 40° F.

Figure 5:
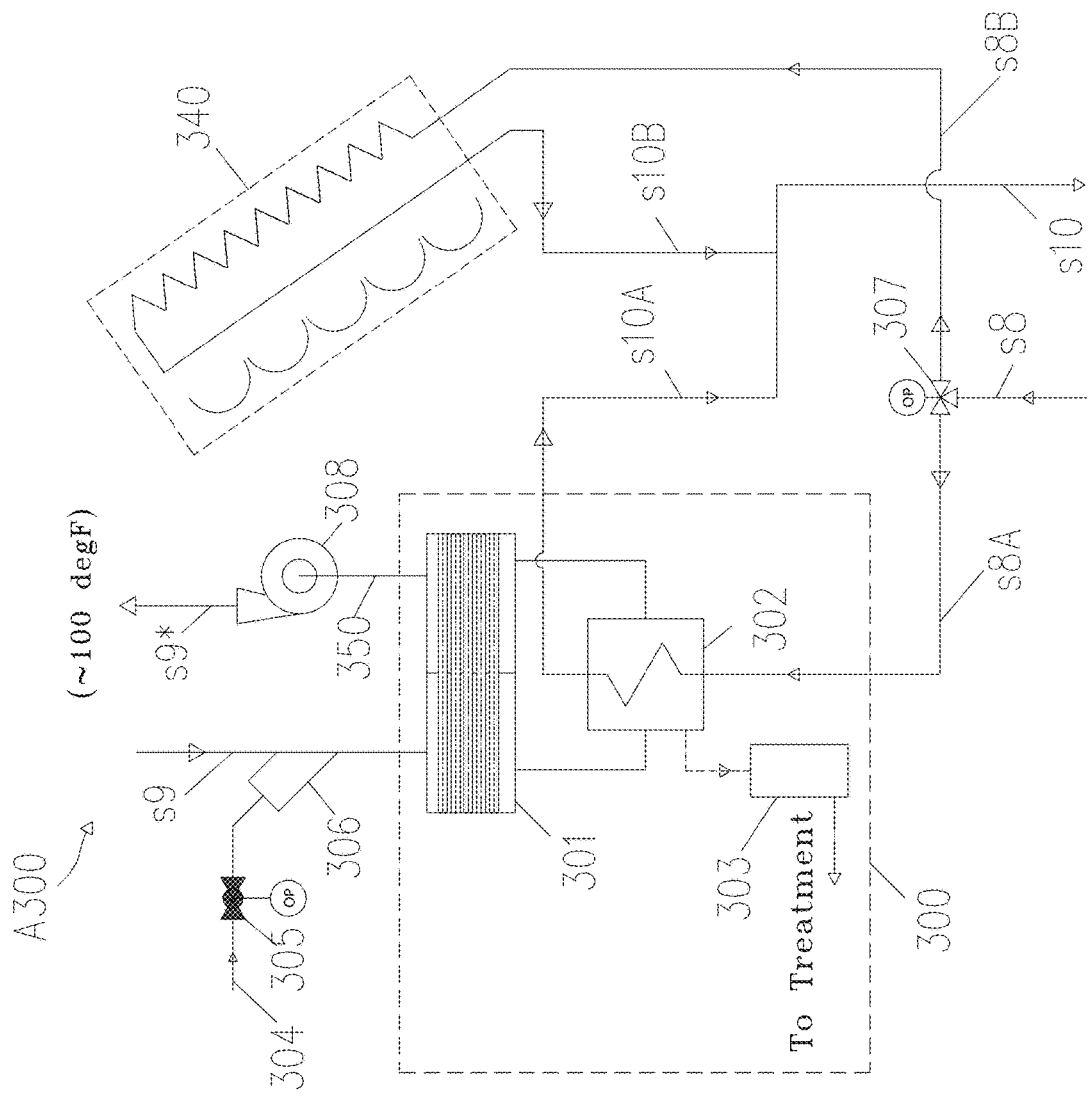
FIG. 5 illustrates a schematic view of at least some exemplary embodiments of the present disclosure (e.g., an exemplary assembly for Input Energy Collection from Sun Energy and Fuel/Waste Heat)

FIG. 5 illustrates an exemplary embodiment of a main heat exchanger 300 (e.g., a main energy absorption assembly A300). Assembly 300 may for example be used in a stand-alone operation or as a part of (e.g., tied in to) a waste heat source from an industrial or commercial facility. Stream s8 (e.g., supercritical preheated stream of the working fluid stream s8) may be directed (e.g., via an operation of a three-way control valve 307) to a fossil energy source to absorb thermal energy in the heat exchanger 302 (e.g., stream s8A) and/or to a solar radiator 340 (e.g., stream s8B). To provide for a substantially complete utilization of a higher heating value of a fuel carried by stream s9 and to maintain a proper exhaust gas buoyancy through a stack of the exemplary disclosed assembly, a heat exchanger 301 (e.g., that may be a finned tube type, or a cross-flow plate type, or intermediate liquid vaporization type) provides initial cooling down of the incoming flue gas stream s9 that may contain in excess of 10% water vapor by weight that will be cooled down by a dry flue gas s9* having about 2% of residual moisture by weight at about 60° F., after it exits heat exchanger 302. In at least some exemplary embodiments in which a water vapor dew point for incoming gas stream s9 may be within an expected 50° F. temperature drop in heat exchanger 301, then a protective coating for the hot side may be provided. In at least some exemplary embodiments in which heat exchanger 302 may be of a tubular design (e.g., that may be similar to heat exchanger 104), stream s8A (e.g., supercritical stream s8A) will absorb sensible and latent heat from stream s9 exiting the hot side of heat exchanger 301 and may cool down to moisture saturation temperatures of between about 50° F. and about 60° F. A substantially total latent heat will thereby be recovered from a flue gas contained by stream s9. Stream s9* (e.g., cooled, low moisture content stream s9) will flow back to cold side of heat exchanger 301, where stream s9* will be reheated to about 100° F. before exiting assembly 300 to the atmosphere. The acidic condensate generated in heat exchanger 302 will be collected in storage 303 (e.g., any suitable acidic wastewater storage housing or device). The collected condensate may undergo pH stabilization followed by mechanical cleaning and/or filtration prior to being used as a service water and may be further subjected to an additional treatment (e.g. reverse osmosis) to produce a potable grade water. A portion of stream s10A (e.g., hot supercritical working fluid stream s10A) after absorbing thermal energy from heat exchanger 302 will be admitted into common stream s10 hydraulically connected to prime mover 401 (e.g., expander) to generate electrical power (e.g., as illustrated in FIG. 1).

In at least some exemplary embodiments in which a power demand may exist while stream s9 is not available and or a greater power output is required that stream s9 may provide, a duct burner 306 may be used to burn auxiliary fuel 304 (for example natural gas, liquid fuels, syngas, biogas, blast gas, etc.) with an input controlled by a modulating valve 305 to achieve a desired and substantially total fuel energy utilization (including energy of the water vapor generated by combustion) and therefore achieving water recovery from the flue gas stream s9 as described above. In such operation the auxiliary fuel supply 304 will match a power demand (e.g. providing proper temperature at a given rate of stream s10 used by the genset assembly A400, see FIG. 1).

In at least some embodiments, concurrently or intermittently, solar energy (e.g., any suitable concentrated type of solar energy) may be absorbed in solar radiator 340 (e.g. similar in design to a solar radiator shown in FIG. 3) by stream s8B (e.g., supercritical working fluid stream s8B), which may generate a stream s10B (e.g., hot supercritical working fluid stream s10B) that may join common stream s10 hydraulically connected to prime mover 401 to generate electrical power (e.g., as illustrated in FIG. 1). Based on power demand and/or sun energy availability, a desired power load may be economically met by utilizing a combination of fuel and ambient (e.g., solar) energy sources. If solar power availability diminishes or disappears (e.g., suddenly disappears for example due to malfunctioning or rapid weather conditions changes), the proposed exemplary disclosed system may change (e.g., immediately switch) its operation to a fossil side that may be included in the exemplary disclosed system. Accordingly, external backup power sources may not be involved with the exemplary disclosed system.

As described above, the exemplary disclosed system may operate as an energy storage for example utilizing only ambient energy sources for its operation and while grid demand is low or fulfilled by other grid (microgrid) electrical power supply sources (e.g., with the help of the intermittent alternative power generators). In at least some exemplary embodiments (as shown in FIG. 5) when grid demand may rise or is to be maintained due to insufficient power supply by intermittent sources, the exemplary disclosed system may switch from a liquid storage operation mode to a full mode of operation relatively quickly (e.g. at least as quickly as peaking gas turbine genset and/or match start time of an internal combustion engine). By doing this grid stability/reliability/resilience will be substantially improved vs. current art.

In at least some exemplary embodiment, the exemplary disclosed system may operate a cycle (e.g., power generation cycle) at moderate up to high supercritical working fluid inlet pressures to the exemplary disclosed prime movers or expanders (e.g. up to 12 times of the air critical pressure) to increase power output while achieving substantially 100% liquification yield of the gaseous working fluids as described above. In at least some exemplary embodiments, a pressure ratio across the exemplary disclosed expanders may not be desired to exceed 10:1. Accordingly, a tandem expander arrangement (e.g., expanders in tandem) may be used for example to fully utilize a highly supercritical working fluid pressure. The relatively large inlet pressures may also produce a significant axial trust and involve the use of low-leakage rate end seals of the expander for example at the high-pressure inlet side.

FIG. 6 illustrates an exemplary embodiment of the exemplary disclosed prime mover arrangement (e.g. preferably expanders type) that may provide for relatively high inlet pressure of the exemplary disclosed working fluid streams s2 and s10. Power generation system 400 may include prime mover with two mirrored impellers having a same direction of rotation, with a common inlet disposed in the enclosure and exhausted working fluid being discharged in opposite directions. A tandem arrangement of high-pressure mirrored impellers 401 and low-pressure mirrored impellers 404 may be connected to a common shaft and be capable of successfully accommodating total pressure drop across prime movers 401 and 404 greater than 10:1. The common shaft may be connected to the exemplary disclosed generator (e.g., electrical generator 410) via a gear assembly 405 that may be for example of a helical-type gear. Auxiliary expander EA of a mirrored impeller design may also be of the tandem arrangement (e.g. EA1 and EA2) to accommodate an overall pressure drop of stream s2 across EA1 and EA2 in excess of 10:1. Auxiliary prime movers (e.g., preferably expanders EA1 and EA2) may also be attached to the common shaft connected to prime movers 401 and 404 and generator 410 through a gear 405. The exemplary disclosed mirrored-impeller arrangement may allow for the axial trust to be canceled out and will eliminate a need for expanders' end seals at the high-pressure inlet side (e.g., low-pressure end seals may be provided, and high-pressure side seals will not be provided). As illustrated in FIG. 6, low-pressure cold end seal vents may be connected into a common header s23 for example to minimize working fluid losses (e.g., as also illustrated in FIG. 1). In at least some exemplary embodiments, the diameter of the exemplary disclosed impellers may be reduced when working fluid bifurcates into mirrored impellers, which will reduce centrifugal forces on the impellers. Inlet vanes 406 may also be provided as illustrated in FIG. 6 (e.g., a common operator may control the mirrored impellers via inlet vanes 406). An efficient operation of electrical generator 410 may be provided via low (e.g., negative) temperature air cooling being provided by stream P1 (e.g., as also illustrated in FIGS. 1, 1A and 1B).

FIG. 6 of an exemplary embodiment of the exemplary disclosed prime movers (expanders type) may alternatively include a combination of prime movers (not shown) capable of converting a thermal and potential energy of a working fluid (enthalpy) of streams s2 and s10 into mechanical (e.g. rotational type energy). In such alternative exemplary embodiments of the exemplary disclosed prime movers the first (e.g. the highest inlet pressure of working fluid) may be any device (e.g., other than expander) capable of converting a thermal and potential energy of a working fluid into mechanical work (e.g., any suitable reaction type turbine of either axial or radial design). In addition, said prime movers assembly 400 as shown in FIG. 6 may have a different arrangement where the highest pressure prime movers (e.g., EA1 and 401) may be connected to a common shaft and the gear and electrical generator (e.g. similar to 405 and 410 as described above) and the lower pressure prime movers (e.g., EA2 and 404) may be connected to yet another common shaft, common gear and common generator (e.g., similar to 405 and 410), thus minimizing the space to install genset 400 as shown in FIG. 6. Similarly, but in addition to the exemplary embodiments described above, the prime movers EA1 and EA2 may be connected to compressor 170 (shown in FIGS. 1, 1A and 1B) whereas as electrical motor driving compressor may be replaced by a motor-generator (not shown) whereas the said motor-generator will provide suitable power should the power for the working fluid recompression be greater that power generated by prime movers EA1 and EA2, or generating additional power when power appropriate for working fluid re-compression is lower than the power generated by prime movers EA1 and EA2.

As illustrated in FIGS. 1 through 6, the exemplary disclosed system such as a cryogenic regenerative power cycle (CRPC) system may be used for stand-alone operation for centralized and distributed power generation, waste heat applications, ambient energy conversion into electrical power, and/or to propel ships and trains. The exemplary disclosed system may be of a lean design (e.g., relatively to supercritical Rankine steam and combined cycle systems). The exemplary disclosed system may also have relatively greater flexibility to respond to grid demand in a short period of time and have a capability to utilize substantially total fuel energy and improve its conversion rate into electricity (e.g., thermodynamic analyses of the exemplary disclosed system indicate a capability of achieving fuel utilization efficiency that may exceed an efficiency of a combined natural gas fired cycle).

Figure 7:
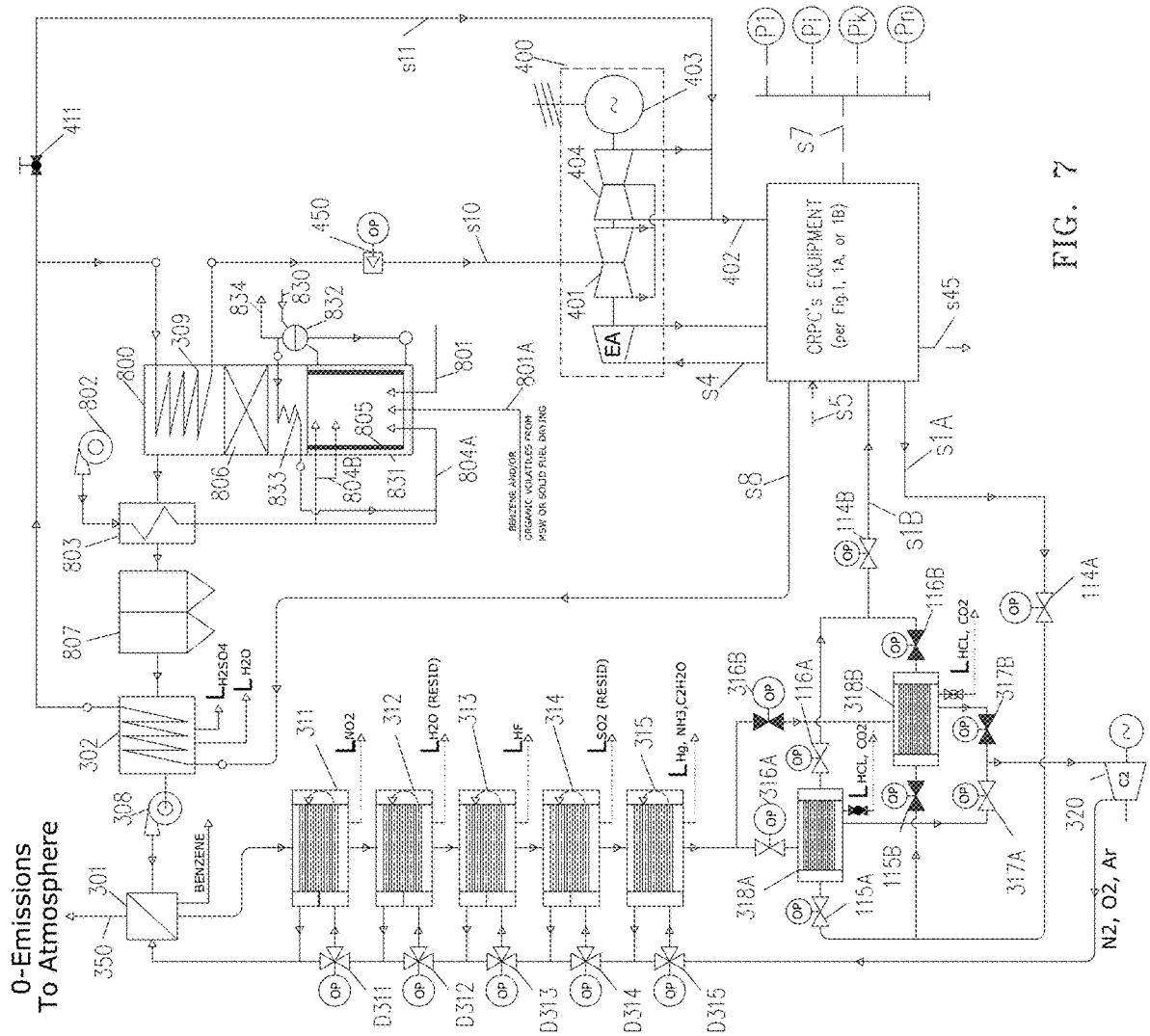
FIG. 7 illustrates a schematic view of at least some exemplary embodiments of the present disclosure (e.g., an exemplary Arrangement of the CRPC system with Hazardous Emissions Removal such as, for example, Zero-Emissions operation, or for Industrial Gases Liquification)

FIG. 7 illustrates an exemplary embodiment of the exemplary disclosed system in which a CRPC system may be in a stand-alone operation configuration to generate power (e.g., primarily from any organic fuel including coal and/or municipal solid waste or MSW) while achieving a substantially zero emissions discharged to the atmosphere. The same zero emissions operation may be naturally achieved when energy used for the disclosed system operation will be obtained from the sun and ambient energy in this exemplary system similar to for example as described above.

As illustrated in FIG. 7, The furnace 800 has fuel supply 801. Furnace 800 may also include a combustion chamber that may be also suitable for solid fuels such as coal, wood, and/or MSW (e.g., may be a fixed and/or fluidized bed, moving grate, or any other suitable configuration). Preheated combustion air in a gas-to-gas heat exchanger 803 may be supplied into furnace 800 by a fan 802. The primary combustion air (e.g., primary air) may be supplied via a conduit 804A (e.g., in a substantially sub-stoichiometric quantity) for example to deliver fuel 801 and/or to promote fuel preheating/pyrolysis/gasification in a lower portion of furnace 800. The lower portion of furnace 800 may be covered by a ceramic liner 805 (e.g., to prevent high-temperature corrosion of the furnace walls). The balance of combustion air may enter the combustion zone via multi-level overfire ports 804B in desired quantities (e.g., that may be biased) while increasing toward an outlet of the lower lined portion of furnace 805 (e.g., achieving low temperature combustion products below about 1400° F. at the exit of the exemplary disclosed lower furnace (e.g. downstream of superheater 833, see below) having substantially greater stoichiometry or a relatively high fuel equivalence ratio in excess of 1.5. This portion of the furnace may also be water-cooled to facilitate cooling of combustion products. A water source may be water recovered in a condensing heat exchanger 302, which will be treated to stabilize pH and filtered before supplying (e.g., via a conduit 830) into a feed water drum 832 and then circulating through a jacket 831 at low pressure that may be no greater than (e.g., less than or equal to) 100 psig. Due to relatively large latent heat at such pressure, the water flow for cooling conduit 830 may be minimized. A portion of steam from drum 832 may be sent to a superheater 833 in quantities of between about 0.1 and about 0.4 pounds per pound of fuel through a primary air conduit 804A for example to assist in a fuel wet gasification process. This may promote endothermic reactions of a given/selected original hydrocarbon fuel conversion to CO and $H_2$ while suppressing NOx and VOC formation, and may also assist in CO oxidation to $CO_2$ through a water-shift reaction. The superheated steam may also be used for furnace wall-blowing to maintain furnace walls cleanliness (e.g., in areas of sub-stoichiometric fuel burnout) and for cleaning (e.g, soot blowing) of high temperature catalysts surface 806 and working fluid super heater 309.

The remainder of a steam portion generated and collected in drum 832 (or substantially all of a saturated steam stream 834) may be used for fuel drying to assist the fuel handling operation and/or for maintaining a flue gas temperature leaving air preheater 803 above a $SO_3$ dew point upstream of a precipitator 807 (e.g., using a steam coil heater to heat air supplied by combustion air fan 802) and/or for heating duties for the operating personnel and other associated facilities. An effluent air and water vapor mixture resulting from fuel drying (e.g. from municipal solid waste storage) may potentially hold hazardous organic compounds that may be sent into furnace 800 for incineration via conduit 801A.

In at least some exemplary embodiments, for example in the case of solid fuel firing, any suitable $SO_2$ suppression reactants may be introduced into lower combustion chamber 831 of furnace 800, together with fuel stream 801, to achieve at least 40% of $SO_2$ reduction. Suitable quantities of oxidizing air stream 804B may be provided to allow for a substantially complete fuel burnout. At desired operating conditions at the exit of the lower furnace (e.g., high excess air) and the desired temperature level, an oxidation of $SO_2$ to $SO_3$, and NO to $NO_2$ may be achieved with the assistance of suitable catalysts 806 including, for example, vanadium, potassium, and/or titanium oxides on silica support. Said conversion may thereby substantially support the elimination of hazardous emissions (e.g. $SO_3$, $NO_2$) by taking advantage of their high condensation temperatures compared to cold working fluid used by the exemplary disclosed CRPC system. Besides, such conversions also allow for a greater fuel chemical energy utilization. Typically, combustion process allows to convert fuel sulfur to $SO_2$ which is typically accounted for in the fuel higher heating value (HHV). The thermal effect of the substantially complete sulfur oxidation to $SO_3$ and then to a sulfuric acid (97%) may increase HHV as follows:

$$2SO_2 + O_2 \rightarrow 2SO_3 + 93.8 \text{ BTU/mol}, \quad (1)$$

$$SO_3 + H_2O \rightarrow H_2SO_4 + 95.7 \text{ BTU/mol}, \quad (2)$$

$$H_2SO_{4(g)} \rightarrow H_2SO_{4(L)} + 65.4 \text{ BTU/mol}, \quad (3)$$

The thermal effect of NO to $NO_2$ conversion is also positive but is negligible compared to $SO_2$ conversion to the trioxide.

Figure 7A:
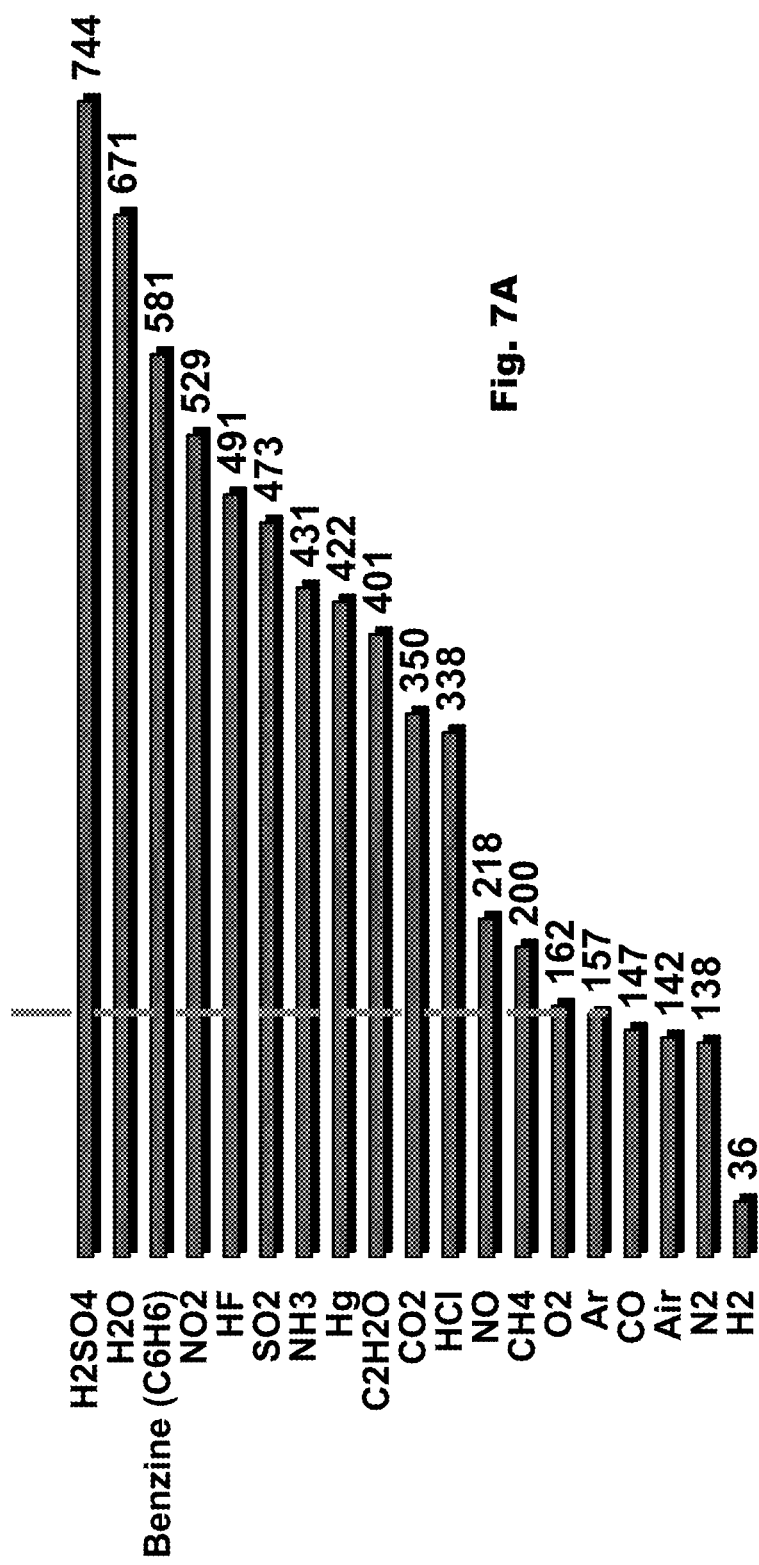
FIG. 7A illustrates a graphical view of condensation temperatures for common hazardous gases and $CO_2$ at ambient pressure compared to working fluid temperature used in the present disclosure (e.g., exemplary condensation temperatures of gases)

The ability of the exemplary disclosed CRPC system to utilize low temperature heat may allow collection of more energy from sulfur-containing fuels by the above reactions (1,2,3) in addition to the fuel's reported HHV. Such an increase with respect to HHV may be on the order of 0.1% for low sulfur coal or 0.3% for high sulfur fuel such as Petroleum coke and municipal solid wastes. Various hazardous pollutants of combustion products may be condensed at low temperatures. For example, at atmospheric pressure the $H_2SO_4$ condensation temperature may be about 285° F., whereas for $NO_2$ the condensation temperature may be about 70° F. Therefore, preheating of the supercritical working fluid by the flue gas exiting furnace 800 after passing through air-preheater 803 and precipitator 807 (e.g., an electrostatic type) may allow collection of the extra thermal energy generated by reactions (1,2,3) and also condensing or liquifying of the sulfuric acid (~97% concentration) and liquid $NO_2$ (e.g., thus producing valuable commodities for the chemical and pharmaceutical industries consumption). For example, FIG. 7A illustrates condensation temperatures (in Rankine degrees) of various substances and pollutants at atmospheric pressure. The vertical dashed line of FIG. 7A corresponds to the lowest working fluid temperature (e.g., supercritical cryogenic nitrogen) that in some exemplary embodiments (FIG. 1, 1A, 1B) of CRPC may produce for the purpose of pollutants removal/liquification from the combustion and industrial waste gases exhausts including $CO_2$. For example, the major pollutants may have condensation temperatures greater than the dashed line indicates and may be removed in a single physical process without any additives (e.g., provides a benefit by avoiding use of current multiple emissions control technologies as explained above). When applied to new construction or an existing plant (e.g., for the waste heat recovery from combustion products), the exemplary disclosed CRPC system will improve the efficiency of the fuel utilization by increasing power generation for the same fuel input while removing emissions from the plant exhaust gases. The exemplary disclosed CRPC system may also provide additional profit for the sale of the valuable byproducts while indirectly reducing the environmental impact by industries that use fuel and energy to produce such byproducts substances elsewhere.

In at least some exemplary embodiments and as illustrated in FIG. 7, the exemplary disclosed system may provide for sequestration of pollutants (e.g., byproducts) by a single condensation process by a cold energy regeneration/recuperation to achieve major combustion pollutants liquification. This may be realized by introduction of cold stream s1A originated from stream s6 (e.g., as also illustrated in FIGS. 1 and 1B) through control valve 114A that may deliver the cold supercritical working fluid stream s1A into one of two tube and shell heat exchangers 318A and 318B operating in a batch mode serving as condensers for $CO_2$ and HCL contained by combustion products produced in furnace 800. Heat exchanger 318A may operate to collect a liquid and solidified (e.g., frozen) $CO_2$ and HCL due to a cooling effect of stream s6. Heat exchanger 318B may undergo surface regeneration to remove solid $CO_2$ and HCL that may have resulted from its previous operational cycle. The heat exchanger surface regeneration process may be similar to as described above regarding FIG. 4. Alternatively, ceramic electrical heaters, which may be installed within an internal space of heat exchangers 318A and 318B, may gradually raise an internal temperature of a "bottled" (e.g., hydraulically isolated) heat exchanger that may undergo regeneration above the freezing point for each component (e.g., thus producing first a liquid stream of HCL followed by the stream of a cold liquid and gaseous $CO_2$). The gaseous $CO_2$ may be further pressurized to (or above) 5.2 bars (75 psia) to be sequestered in a liquid phase. Any suitable pressurization process and equipment may be utilized. Possible cross-contamination of $CO_2$ and HCL streams may be handled by any suitable liquid separation processes for example in the case of HCL and a liquid gas-liquid separation for $CO_2$ after its pressurization (e.g., or any other commercially available processes). A coordination of isolation valves positions of valves 115A and 115B, valves 116A and 116B, valves 316A and 316B, valves 317A and 317B, and/or a temperature profile during operation (e.g., regeneration/de-icing) of heat exchangers 318A and/or 318B may be maintained by a programmable controller (e.g., based on the heat exchanger exit temperatures and/or the effluent concentrations of $CO_2$ and HCL).

In at least some exemplary embodiments, purified gas leaving condensing heat exchangers 318A (e.g., or heat exchanger 318B depending on operating status) may be further pressurized by a compressor 320 to attain a temperature of about minus 90° F. and may then be recirculated back into an array of condensing shell-and-tube or plate heat exchangers 301, 311, 312, 313, 314, and 315 (e.g., to be reheated to about 100° F. before this substantially emissions-free exhaust may be discharged to the atmosphere via stack 350).

Three-way modulating dampers D311, D312, D313, D314, and D315 may control cold energy admission into condensing heat exchangers 311 through 315 based on correspondent flue gas exit temperatures and/or pressures to provide liquification of hazardous species (that are prefixed by letter "L" in FIG. 7) such as $NO_2$, residual $H_2O$ (e.g., ice), hydrogen fluoride (HF), residual $SO_2$, Hg, ammonia $NH_3$, and $C_2H_2O$ (formaldehydes). The term "residual" provided on FIG. 7 may underscore that trace spices may have escaped the conversion to $SO_3$ and sulfuric acid thus could not be condensed in heat exchanger 302.

Stream s1B after absorbing energy from heat exchangers 318A or 318B may return back to the cryogenic cycle (e.g., working fluid stream s6) where it may further absorb the energy from the surroundings (e.g., ambient air and/or sun as illustrated in FIGS. 2 and 3) and will generate cold energy stream s7 which may be used throughout the plant (e.g., as described above). Thusly preheated working fluid stream s8 may be further supplied into heat exchanger 302 where it will cool the combustion products that are practically free of ash particles (e.g. after removal of at least 99% of the particulates in precipitator 807). The evacuation of combustion products from furnace 800 through air preheater heater 803, precipitator 807 and condensing heat exchanger 302 is ensured by forced draft fan 802 and induced fan 308 (balanced draft system). In heat exchanger 302, cooled and purified combustion products undergo cooling by stream s8, which will cause first condensation of a highly concentrated (e.g., approximately 97%) sulfuric acid and then acidic water that may be collected and purified to at least a technical grade as for example described above regarding FIG. 5. A portion of the purified water together with clean condensate returning from the indirect fuel drying in fuel handling system, steam coils and HVAC (e.g., as described above) may be stored as a make-up water for lower furnace 831 cooling. The make-up water may be pumped through conduit 830 to drum 832 for lower furnace cooling to maintain a desired water inventory in cooling jacket 831. Any suitable purification and treatment equipment may also be included.

Heat exchanger 302 may include at least one heat exchanger as shown and may be equipped with internal separators of an inertia-type to remove sulfuric acid and water from the gaseous stream of combustion products. Alternatively, heat exchanger 302 may be a set of two heat exchangers with the same type of separators. After giving up the sensible and the latent heat of the moisture and the sulfuric acid, the flue gas may enter heat exchanger 301 where a further condensation of the combustion products leaving heat exchanger 302 may take place by preheating emission-free effluent gas exiting heat exchanger 311 in the heat exchanger 301 before it has been released to the atmosphere having improved buoyancy. The cooling of combustion products downstream of exhaust fan 308 in heat exchanger 301 may result in condensation of the remaining water vapor and/or a portion of VOC substances such as benzene. The latter may be then returned to furnace 800 via conduit 801A to supplement fuel input.

Stream s8 may attains its final reheating in coiled tube bundles 309 that may be designed using any suitable supercritical steam superheater design techniques. Heated to about 800° F., stream s10 (e.g., supercritical stream s10) may pass through a throttling valve 450 that controls admission of the working fluid into genset 400 (e.g., which may have tandem expanders arrangement of a mirrored design for example as described above regarding FIG. 6), where working fluid may expand and leave a last set of expanders at a temperature below 0° F., converting its potential and kinetic energies into electrical energy via mechanically-connected electrical generator 410. The exemplary disclosed process of substantially 100% working fluid liquification and the benefits of electrical generator cooling by the cold air stream s7 may be similar to as for example described above.

Furnace 800 for example when firing gaseous and liquid fuels may involve no water-cooling and/or catalyst for $NO_x$ and $SO_x$. Instead for example, the lower furnace exit temperature may be controlled by an excess air and water injection while firing at a much lower combustion temperatures (e.g., below 1700° F.) where thermal NOx formation may not occur (e.g., primarily a prompt $NO_x$ may be generated at such temperatures).

The exemplary disclosed integration of the zero-emissions fossil power plant based on a CRPC system (for example as illustrated in FIG. 7) may utilize a total higher heating value of a fuel (e.g., including the latent heat in moisture for power generation), may recover a supplemental energy of $SO_2$ oxidation to $SO_3$ and then to sulfuric acid and the latent heat of its condensation, and may utilize a portion of VOC such as benzine and the total energy of the contaminated by organic volatiles produced by drying of MSW, coal, or wood as represented by stream 801A.

As an alternative to the exemplary disclosed catalyst type 806 described above, a regular SCR catalyst may be used with ammonia or urea injection to control NOx emission out of the lower furnace. In such a case, the location of catalysts 806 and supercritical working fluid heating coils 309 will be swapped to match the temperature range of SCR catalyst operation.

The exemplary arrangement of the plant illustrated in FIG. 7 may be utilized for a new construction of a power plant. The exemplary disclosed CRPC system may also be retrofitted into an existing coal or MSW plant to improve fuel utilization efficiency and substantially minimize an impact on the environment. For example, if the exemplary arrangement illustrated in FIG. 7 may be retrofitted to a supercritical steam power plant burning coal (e.g., starting from an addition of heat exchanger 302 and other related downstream equipment while recovering the waste thermal energy in the CRPC system), then a zero-emissions operation may be achieved with about 6% of the total power output increase due to waste heat recovery from the combustion products that may typically represent about 10% of the fuel energy (HHV). The exemplary disclosed system in FIG. 7 may for example provide a further increase in efficiency of fuel utilization at the said supercritical coal fired steam power plant of up to 15% while having the same or better environmental performance. In such an exemplary retrofit of the CRPC system, the typical SCR catalyst may be replaced with the exemplary disclosed catalyst described above, which will not use ammonia/urea for NOx control and/or limestone for SOx control. In addition, the exemplary disclosed system may provide for sales of valuable commodities such as sulfuric and hydrochloric acids, mercury, and hydrogen fluoride.

In at least some exemplary embodiments, a supply of cold energy by stream s6 generated by the exemplary disclosed CRPC system may minimize a power consumption and increase a liquification yield of air separation processes or other gases liquification. The energy of the gases to be liquified may be absorbed by stream s6 for the purpose of power generation by the exemplary disclosed CRPC system. This energy may be used to drive the exemplary disclosed liquification process itself with the excess of energy being supplied to the grid or to other local users. Solar energy may also be used in parallel with heat exchanger 302 to preheat stream s8, which may further offset fuel costs.

In at least some exemplary embodiments, for liquification applications, a gas to be liquified may be used as a working fluid for the exemplary disclosed CRPC system. An operation of the exemplary disclosed CRPC system may remain substantially the same as described in FIGS. 1 and 1B where cold streams s1A and s1B or streams s2A and s2B as shown in in FIG. 1A may be used to precondition a raw feed gas such as $N_2$, $O_2$, methane, $CO_2$, and/or other suitable gases by cooling them down to near cryogenic or a cryogenic temperature range that may be subsequently sent to complete their liquefaction in a suitable cryogenic processes and equipment (e.g., Claude, Collins) but will not require a compressor or compressors, a major power consuming component of a current liquification systems. The power generated by CRPC cycle will cover the power needs to achieve full liquification of thusly preconditioned raw feed gases while generating a surplus of energy to be sent to a grid/microgrid for other local users. Any liquified gas that matches the list of the preferred gases to be used in CRPC may be used to improve operation of the cryogenic assembly A100 or be sent directly to the liquefied gas storage 100 or 106 (See FIG. 1A) as a make-up flow to compensate system's uncontrolled leakages.

In the arrangement similar to one shown in FIG. 7 and in combination with other exemplary disclosed system embodiment in FIG. 1A more emissions may be removed from the combustion products or more industrial gases may be liquified (e.g., such as NO and combustible hydrocarbon compounds or volatiles such as CH4 and/or natural gas). In such an exemplary arrangement, the source of the cryogenic flow may be stream s2A, which may be a portion or essentially total stream s0 (FIG. 1A) diverted by the modulating three-way valve 114 to the last heat exchanger of an extended array condensing shell-and-tube or plate heat exchangers (e.g. similar to 301, 311, 312, 313, 314, and 315). In such an exemplary arrangement the working fluid can be selected from cryogenic liquified gases such as air, nitrogen, and/or oxygen.

Figure 8:
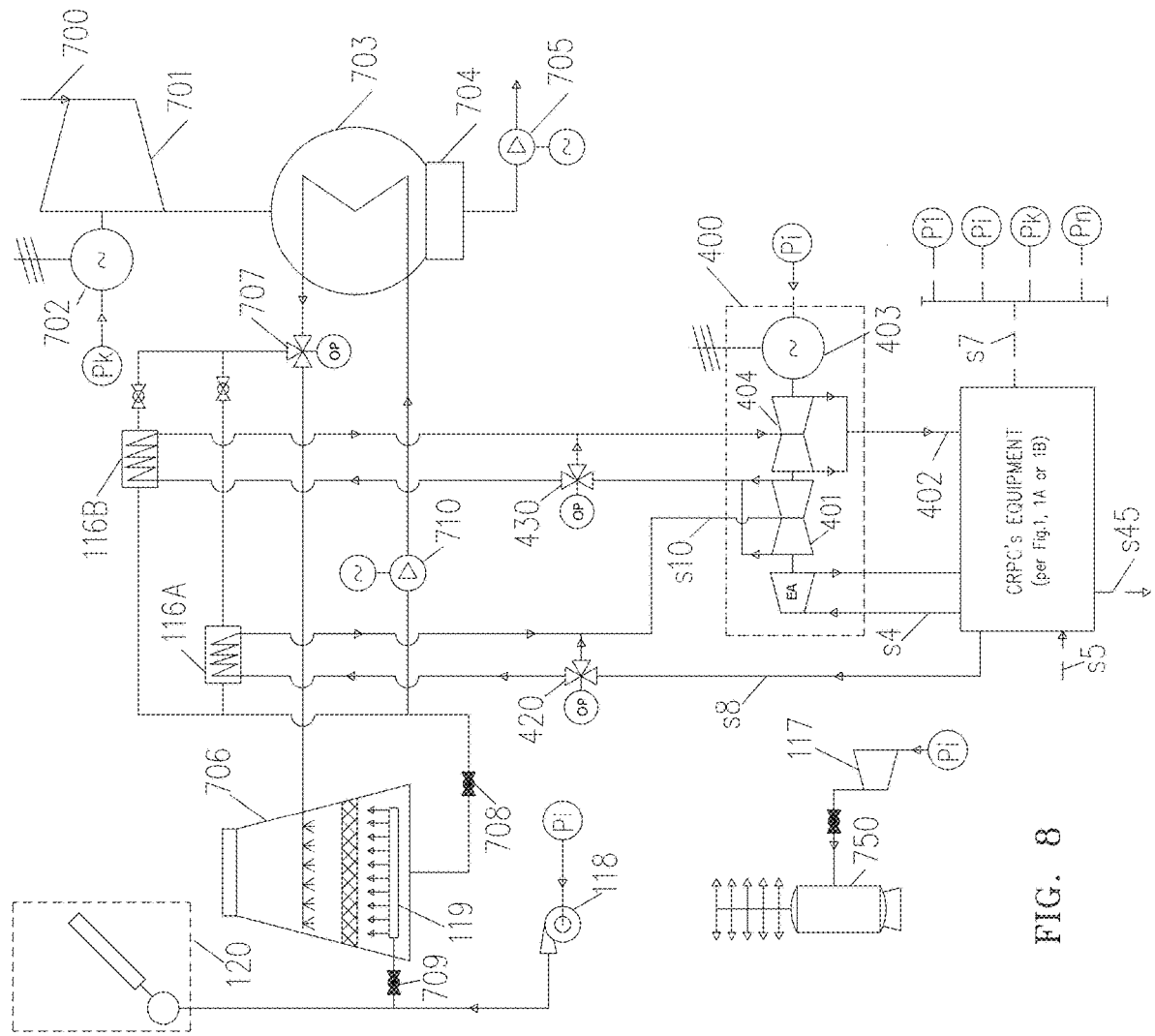
FIG. 8 illustrates a schematic view of at least some exemplary embodiments of the present disclosure (e.g., an exemplary Integration of CRPC system with Low Temperature Waste Heat from Power Plants released to atmosphere by Steam Condensers or Geothermal sources)

In at least some exemplary embodiments and as illustrated in FIG. 8, the exemplary disclosed system may be used for waste energy recovery from condenser water of a plant such as a fossil or a nuclear power plant (e.g., for plants having a loss of fuel energy that may reach 50% for a fuel-fired steam power plant and up to 60% for a nuclear power plant). FIG. 8 illustrates an exemplary system for recovering this essentially large quantity of low temperature energy from condenser cooling water. The exemplary disclosed system may absorb the sensible and the latent heat remaining in low pressure steam exhausted into a condenser 703 by a steam turbine 701 after steam flow 700 converts its energy into mechanical energy in turbine 701 to produce electrical power via electrical generator 702. Low pressure and temperature steam in condenser 703 undergo cooling (e.g., condensation) by circulating water (i.e. condenser cooling water); an exit temperature of the condenser cooling water may not exceed 100° F. The condenser cooling water may, for example, be sent to a cooling tower 706 or to a body of water such as a river or a lake, etc. The cooled water from cooling tower 706 (e.g., or a body of water) is then pumped by a circulating pump 710 back to condenser 703. The condensed steam may be collected in a housing 704 (e.g., a hot pot 704) and then is transferred (e.g., sent) back into the process by a low-pressure condensate pump 705. Because water may freeze at 32° F., a relatively narrow operating temperature range may be available for the exemplary disclosed CRPC system, and a relatively large quantity of the working fluid stream may be used to cool down the condenser water to about 35° F. (e.g., when working fluid in the CRPC system may be supercritical air or nitrogen). Pumps and storages used in such waste heat recovery systems may accordingly be relatively large. The system size and costs may be minimized by reducing the quantity of the working fluid used to achieve at least 60% of this waste energy recovery from the exemplary disclosed condenser water cooling circuit. For example, the exemplary disclosed system may use binary working fluid cycle (e.g., as illustrated in FIG. 1A) in which methane, $CO_2$, or any other suitable gas is used as a working fluid in the power cycle that in the supercritical state has thermal capacity corresponding to (e.g., closely matching) or greater than the thermal capacity of the water. Further, for example, the exemplary disclosed system may bifurcate the hot condenser water stream leaving condenser 703 to subject the working fluid to an intermediate reheating between the higher and lower pressure expanders.

In at least some exemplary embodiments and as illustrated in FIG. 8, working fluids such as air and nitrogen may be used (e.g., or other suitable gases providing suitable operational safety). The bifurcated condenser cooling water (e.g., after absorbing the condensation heat from condenser 703) may transfer its energy to the supercritical working fluid of the CRPC plant via heat exchangers 116A and 116B. Stream s8 may first cool down condenser water passing through heat exchanger 116A and leave heat exchanger 116A as heated stream s10 that will expand through a first set of expanders 401 (e.g., that may be of a mirrored-impeller configuration) and may leave expanders 401 at a maximum temperature of about 30° F. (e.g. lower exit temperature may be used followed by working fluid reheat by ambient energy to about 30° F. as explained in FIG. 2 before entering heat exchanger 116B). Following the expansion in prime mover 401 (that may also be followed by the ambient energy reheat up to 30°

F., not shown), working fluid stream s10 may be further reheated in heat exchanger 116B recovering the remaining energy of the bifurcated circulation water stream from condenser 703, and then expanding through at least one set of expanders 404 (e.g., that may be of a mirrored-impeller configuration). Both expanders may be connected to generator 410 to produce a substantial amount of electrical power relative to the power generated by the main power plant (e.g., may double its electrical output) when the busbar, step-up transformers, and/or power lines may receive such increased load. Alternatively, for example, a main plant may be operated at a reduced fuel consumption corresponding to rated plant capacity of about 50% to match its existing power generation and transmission capabilities.

In at least some exemplary embodiments, due to reduction in fuel consumption, an about 50% of $CO_2$ rate reduction per MWh of total/combined power generation may be provided in the case of fossil power plant applications. The portion of the power generated by the CRPC system may be quickly reduced (e.g., run back) or increased to meet a fluctuating grid demand, while allowing main power plant to operate at the same load. A short time response to grid demand may be provided for the base load power plants operating with the exemplary disclosed system as add-on system (e.g., for nuclear or fossil power plants). In a run-back mode of operation, some or substantially all of the condenser water may bypass heat exchangers 116A and 116B (e.g., sending the balance of condenser water to a cooling tower (e.g., an existing cooling tower or body of water). The condenser water flow distribution may be controlled by a three-way modulating valve 707 while a normally closed valve 708 will open (e.g., to maintain a desired circulating water supply to condenser 703). Depending on a desired or pre-determined rate of demand reduction, a modulating by-pass valve 430 may reduce the working fluid flow to reheat heat exchanger 116B. Should a greater reduction be desired, bypass 430 may completely open, sending a cold stream of working fluid to expander 404 while a prime bypass valve 420 may modulate to reduce flow to heat exchanger 116A. Should no external power generation be occurring (e.g., due to lower demand), valves 420 and 430 may be positioned to be open (e.g., wide open) and the system may switch into working fluid generation mode (e.g., storing working media in tank 100 and 175 shown in FIG. 1 while satisfying its own power criteria for such operation). The exemplary disclosed CRPC system may utilize ambient energy in stream s5 and/or power generated by a plurality of solar panels 120 (e.g., as described below), while still maintaining a cooling load supply and a plant air system supply (e.g., as described below). In at least some exemplary embodiments, should an excess of cold stream s7 be available, it can be disposed in the exemplary disclosed cooling tower via distributer 119 to augment the cooling. Should grid demand increase, the exemplary operation described above may be executed in a reversed sequence. The exemplary disclosed CRPC system may be in continuous operation and may increase its power output in a relatively short time compared to the base load plant (either fossil or nuclear steam power plant).

In at least some exemplary embodiments, the exemplary disclosed CRPC system may maintain condenser water entering condenser 703 at a few degrees above the water freezing temperature in any season of the year and/or given geographic location. A relatively low pressure may thereby be maintained in condenser 703, which may increase electrical output of main plant generator 702 for a same amount of fuel burnt (e.g., further reducing fuel consumption based on providing desired main power plant efficiency and by substantially eliminating the effect of seasonal circulating water temperature fluctuations).

As described for example above, stream s7 (e.g., waste low dew point cold air stream s7) may be used to directly cool electrical generators (e.g., for generators of equal to or less than 350 MW) and may indirectly cool larger generators (e.g. 702, 410). Stream s7 may also provide a dry air source with a dew point of minus 40° F. or lower. After suitable pressurization in compressor 117, stream s7 may be used by plant air system 750 (e.g., having quality equal to or better than instrument air quality).

In at least some exemplary embodiments, an excess of cold air stream s7 may also be used to generate power via solar panels 120 constructed of either photovoltaic (PV) or thermoelectric (TE) and to improve their ability to convert solar energy into electricity via deep cooling of the back end of solar panels 120. Alternatively, for example, cold air stream s7 may be transferred to the exemplary disclosed cooling tower via a valve 709 and distributor 119 to augment condenser water cooling during periods of low grid load demand.

Figure 9A:
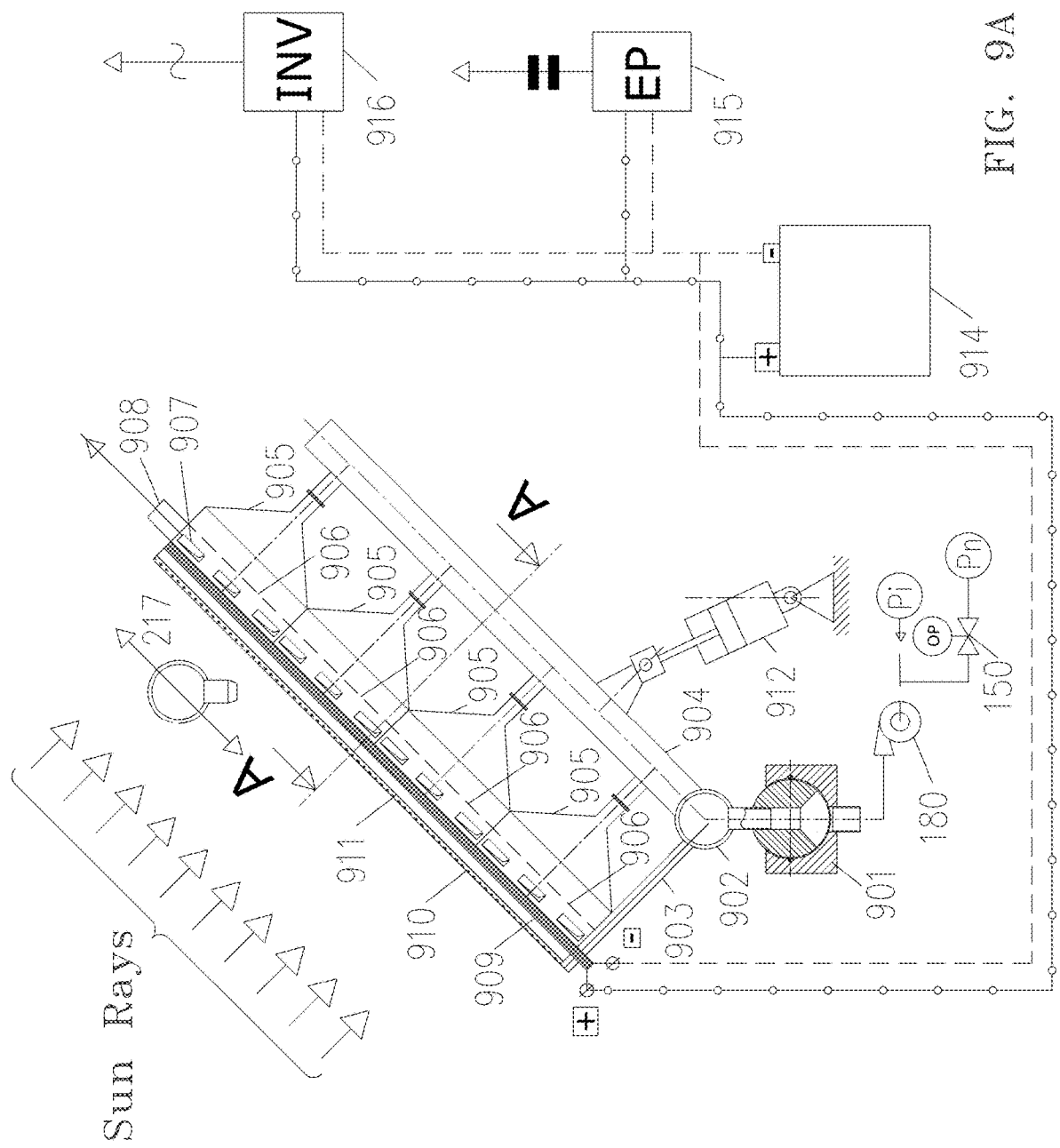
FIG. 9A illustrates a schematic view of at least some exemplary embodiments of the present disclosure (e.g., an exemplary Direct CRPC Waste Cold Energy Conversion to Electric Power application)
Figure 9B:
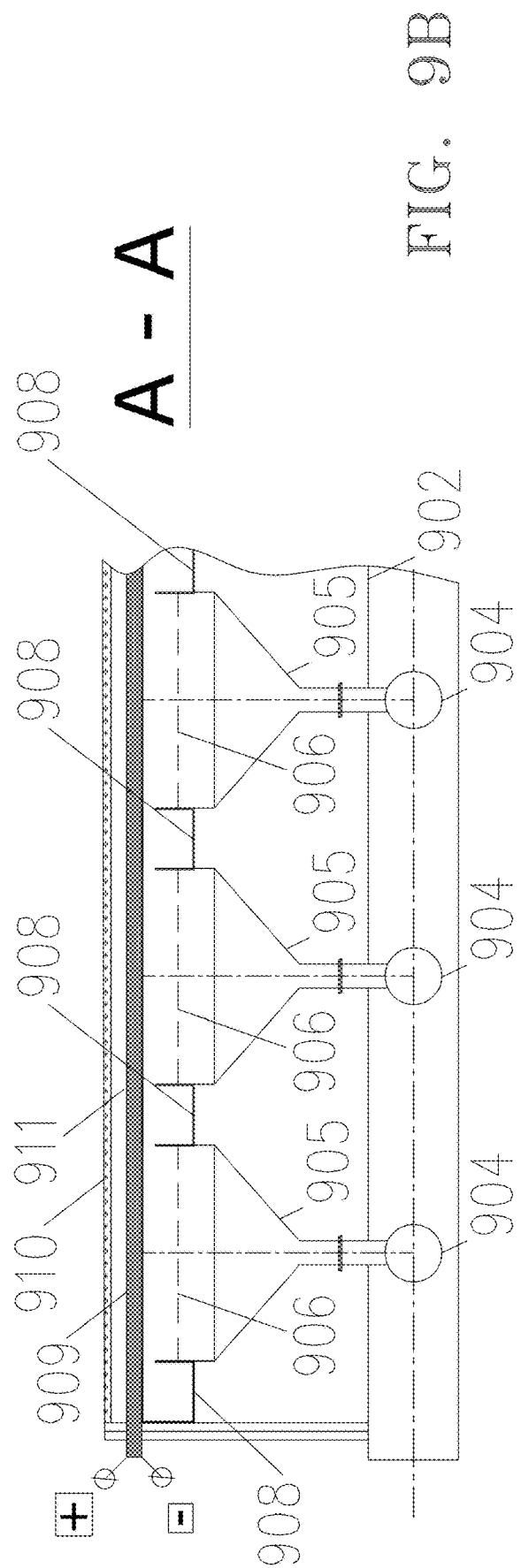
FIG. 9B illustrates a sectional view of the exemplary application of FIG. 9A.

In at least some exemplary embodiments, direct conversion of solar power may be provided as illustrated for example in FIGS. 9A and 9B. FIGS. 9A and 9B illustrates an exemplary disclosed solar panel assembly that may exploit an array PV or TE elements 909 supported by a frame 903. As also described above regarding FIG. 3, a space 910 disposed between PV or TE surface 909 and a strong transparent cover 911 (e.g., made of polycarbonate or similar material) may be filled with low dew point diatomic gas or gases to prevent ice from forming directly on PV or TE surface 909. Ice formation and dirt accumulation on the exterior of cover 911 may be substantially prevented or reduced as described for example above regarding FIG. 3 (e.g., including movable robotic spray jet assembly 217 and/or a feed and circulation system for diatomic gas). At least a portion of cold low dew point air streams Pi taken from stream s7 (e.g., as described above regarding FIGS. 1A and 5) may be boosted by fan 180 that may be connected to a ball swivel joint 901 and a header 902 (e.g., stream Pn may also be transferred via valve 150). Header 902 may have one or more risers 904, with each riser 904 being connected to at least one heat exchanger 905 (e.g., jet-type heat exchangers 905) that may be equipped with perforated plates 906 forming a plurality of jets impinging on a high thermal conductivity dielectric substrate on which PV or TE elements may be installed. After absorbing incident radiant heat flux, heated subcooled air taken from stream s7 may be transferred (e.g., evacuated) through side slots 907 into a plurality of exhaust headers 908, through which the heated dry air may exit into the atmosphere. Size of openings in the perforated plate 906, their spacing, and a distance to the impinging surface may be configured so that suitable heat transfer (e.g., an optimum heat transfer coefficient) is provided. In at least some exemplary embodiments, a plurality of pins and fins integral to the said dielectric substrate may alternatively be used to achieve high heat transfer rates with the cold air generated by CRPC system. A swivel connection 901 together with actuator 912 may allow adjustment of a tilt angle. In addition, this exemplary assembly may be installed on a horizontally rotating base. In such arrangement the disclosed exemplary assembly will be able to follow the sun during different seasons and day hours in various geographic locations while maintaining an optimum incident angle (e.g. the closest possible to perpendicular) of sun's rays on the power generating panels.

In at least some exemplary embodiments, a high intensity energy heat sink on the back side of the solar panels in the negative temperature range may be maintained, which will provide a substantial increase in an amount of energy absorbed (e.g., and consequently the net power generated). For example, a concentrated solar power generator may be utilized. The generated energy (e.g., direct current) may be stored by batteries 914 and/or transferred to direct current distribution panel 915 (e.g., to fulfil DC loads at a power plant or for the CRPC system itself). An excess of DC power may be converted to AC by inverter 916, for example to supplement either power generation or low voltage users within the plant (e.g., thus minimizing power consumption generated by fuel and increasing net plant electrical output).

Figure 10:
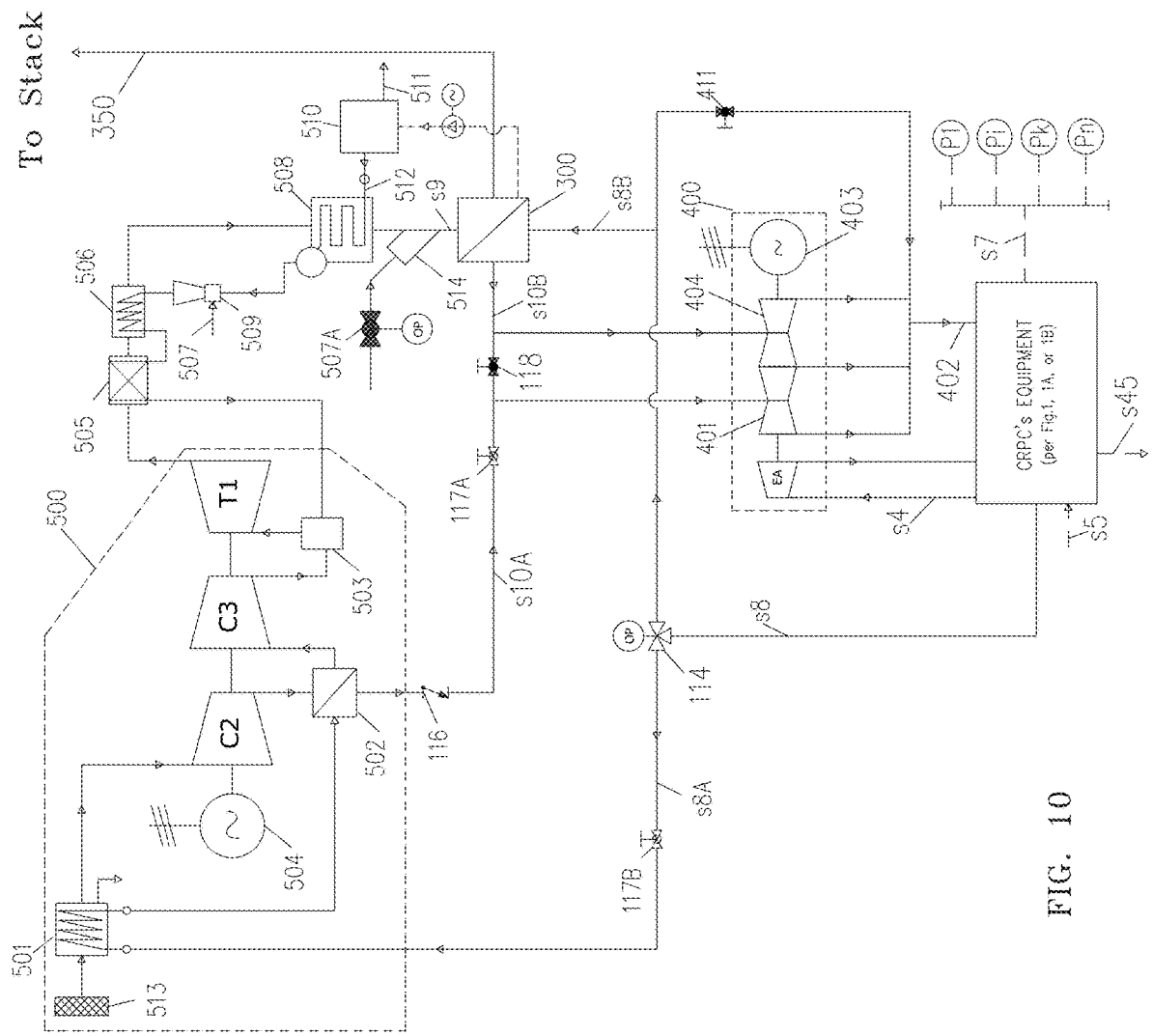
FIG. 10 illustrates a schematic view of at least some exemplary embodiments of the present disclosure (e.g., an exemplary Integration of CRPC system with Prime Movers for a Combined Heat, Cold and Power generation)

In at least some exemplary embodiments, waste heat may be utilized by the exemplary disclosed CRPC system to provide advanced, higher efficiency combined power generation for centralized or distributed power generation and/or for combined heat and power generation, e.g., via integration with either gas turbine and/or Reciprocating Internal Combustion Engines (RICE). FIG. 10 illustrates an exemplary gas turbine genset 500. Following intake air cleanup from possible excess of rainwater and dust in an assembly 513, an ambient air cooler 501 that may be cooled by supercritical stream s8A will be added to the exemplary disclosed system to maintain constant cold inlet air temperature to a compressor C2 of genset 500 (e.g., regardless of season and geographic location) at least below 0° F. (e.g., while condensing excess water held by air). This way, major gas turbines derating at temperatures above reference design temperature of 60° F. may be avoided, and work in gas turbine compressor C2 will be reduced (e.g. compare to referenced design conditions) thus increasing net power generation by genset 500. To minimize parasitic compressor power use in gas turbine installations, an intermediate cooler 502 of hot air exiting low-pressure compressor C2 is used before compression continues in a high-pressure section C3 that delivers heated high-pressure air to combustion chamber 503. In the disclosed exemplary arrangement the energy of the intermediate cooling is not wasted (e.g. unlike in current art) and may now be absorbed by stream s8A to become a part of the heat input (e.g., will not be an energy loss) utilized by at least one expander 401 (e.g., thereby contributing its energy to the power generated by CRPC genset 400).

Fuel 507 may be supplied directly into combustion chamber 503, where it will burn to increase combustion products (gas turbine working fluid) temperature that will subsequently expand in a turbine T1, thereby generating electrical power by a generator 504 that may be coupled with common shaft connecting compressors C2, C3 and turbine T1 via a gear (not shown). In at least some exemplary embodiments (e.g., to avoid negative impact on construction and operating costs regarding NOx emission control by SCR), a partial reforming of the natural gas by steam in a combustion zone may be utilized. NOx reduction may be provided based on conversion of parent fuel (e.g., methane) into CO and $H_2$ by the following endothermal reactions:

$$CH_4 + H_2O \leftarrow \rightarrow CO + 3H_2 \quad (R1)$$

$$2CH_4 + 2H_2O \leftarrow \rightarrow 2CO + 6H_2 \quad (R2)$$

A net thermal effect of the combustion after burning the 100% reformatted fuel (e.g., the products of reactions R1 and R2) may result in about 7% to 8% fuel savings and $CO_2$ reduction. This process of energy recovery from the Brayton gas cycle (e.g., thermo-chemical recuperation) may utilize Pt—Ni based catalyst to assist above reactions R1 and R2.

In at least some exemplary embodiments and as illustrated in FIG. 10, the exemplary disclosed system may include a platinum-based catalyst 505 to achieve substantially 100% natural gas reforming by steam according to above reactions R1 and R2 while absorbing significant energy due to endothermic nature of the reactions. The exemplary disclosed system may also include a preheater 506 to increase a temperature of the fuel and steam achieving a partial completion of above reactions R1 and R2 at high turbine exhaust temperatures. The exemplary disclosed system may also include a stream generator 508 (e.g., a relatively small heat recovery steam generator 508) to supply steam according to a mass ratio range of 0.5 to 1.5 times relative to fuel mass. The exemplary disclosed system may also include a thermo-compressor 509 to pressurize lower fuel pressure stream 507 (e.g., as compared to a pressure in combustion chamber 503). Use of a thermo-compressor (e.g., a jet compressor) may avoid the use of an electrically driven gas compressor and may be applicable for turbines that operate under a relatively low and medium pressure ratio range of 2.5 to 15.

As illustrated in FIG. 10, a substantially full waste heat recovery may be provided by heat exchanger 300 (e.g., as described above regarding FIGS. 1, 1A, 1B, and 5). Heat exchanger 300 may utilize low temperature waste heat (e.g., including substantially all of the latent water vapor heat and a majority of the sensible energy in the combustion product exiting gas turbine genset 500) where the reduced fuel consumption may have already been achieved due to waste heat recovery equipment 505, 506, 508, and due to reduced power consumption associated with 509 intercooling 502. The latent heat of the combustion products in the exemplary disclosed system may double (e.g., compared to other combustion of other systems) based on thermochemical fuel conversion by reactions (R1, R2) to produce a low-NOx combustion. This may substantially increase the flow rate of stream s8B and accordingly increase the power generated by expander 404 connected to expanders EA and 401 and generator 410. Supercritical working flow s8B may recover up to 99% of the moisture in combustion products, which may be pumped to a water treatment facility 510. A dry flue gas stream 350 (e.g., at about 100° F.) will be discharged into the atmosphere with minimum emissions (e.g., single digit NOx ppm) and at ambient level water vapor content. The amount of water recovered from the combustion gases will be sufficient to run the modified combustion process, i.e. will have an adequate water availability 512 that following treatment in 510 will be supplied to steam generator 508. Any water surplus of treated water generated 511 may be used for any technical and domestic local uses). An initial single first fill of water may be provided during commissioning.

The exemplary disclosed system may also provide operational flexibility. While gas turbines may average 5 years between full overhauls due to high operating temperatures, the expected frequency of major overhauls for the exemplary disclosed CRPC system may be about 15 years. During gas turbine overhaul, isolation valves 117A and 117B may be closed and valve 118 may be opened to allow the CRPC system to run on heat inputs via duct burner 514 (e.g., fuel may be controlled by valve 507A and/or from ambient energy collected by assemblies 200 and 300 as described in FIGS. 3 and 5).

In at least some exemplary embodiments, the exemplary disclosed system will have a fuel efficiency of combined Brayton and CRPC cycles that may be at least 15% greater than the best current NGCC systems. Capital and operating costs for at least some exemplary embodiments of the exemplary disclosed system may be significantly less that NGCC systems and will not involve use of massive water resources, cooling towers, and/or any hazardous enclosures for a massive catalysts housing and equipment used for storage and supply of the reactants for emission control.

In at least some exemplary embodiments, CRPC integration as a bottom cycle for combined power generation with RICE may be provided. Also, cooling loads generated by CRPC may substantially avoid the use of absorption or compressor driven chillers, and cooling towers (e.g., which may make small commercial distributed combined heat and power projects more affordable and reliable).

The exemplary disclosed CRPC system may utilize waste heat from an intercooler of a compressor. Accordingly, the exemplary disclosed CRPC system may be used (e.g., as an energy source) to run a compressor station utilizing waste heat from both low and high-pressure compressor stages (e.g., that in combination with ambient energy and added fuel input to the assembly 300 may offset or match in full a desired power supply when for example used as described above regarding FIG. 5 and FIG. 10).

Figure 11:
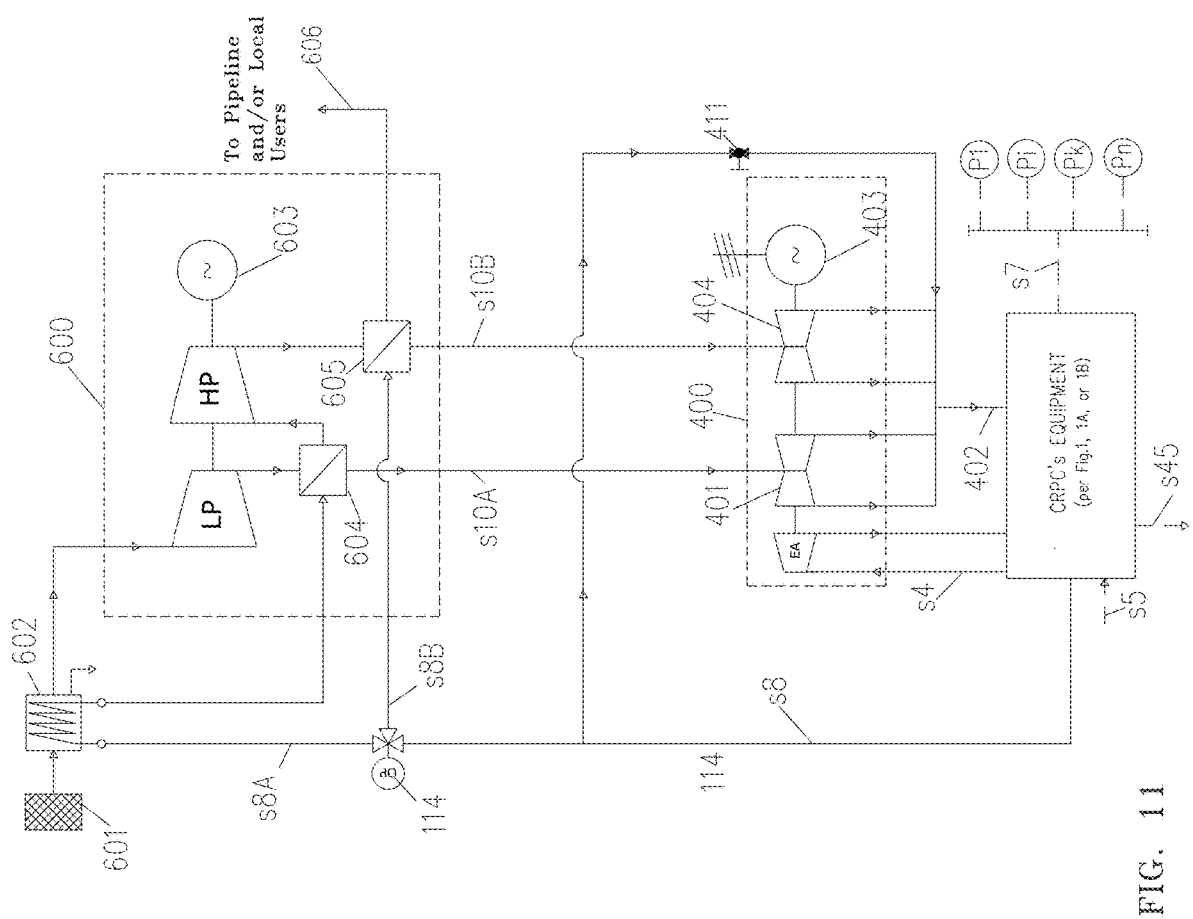
FIG. 11 illustrates a schematic view of at least some exemplary embodiments of the present disclosure (e.g., an exemplary CRPC system for High Pressure Natural Gas or Industrial Gases Supply).

FIG. 11 illustrates another exemplary embodiment of the exemplary disclosed system. A gas compressor set/station 600 having source 601 that supplies a preconditioned (e.g. moisture and dust free) process gas to be pressurized. A cooler 602 (designed to transfer process gas thermal energy to CRPC working fluid) will be added as a part of CRPC integration with the gas compressors station. The cooler may be similar to air cooler 501 (see FIG. 10). A compressor station 600 may have at least a low-pressure compressors or section of a compressor (LP) and a high pressure (HP) compressor or compressor stage that may operate similarly to compressors C2 and C3 (See FIG. 10), and are driven by a mover 603 (e.g., electrical motor). The intercoolers (e.g. heat exchangers) 604 and 605 that may be similar to intercooler 502 (See FIG. 10). The stream of the produced compressed and cooled gas 606 may be directed to the pipeline for remote users and/or to local users.

As explained above waste cold stream s7 generated by CRPC in the remote operation besides supplying cold or HVAC loads can be used for compressor motor and CRPC generator cooling and for direct waste cold energy conversion to electrical power (e.g., similar to assembly 120 in FIG. 8 and FIG. 9).

Figure 12:
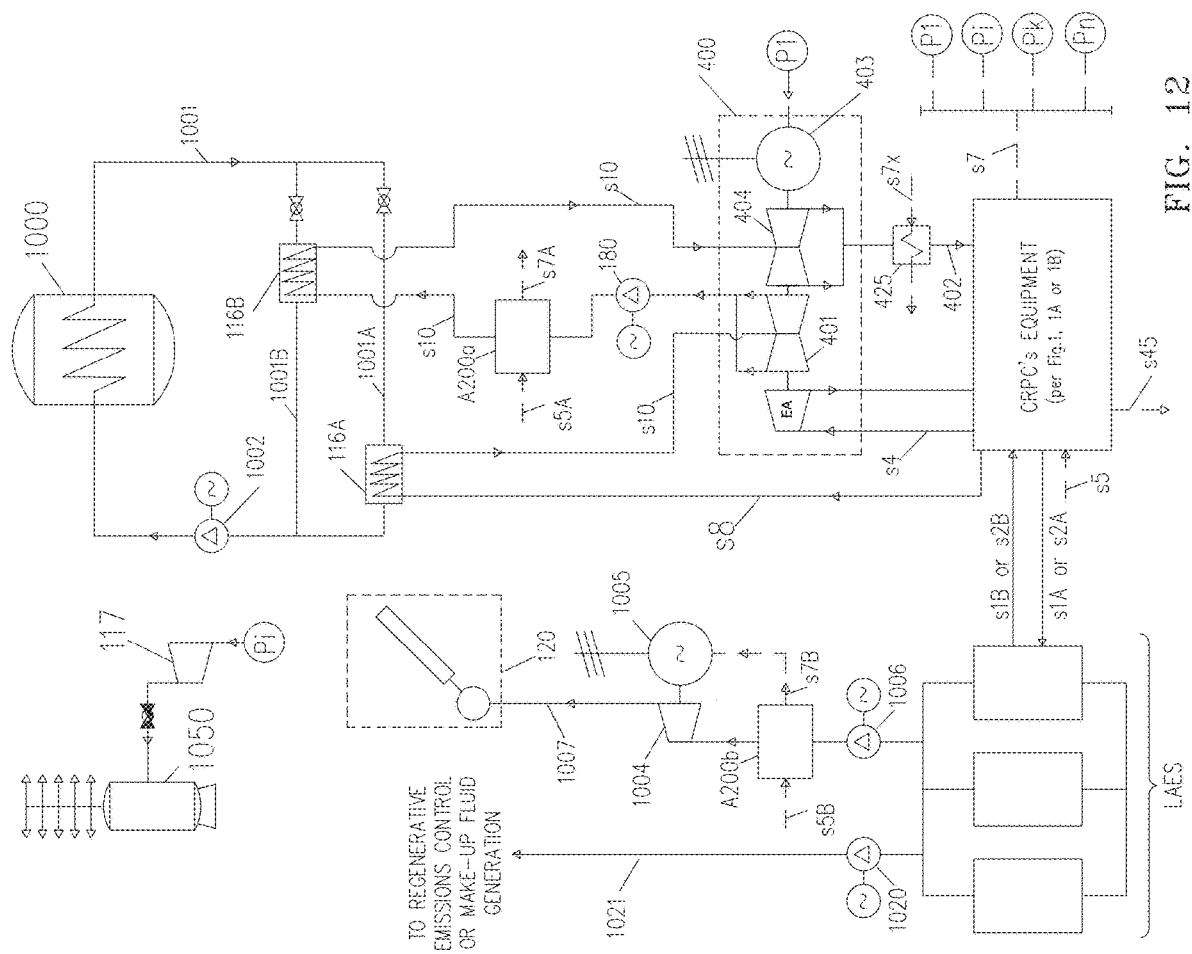
FIG. 12 illustrates a schematic view of at least some exemplary embodiments of the present disclosure (e.g., an exemplary CRPC system for new large scale and modular fossil and nuclear power plants design).

Another exemplary embodiment of CRPC application related to new or future fossil and nuclear energy power plants construction is presented in FIG. 12. To minimize losses to the atmosphere, the exemplary cycle significantly deviates from the regenerative Rankine steam cycle design by avoiding the use of steam turbine and related ancillaries, associated regenerative heaters, steam superheater and reheater, water cooled condensers at low vacuum pressure, circulated cooling water and cooling towers. Instead, the fossil fuel fired boiler or nuclear reactor 1000 is cooled by a water stream 1001 in a subcritical or supercritical state (e.g., above 221 bar or 3,200 psia) that may have inlet temperature as low as 35° F. and leaving said boiler at about 850° F. For nuclear reactor stream 1001 represents the first "light water" cooling loop and may be operated as per current practices, and have operating temperatures well within the said temperature range. The thermal energy of the circulating water loop 1001 leaving boiler or reactor may be absorbed by at least one heat exchanger that will provide the appropriate heat input to the supercritical liquified gas stream s10 of CRPC (See. FIGS. 1, 1A, and 1B) that enters said heat exchanger at about 30° F. attaining outlet temperature of about 800° F. or less and then will expand in the prime movers of the exemplary embodiment of the regenerative cryogenic cycle to generate electrical output in an exemplary process as explained above.

To minimize the costs of the exemplary system the circulating water stream may be further at least bifurcated as shown in FIG. 12 allowing to preheat the working fluid stream s10 in the first heat exchanger 116A of the first stream circulating water 1001A downstream of boiler or reactor and expand stream s10 through prime mover 401 into a low temperature, (e.g., well below 0° F. negative range of temperature) and then still being a supercritical flow may be pressurized in a booster pump 180 and may be followed by a reheat firstly by the energy in ambient air (e.g., stream s5A) in an assembly A200a (e.g. similar to assembly A200 shown in FIG. 2) followed by final reheat in heat exchanger 116B by the second stream of the circulating water 1001B and expanding through second prime mover 404. As the result of such arrangement an additional waste cold stream s7A will be generated that may be used together with other waste cold stream shown as stream s7x in a sub-cooler 425 (e.g., should the booster pump 180 be not used) or be utilized as explained before (similar to utilization of stream s7 explained above, see FIGS. 1, 1A, and 1B) including generation of a high quality compressed air pressurized by compressor 117 and stored in a compressed air storage 1050 as shown in the FIG. 12 that may be used by pneumatic operators and by various instrumentation.

In the described above exemplary system instead of assembly A200a a heat exchanger may be used to transfer the compression heat generated by compressor 117 to the cold working fluid stream s10 leaving prime mover 401. Thusly cooled dry compressed air pressurized in compressor 117 (e.g. stream Pi) will be stored in tank 1050 to be used for same purposes as explained above.

As shown in FIG. 12 the low negative temperature stream s1A or cryogenic stream s2A (See FIGS. 1, 1A, and 1B) may be used to assist in producing liquid air from the atmosphere to be stored in an array of diurnal (e.g., LAES) both during regular and low grid demand. The stored liquid air then will be pressurized to a supercritical pressure by pump 1006 absorbing ambient energy from stream s5B in the assembly A200b (e.g. similar to A200 shown in FIG. 2 and FIG. 3) generating a waste cold stream s7B and further expanding through a prime mover 1004 (e.g., an expander of the mirror design as shown in FIG. 6) connected to an electrical generator 1005 whereas near cryogenic temperature exhaust 1007 may be supplied to a direct power generation assembly 120 (See FIGS. 9 and 9A) to effectively utilize solar energy, and the waste cold stream s7B may be used to cool the electrical generator 1005.

The excess of liquid air energy stored in LAES may be pumped by pump 1020 into external process equipment through line 1021 to produce a makeup working fluids other than air (e.g. nitrogen and oxygen in the Air Separation Unit, or support methane production in a Natural gas liquification process, or emissions removal/liquification including $CO_2$ from the combustion process as explained above in FIG. 7).

In at least some exemplary embodiments (See FIGS. 1, 1A and 1B), the exemplary disclosed method may be a power generation method including supplying a pressurized cryogenically liquified working fluid selected from a group of refrigerants such as Air, Nitrogen, Oxygen, Carbon Dioxide, Methane, and similar fluids to a first regenerative heater to provide an energy sink for condensation of the exhausted working media having a temperature well below ambient temperature due to expansion in at least one expander. A quantity and a pressure of the supplied cryogenically liquified working fluid may be greater than a quantity and a pressure of the working fluid leaving said expander (e.g., wherein the pressure of the cryogenic stream may correspond to its highest thermal capacity).

In at least some exemplary embodiments, expanding supercritical working fluid consisting of refrigerated/liquefied gas (e.g., Air, $N_2$, $O_2$, $CO_2$, Methane or any other similar gas) after absorbing thermal energy in temperature range of minus 100° F. up to 800° F. from at least one or a combination of energy sources (e.g. ambient air, solar, geothermal, nuclear, combustion products of any organic fuel or municipal waste incineration) and expanding thusly heated working fluid in at least one main prime mover connected to electrical generator to convert thermal and potential energy of the working fluid into mechanical and subsequently into electrical energy thus producing a desired working fluid exhaust flow of either near critical or essentially subcritical working fluid having substantially low (e.g. substantially negative) temperature or a near cryogenic temperature. The exhaust flow can be either cooled down or condensed (e.g., depending on exhaust flow pressure) by the cryogenic liquified working fluid contained in the liquid storage to be first pressurized to about critical pressure of a selected working fluid in a quantity that may be greater than a quantity of working fluid exiting main prime mover to achieve a largely complete liquification of said working fluid before returning the storage. Following heat absorption from the working fluid expanded in the main prime mover the cryogenic working fluid from the storage is pressurized to a supercritical pressure before expanding in at least one secondary (auxiliary) prime mover that may be connected to the main prime mover and said electrical generator producing additional work/power and generating cryogenic exhaust stream supplied to a cryogenic liquefication sub-system that largely liquifies working flow supplied back to the storage. In at least some exemplary embodiments, any non-condensed portion of working fluids is pressurized to a correspondent critical or near critical pressure in a multi-stage compressors with intermediate cooling heat exchangers transferring thermal energy due to compression to the working fluid directed toward main prime mover and supplying thusly re-pressured low or near cryogenic temperature flow either upstream or downstream of the second heat exchanger located upstream of the auxiliary prime mover and downstream of the main prime mover, where after enhancing generating power output of the auxiliary prime mover the exhausted working fluid is admitted into a regenerative cryogenic sub-system wherein it practically achieves a 100% liquification of the all working fluid in the closed loop regenerative power system.

In at least some exemplary embodiments, a pressurized cryogenic working fluid storage, a set of electrically driven pumps to pressurize working fluid to a supercritical pressure upstream of the first heat exchanger that may consist of at least two heat exchangers to absorb solar and other external energy (e.g., ambient air, combustion products, etc.) may be provided. In at least some exemplary embodiments, the first prime mover is connected via a gear to an electrical generator, the second heat exchanger is connected to the working fluid discharge from the cryogenic storage and discharge piping from the first prime mover. A second prime mover is disposed downstream of the second heat exchanger, whereas the second prime mover may be operably connected to the first prime mover, a multi-stage cryogenic vapor compressor to pressurize any residual vapor of the working fluid to a critical or near critical pressure, at least one liquid-gas separator downstream of the second prime mover, Joule-Thompson valve to liquify working fluid in a gaseous phase from the exhaust of the second prime mover, at least one jet pump or at least one low speed positive displacement pump to return subcooled cryogenic working fluid in both liquid and residual gaseous phase to the cryogenic working storage.

The exemplary disclosed system, apparatus, and method may be used in any suitable application for propulsion and/or electrical power generation. For example, the exemplary disclosed system, apparatus, and method may be used in any suitable cryogenic regenerative power cycle (CRPC) application. The exemplary disclosed system, apparatus, and method may be used in centralized and distributed power generation applications, applications involving converting waste heat and/or ambient energy into electrical power and/or energy to propel ships and trains. The exemplary disclosed system, apparatus, and method may be used in any suitable application (e.g., a standalone operation) to generate power from any fossil or organic manmade fuel including coal and municipal solid waste (MSW) and from any grade of the waste heat generated by industrial or commercial operation.

In at least some exemplary embodiments, the exemplary disclosed system, apparatus, and method will at least minimize (e.g., in the proportion to reduced fuel consumption) or may eliminate hazardous environment pollutants, including $CO_2$ and water vapor, emitted by fossil power generation to the atmosphere. The exemplary disclosed system, apparatus, and method may also substantially increase a fuel utilization efficiency during fossil power generation and may reduce costs associated with zero-emissions operation.

The exemplary disclosed system, apparatus, and method will achieve a step change in efficiency of fuel energy utilization using gaseous working fluids in the sub- and super-critical states such as, for example, Air, Nitrogen, Oxygen, Carbon Dioxide, and Methane. The exemplary disclosed system, apparatus, and method may utilize thermal energy in a temperature range from medium level (e.g., up to 800° F.) to a low temperatures level (e.g., minus 100° F.) while approaching exhaust working fluid operating temperatures down to near cryogenic temperatures and thereby minimize cooling loads of a thermal energy sink used for working fluid liquification. The exemplary disclosed system, apparatus, and method may achieve closed loop operation utilizing liquified gases and thus using minimum energy for working fluid pressurization to super- and ultra-supercritical level to achieve desired high fuel efficiency (e.g., as compared to a current art) in either centralized or distributed electrical energy generation.

The exemplary disclosed system, apparatus, and method may also substantially achieve 100% liquification efficiency of a working fluid by further expanding a working fluid operating temperature into a cryogenic region to liquify working fluid to minimize compression energy usage. Effective cold energy regeneration within the proposed power generation system may be realized, thus substantially avoiding the use of supplemental or external sources for working fluid refrigeration or power supply and sustaining an efficient (e.g., substantially self-sufficient) operation.

The exemplary disclosed system, apparatus, and method will provide a relatively lean fossil power system design (e.g., as compared to a current art). This design may substantially simplify plant construction and minimize operating costs while improving availability and reliability of fossil power generation and minimizing investment costs.

The exemplary disclosed system, apparatus, and method will substantially increase an efficiency of power generation from a medium and/or low temperature grade waste heat such as thermal energy losses with flue gas containing water vapor to stacks from existing power plants, prime movers, and industrial and commercial fuel utilization equipment and also low temperature losses to cooling towers. The exemplary disclosed system, apparatus, and method may thereby supplement power grid demand and/or substantially reduce fuel consumption by existing fossil and nuclear power plants at their rated electrical output. This may lead to an overall reduction of greenhouse gases such as $CO_2$ and water vapor and other hazardous emissions, which may minimize or avoid the use of costly greenhouse gas sequestration technologies.

The exemplary disclosed system, apparatus, and method will substantially reduce or avoid the use of water (e.g., aside from a first fill) for power generation by utilizing a substantial total energy of a fuel or waste heat. For example, a latent heat of water vapor may be utilized (e.g., be condensed under process controlled conditions), which may subsequently result in collection of water in a liquified phase to be utilized for either technical and/or domestic needs (after appropriate treatment), while allowing an expansion of a geographic area of a fossil power generator installation in which there is a scarcity of water resources (e.g., such as deserts).

The exemplary disclosed system, apparatus, and method may provide for sequestration of greenhouse gases and hazardous emissions collection in the form of valuable by-products. This may achieve a substantially zero-emissions operation for any suitable fuel, including coal and municipal wastes, to maintain clean environment such as in a heavily populated area while also increasing fossil and municipal waste power plants revenues.

The exemplary disclosed system, apparatus, and method may provide power and a cold energy source to liquify gases for industrial and power generation use, while supplying a surplus of generated electrical power to a grid or a local user.

The exemplary disclosed system, apparatus, and method may provide a short demand-response time to facilitate integration of new and existing fossil plants with intermittent alternative power generators such as solar and wind, while also utilizing ambient energy (solar and ambient air). The exemplary disclosed system, apparatus, and method may thereby quickly respond to a grid demand variation and also is capable to quickly switch an operation between ambient or fossil power heat inputs, thus ensuring stable grid and/or microgrid operation and resiliency.

The exemplary disclosed system, apparatus, and method will improve thermal and environmental performance of an existing and new construction power generation system, and achieve greater availability and reliability at lower relative capital costs for distributed combined heat, cold, and power generation systems. The exemplary disclosed system, apparatus, and method may thereby provide greater electrical power, for the same fuel consumed, thus efficiently offering an excess of electrical power to be utilized in transportation by electrically driven vehicles, therefore, indirectly affecting overall $CO_2$ emissions expelled to the atmosphere (e.g. about 37% of $CO_2$ in the US today is produced by transportation).

The exemplary disclosed system, apparatus, and method may substantially reduce fuel consumption and environmental impact of a large mobile system such as a ship or a train by providing a relatively higher efficiency and lower capital cost propulsion system.

In at least some exemplary embodiments, the exemplary disclosed method may include providing a reservoir suitable for storing at least one cryogenically liquefied gas selected from the group consisting of Air, $N_2$, $O_2$, $CO_2$, Methane or any other similar medium that serve as a working fluid in the power generation system; providing a first stream of a first low temperature (above cryogenic range) liquified gas fluid pressurized to a supercritical pressure to a power generation system including a first prime mover and a first heat exchanger disposed upstream of the first prime mover in the power generation system; providing a second stream of a second liquefied cryogenic fluid (at temperatures −238° F. or below) to a regenerative system including a second prime mover, which is operably connected to the first prime mover, and a second heat exchanger disposed upstream of the second prime mover in the a closed loop regenerative system; and heating the first supercritical stream of the first liquified gas fluid in the first heat exchanger disposed upstream of the first prime mover and subjecting thusly heated and pressurized first working fluid to a polytropic expansion in the first prime mover in the closed loop regenerative power generation system. The exemplary disclosed method may also include expanding the first working fluid to its critical or sub-critical pressure in the first prime mover operably connected to an electrical generator to produce an electrical power and to attain a near zero or essentially negative temperature (Fahrenheit temperature scale) of the first working fluid leaving the first prime mover in the a closed loop regenerative power generation system; pressurizing the second stream of the second cryogenic fluid to a near critical pressure at which the second cryogenic fluid has higher thermal capacities (e.g., preferably at its highest thermal capacity) and transferring second fluid to the second heat exchanger disposed upstream of the second prime mover in the regenerative power system; transferring the exhaust of the first stream from the first prime mover to the second heat exchanger of the second cryogenic fluid disposed upstream of the second prime mover to provide cooling down of the first liquid having critical pressure or attaining 100% liquification of the first working fluid having a sub-critical pressure before subjecting the first working fluid to a repeat pressurization to a supercritical pressure in a closed loop regenerative power generation system; and preheating the second cryogenic fluid in the second heat exchanger upstream of the second (auxiliary) prime mover by absorbing energy of the first working fluid exhausted from the first prime mover and subjecting the second fluid having near cryogenic temperatures to a supercritical pressurization before entering the second prime mover in the closed loop regenerative power system. The exemplary disclosed method may also include subjecting the second near cryogenic supercritical fluid to a polytropic expansion in the second prime mover that may be operably connected to the first prime mover and the said electrical generator to produce additional electric energy and to substantially liquify the exhausted second fluid before entering a downstream cryogenic liquification system hydraulically connected to the said liquid gas cryogenic reservoir in the closed loop regenerative power system; separating liquid and gas phases of the second fluid downstream of second prime mover in the first separator and subjecting a separated gas phase of the second stream to an isenthalpic expansion in the Joule-Thompson valve to substantially liquify said gas phase of the second fluid stream; separating liquid and gas phases downstream of said Joule-Thompson valve in the second separator of the second fluid; utilizing high pressure energy of the liquid phase of the second stream leaving the first separator to pressurize the sub-cooled liquid from the second low pressure separator in the first liquid jet compressor to generate a colder cryogenic liquid stream; utilizing pressure energy of the said colder cryogenic liquid stream from the first jet compressor to generate a colder cryogenic flow by suction (drawing in) of the gas phase (vapor) of the second flow from the second separator into a second jet compressor thus generating a common sub-cooled cryogenic stream directed to the said cryogenic reservoir having lower pressure than the common sub-cooled cryogenic stream (e.g., the second fluid) pressurized by the first and the second jet compressors; pressurizing to a critical pressure a portion of a non-condensed fluids (vapors) of the first working fluid flow that escapes the first prime mover through its seals and a non-condensed portion of the second fluid flow from the cryogenic reservoir and the second prime mover end seals in a multi-stage compressor with at least one intermediate cooling heat exchanger and at least one compressor discharge cooling heat exchanger disposed upstream of the first heat exchanger in the first working fluid circuitry; and transferring the subcooled or near cryogenic temperature flow of the recompressed vapor discharged by the said multi-stage compressor upstream of the second prime mover to increase the mass flow entering the second prime mover to generate more electrical power and to at least recover and maintain the liquified fluid inventory in said cryogenic reservoir thus achieving up to 100% liquification of the first and the second fluid in the closed loop regenerative power system.

The exemplary disclosed method may also include supplying the first low temperature liquefied gaseous fluid and the second cryogenic fluid from the same reservoir whereas the first working fluid discharge pressure from the first prime mover upstream of the second heat exchanger to be adjusted to create a sufficient temperature head between the correspondent first working fluid condensation temperature and the second fluid temperature entering the second heat exchanger to achieve a 100% or near a 100% working fluid condensation rate, whereas the second fluid may have at least the temperature equal to the temperature in the said reservoir or be subcooled by the cold energy generated after the second fluid expansion in the second prime mover.

The first low temperature liquified gas fluid and the second cryogenic fluid may each be selected from the group consisting of Air, Nitrogen, Oxygen, Carbon Dioxide, and Methane where the first selected fluid to be submitted to the first prime mover has a higher inherent condensation temperature at all pressures than the second fluid. The first low temperature liquified gas fluid and the second cryogenic gas fluid may be the same fluid selected from the group consisting of Air, Nitrogen, Oxygen, Carbon Dioxide, and Methane whereas the operating pressure of the first working fluid submitted to a second heat exchanger cooled by the second cryogenic fluid has higher pressure than the pressure in the said cryogenic liquid reservoir. The first pressurized and heated fluid may be expanded in the first prime mover to its near critical pressure (e.g., equal or less than critical) to minimize the flow of the second cryogenic fluid from the reservoir to achieve 100% condensation and subcooling of the first working fluid at the expense of producing lower net electrical output generation.

To increase net power generation by the first and the second prime movers the first pressurized and heated fluid may be expanded in the first prime mover well below its critical pressure therefore requiring the mass flow of the second cryogenic fluid from the cryogenic reservoir to be at least larger than the mass of the first flow leaving first prime mover to achieve full (100%) condensation of the first flow. The first and the second fluid flow may be originated from the common liquid cryogenic energy source (e.g., reservoir/storage) and wherein the excess of the common cryogenic flow compared to the first flow to be supplied to the first prime mover is extracted from the common flow and is directed to the second prime mover. The first and the second flows originated from the same liquid cryogenic reservoir/storage (a common flow) may be first pressurized to the near critical pressure and is supplied to the second heat exchanger consisting of a high and a low pressure sections whereas the said common flow after exiting said low pressure section of second heat exchanger is further pressurized to a supercritical pressure before entering said high pressure section of the second heat exchanger thus minimizing the rate of common flow used to achieve full (100%) condensation of the first flow exhausted by the first prime mover.

The second fluid from the second prime mover may be expanded below critical pressure producing cryogenic two phase mixture of liquid and vapor is connected to at least one separator whereas super cooled liquid from the said separator is mixed with the stream of the first condensed fluid and then pumped to the cryogenic liquid reservoir. The vapor of the second fluid from the said separator may be combined with the vapor from the cryogenic liquid reservoir is then submitted to a sub-cooling heat exchanger to cool down the supercritical stream leaving the discharge cooler of the said vapor compressor before been transferred to the common liquid stream from the cryogenic reservoir downstream of the first pump to minimize the flow rate extracted from the said reservoir and improving liquification rate of the first flow in the low pressure section of the said second heat exchanger. The first working fluid may have inherently greater condensation temperature than the second fluid, continue the cool down of the critical pressure stream leaving the discharge cooler of the vapor compressor in another sub-cooling heat exchanger by the cryogenic vapor leaving reservoir and transferring thusly cooled critical pressure steam upstream of the second heat exchanger disposed upstream from the second prime mover. The second fluid or stream discharged from the second prime mover may undergo separation of its gas and liquid phases in the liquid-gas separators is subsequently pressurized with the help of liquid-liquid and liquid-gas jet compressors to be transferred to the cryogenic reservoir.

The sub-cooled gas and liquid phase from the second separator (See FIG. 1) may have a lower temperature when compared to the temperature in the said cryogenic reservoir and the first separator and therefore may provide a supplemental cooling of the liquid downstream of the first jet compressor by means of entraining a lower temperature liquid and gas phase from the second separator, whereas entrained gas phase promotes an internal subcooling of the resultant flow due to warmer cryogenic liquid evaporation inside the gas bubbles. The return two-phase flow to the cryogenic reservoir may be directed into a riser to prevent gas phase (subcooled bubbles) to be entrained by the pump that pressurizes cryogenic liquid before entering a closed loop power generating system and allowing natural convection to carry bubbles up into vapor space at the top of the reservoir while continue to cool down the inventory of the reservoir by evaporation inside the gas bubbles. A perforated partition wall may separate the riser from the rest of the liquid in the reservoir maintaining a higher pressure in the section where riser is located to improve condensation and collection rates within the said cryogenic reservoir and minimize liquid droplet carry-over into the reservoir vent line.

The exemplary disclosed method may also include transferring heat from a wet flue gas stream leaving a furnace or a power generation system to the first working fluid having inlet temperature below the ambient temperature in the first heat exchanger that provides a two stage regenerative cooling whereas in the first stage the incoming wet gas stream is precooled by the dry flue gas leaving the seconds condensing stage after remaining sensible and latent heat are absorbed in the said second stage by the first working fluid therefore allowing the thusly dried flus gas leaving the second stage to attain a sufficient bouncy (e.g. having temperature of about 100° F.) to be dispersed trough the stack into the atmosphere having excess of moisture removed as compared to an ambient air in the said second stage of the first heat exchanger; and cooling the flue gas stream to a temperature of 100 degrees Fahrenheit or below via the first heat exchanger and releasing the flue gas stream to the atmosphere at the temperature in a vicinity of 100 degrees Fahrenheit.

The exemplary disclosed method may further include drawing the second cryogenic fluid from a reservoir disposed upstream of the second heat exchanger and pressurizing the second stream of the second cryogenic fluid to a critical pressure of the second cryogenic fluid upstream of the second heat exchanger. The exemplary disclosed method may further include transferring sensible and latent heat from ambient air to the first stream of the first working fluid having essentially negative temperature via a third heat exchanger disposed between the first heat exchanger and intercoolers of the multi-stage vapor compressor to preheat first working fluid to about ambient temperature thusly producing a cold, low dewpoint air stream and a separate stream of a water condensate from the atmospheric air. The exemplary disclosed method may further include transferring the low dewpoint air to at least one of an electrical generator sub-cooling system, an air-conditioning system, a compressed air supply, and a Deep Air Purification system to produce a make-up fluid to compensate at least the second fluids losses/leakages (e.g. when air used as a second fluid) or compensate both the first and the second fluid loses when both liquids in the closed loop power generating system are derived (liquified) from air. The third heat exchanger may be comprised of a set of three heat exchangers whereas the first one absorbs all sensible and latent heat from the ambient air above the freezing point of the moisture in air (above 32° F.); the second and the third heat exchangers in the set of the said third heat exchanger are operated intermittently: one in-service and the other one out of service (in the regeneration mode); the cooling source for the first heat exchanger and the heat exchanger in service in the third heat exchanger is provided by the first working fluid; the source of the energy for regeneration of the heat exchanger surface that is out of service is provided by regeneration air flow representing a portion the said low dew point air that is preheated by electrical heater above water ice melting temperature with yet a portion of thusly preheated regenerative flow been recirculated to the heat exchanger under regeneration to minimize power used to dispose of ice accumulated.

The exemplary disclosed method may further include providing (deep) cooling of the portion of the low dewpoint air in a set of the fourth heat exchangers consisting of at least two heat exchangers operating intermittently (one in service and the other in regeneration mode) converting residual moisture and carbon dioxide (present in the low dew point air) into a solid phase (ice) on the surface of the heat exchanger in service while the second heat exchanger in the set of fourth heat exchanger undergoes surface regeneration (removal of the residual water and $CO_2$ in a form of ice); the cooling source to the heat exchanger in service is provided by a portion of the second fluid taken from and returned back upstream of the second prime mover; the source of surface regeneration for the out of service heat exchanger is the dry low dewpoint air produced by the third heat exchanger preheated by electrical heater above melting temperature of the water ice.

The exemplary disclosed method may further include supplying a near cryogenic temperature stream free of moisture and having low partial $CO_2$ pressure (e.g., below 50 ppm) exhausted from the fourth heat exchanger to the said vapor compressor to provide a make-up fluid to compensate at least one of the fluid losses in the closed loop regenerative power system that utilizes air and to minimize compression work.

The exemplary disclosed method may further include applying solar energy to preheat at least a portion of the first stream of low temperature first working fluid upstream of the first heat exchanger disposed upstream of the first prime mover in the closed loop regenerative power system. The exemplary disclosed method may further include bifurcating the first stream of low temperature first working fluid upstream of the first heat exchanger whereas the first of the bifurcated flow receives the energy in the first heat exchanger from a waste heat or a combustion products while the second portion of the bifurcated flow absorbs the energy from a regular solar or a concentrated solar rays disposed upstream of the first prime mover.

The exemplary disclosed method may further include applying solar energy to a one side of panels consisting of arrays of thermoelectric or photovoltaic elements and applying a cold waste cold stream to the other side of the said panel produced by the third heat exchanger after preheating the first flow of the low temperature first working fluid.

The exemplary disclosed method may further include providing an appreciable net energy output when operating on ambient energy or waste heat in the range of temperatures between minus 100° F. to plus 800° F. supplied to the first prime mover in the closed loop regenerative power cycle. The exemplary disclosed method may further include liquification of hazardous pollutants from the combustion products and $CO_2$ or any other hazardous pollutants contained in gases expelled by industrial processes by means of a singular process that utilizes condensation of individual species by the cold source stream extracted from either the first stream of the first low temperature fluid upstream of the first heat exchanger disposed upstream of the first prime mover in the closed loop regenerative power system. The exemplary disclosed method may further include the extraction of the cold energy stream from the second fluid upstream of the second prime mover in the closed loop regenerative power system. The exemplary disclosed method may further include a regenerative condensation of undesired pollutants, contaminants, and $CO_2$ from the exhaust gas in a series of heat exchangers inter-connected hydraulically and whereas the source of the cold energy supplied by either the first stream of low temperature first working fluid or the second stream of a cryogenic second fluid used in the closed loop regenerative power system is hydraulically connected only to the last or the lowest temperature range heat exchanger in a series.

The exemplary disclosed method may further include recirculating the coldest decontaminated flow leaving the last heat exchanger in the series of said heat exchangers (See FIG. 7) upstream of the last heat exchanger thus providing sufficient cooling loads to the incoming stream entering heat exchangers in the said series upstream of the last heat exchanger to condense the pollutants having higher condensation temperatures than a pollutant being removed in the last heat exchanger in the said series. The exemplary disclosed method may further include the last heat exchanger in the said series to consist of two heat exchangers whereas the first heat exchanger is in operating mode and the second heat exchanger is in the regenerative mode dislodges the solid contaminant(s) into a designated storage tank(s) by means of providing defrosting energy by an appropriate electrical source (e.g., ceramic electrical heater) and collecting thusly liquified contaminants under pressure corresponding to their stable storage at ambient temperatures (e.g., for $CO_2$ such conditions would be 100 psia).

The exemplary disclosed method may further include utilizing a portion of a high pressure second stream of a second fluid in a liquid state downstream of the second prime mover as a motive media for the jet compressor to transport the remaining two-phase portion of the second fluid into the said cryogenic reservoir/storage while providing internal subcooling by the internal evaporation inside the subcooled bubbles generated by the gaseous portion of the said second fluid.

The exemplary disclosed method may be capable of operating autonomously in a remote areas for centralized or distribute electrical power generation requiring only first fill of said first and the second fluids and generating water stream from a combustion products or ambient air to sustain its operation and/or providing water surplus for technical or potable water consumption.

The exemplary disclosed method may be capable of propelling ships and trains at minimum fuel consumption minimizing release of $CO_2$ and negligible or zero environment pollution. The exemplary disclosed method may be used for supplemental, combined electrical power generation and/or useful mechanical work as a low-temperature bottoming cycle converting thermal energy from the exhaust of any prime mover utilizing fuel energy, or any grade of waste heat from fossil fuel fired plant stack flow, including at least a portion of the waste heat contained by condenser cooling water from Rankine cycle, The exemplary disclosed method may further include improving thermal efficiency of the Rankine steam cycle by absorbing all energy from the steam condenser thus maintain constant low temperature of the condenser cooling water at about 32° F. water independent of plant geographic location or season of the year. The exemplary disclosed method may further include forming at least a bifurcated low temperature high volume waste heat stream (e.g., such as condenser cooling circulation water) to minimize the flow rate of the first and the second fluid by absorbing heat from the first low temperature bifurcated stream by the first working fluid and expanding in the first section of the first prime mover and then reheating thusly produced cold, still supercritical subcooled first working fluid in the second bifurcated low temperature stream thus minimizing the size and the capital costs of the system. The lower supercritical pressure subcooled first working fluid may be re-pressurized to the initial inlet pressure or other desired pressure before being reheated by the second portion of the low temperature bifurcated flow disposed upstream of the second section of the first prime mover achieving lower temperature of first working fluid exhaust before entering the second heat exchanger downstream of the first prime mover. The exemplary disclosed method may further include liquifying, treating and collecting water from the wet combustion products and industrial exhausts by the first stream of the first working fluid upstream of the first prime mover in the power generation process and returning thusly treated water for the waste heat recovery and/or emissions control from a combustion energy source.

The exemplary disclosed method may further include evaporating collected treated water in the waste heat recovery boiler disposed downstream of the gas turbine to generate steam of a greater pressure than the pressure in a combustion chamber of a said gas turbine, further compressing gaseous or liquid fuel above the their supply pressure in a steam compressor and submitting thusly pressurized mixture of the steam and fuel to a preheat by the waste heat upstream of the said waste heat recovery boiler having and discharging thusly preheated mixture having greater pressure than the pressure in the gas turbine combustion chamber to produce larger useful work in the turbine and minimize NOx emissions. The exemplary disclosed method may further include further improving efficiency of the combined electrical power generation supplying at least a portion of the first working fluid having low temperature and supercritical pressure to cool down the inlet air stream entering a multistage air compressor of the gas turbine (in a Brayton Cycle) to temperatures well below ambient and then absorbing heat from the intermediate compressed air stream being pressurized in at least first section of multistage gas turbine compressor thus minimizing compression work and avoiding waste heat losses to the atmosphere in the said gas turbine compressor intercooler while preheating the first working fluid upstream of the first prime mover to generate the supplemental power output.

The exemplary disclosed method may further include further improving the timely response of the combined power generation system, due to ability of the bottoming generation system switch into liquid energy storage operating mode, while keeping the top cycle at its constant operating load.

The exemplary disclosed method may further include utilization of the low, near cryogenic temperature of the first stream of the first working fluid and a cryogenic energy of the second stream of the second fluid to collect energy from ambient air and store it in the Liquid Air Energy Storage (LAES) to minimize the power consumption during charging. The excess of stored cryogenic air in a liquid air storage system can be used to minimize power required to generate a make-up flows for the first and the second fluids other than air in either air separation units when liquified gases are N2 and O2, or methane liquification process or emissions and $CO_2$ removal process from the combustion products used by the system or from flue gas expelled by other processes with which the system is integrated with utilizing recuperative emissions liquification by the method as provided in this disclosure.

The exemplary disclosed power generation system may include a first prime mover, a first heat exchanger disposed upstream of the first prime mover, the first heat exchanger thermally connected to an external heating source, and a first pressurized transfer assembly fluidly connecting the first expander and the first heat exchanger. The exemplary disclosed system may also include a second prime mover operably connected to the first prime mover, a second heat exchanger disposed upstream of the second prime mover, a cryogenic regenerative system including a second pressurized transfer assembly fluidly connecting the second prime mover and the second heat exchanger; a reservoir fluidly connected to each of the first and second pressurized transfer assemblies; a multistage compressor fluidly connected to the first and the second prime movers end seals and a cryogenic vapor line fluidly connected to a reservoir and a second prime mover, and a cryogenic working fluid disposed in the reservoir and the first and second pressurized transfer assemblies. The second heat exchanger of the cryogenic regenerative assembly may be thermally connected to the first pressurized transfer assembly at a location that is downstream of the first prime mover and upstream of the first heat exchanger. The energy from external heating source may be provided by the group consisting of a burner, exhaust gas from a boiler, a gas turbine, an industrial furnace, a combustion engine, a geothermal source to be absorbed in heat exchangers, and a solar energy to be collected by radiators. The first heat exchanger may include several heat exchangers connected in series and in parallel to allow a concurrent absorption from the said various external energy sources and/or allowing rapid switching from one source to another thus avoiding output fluctuation associated with an intermittency of ambient energy sources. The first and second prime mover may be each selected from the group consisting of a gas turbine, a cryogenic expander, and a reciprocating engine, or any other device suitable for conversion of the gas stream thermal and potential energy into mechanical work. The prime movers may be connected in series whereas the cryogenic expander will be last prime mover in series. The expanders may be designed of two mirrored impellers having common high pressure inlet to minimize the working fluid leakage through a high pressure end seal and to reduce or cancel out an axial trust imposed on expander's supports at the high working fluid inlet pressures that exceeds by several folds a critical pressure of working fluid. The solar radiator for transferring solar energy to a first working fluid representing an array of tubes that received at least one coat of a dark or black color paint, may be placed within an enclosure with the transparent cover installed on a receiving (incident) side of the radiator panel and the thermal insulation installed on the shaded side of the panel whereas the void within the enclosure is filled in with a diatomic gas moves from the hot to the colder end to minimize ice formation on the outside surface of the transparent cover.

Solar energy may be directly converted into electrical power by an array of photovoltaic or thermoelectric elements exposed to the sun irradiation or concentrated sun irradiation on one side and cooled down by the waste cold stream generated preheating first stream of first working fluid by the energy in a ambient air therefore increasing effective temperature head and power generated. Said panel may be supported by the frame having a number of the jet coolers supplying cold energy to the shaded side of the array of photovoltaic or thermoelectric elements to increase effective temperature head, whereas the panels are installed on a frame connected to a swivel (e.g. ball) connection and is capable of adjusting tilt angle and rotating around its vertical line to follow the sun for more effective absorption of solar energy.

It should be noted that features illustrated in the drawings are not necessarily representative of an optimum system configuration, and features of one embodiment may be employed with other embodiments as the skilled artisan would recognize, even if not explicitly stated herein.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

What is claimed is:

1. A method, comprising:
providing a first stream of a first liquefied gas to a power generation system including a first prime mover and a first heat exchanger disposed upstream of the first prime mover in the power generation system;
providing a second stream of a second liquefied gas in a cryogenic state to a cryogenic regenerative system including a second prime mover, which is operably connected to the first prime mover, and a second heat exchanger disposed upstream of the second prime mover in the cryogenic regenerative system;
pressurizing the first stream of the liquefied gas to a supercritical pressure of the first liquefied gas upstream of the first heat exchanger in the power generation system;
expanding the first stream of the first supercritical liquefied gas through the first prime mover to a sub-critical pressure of the first stream fluidly connected to the second heat exchanger;
pressurizing the second stream to a first near critical pressure of the second liquefied gas in the cryogenic state upstream of the second heat exchanger;
transferring energy from the first stream to the second stream via the second heat exchanger upstream of the second prime mover;
increasing the second stream pressure to a second, supercritical pressure upstream of the second prime mover in the cryogenic regenerative system;
expanding the supercritical pressurized second stream of the second cryogenic liquified gas through the second prime mover and transferring the second stream at a cryogenic temperature to a storage or reservoir in the cryogenic regenerative system; and
pressurizing a residual vapor (e.g. in a gas phase) of the first and the second liquefied gas collected within the power generation system and the cryogenic regenerative system in a multi-stage compression process to at least the first pressure of the second stream of the liquefied gas and transferring thusly pressurized vapor upstream of the second prime mover; and
transferring a thermal energy of the compression from the pressurized residual vapor to the first stream of the first liquified gas at the supercritical pressure in a third heat exchangers disposed upstream of the first heat exchanger.

2. The method of claim 1, wherein the first liquified gas steam and the second liquified gas stream are each selected from the group consisting of Air, Nitrogen, Oxygen, Carbon Dioxide, and Methane.

3. The method of claim 1, wherein the first liquified gas stream and the second liquified gas stream are the same fluid selected from the group consisting of Air, Nitrogen, Oxygen, Carbon Dioxide, and Methane.

4. The method in claim 3, wherein the quantity of the liquified cryogenic gas stream supplied into the power generation and cryogenic regeneration process is greater than the quantity of the first stream supplied to the first prime mover, and the excess of the liquified cryogenic gas is supplied to the second prime mover for expansion to provide an additional internal heat sink for the liquification of the stream exhausted by the first prime mover.

5. The method in claim 1, further comprising the discharge pressure of the first stream from the first prime mover to have a correspondent condensation temperature of the first stream in the second heat exchanger at least 15° F. greater that the temperature of the second stream entering the second heat exchanger disposed upstream of the second prime mover.

6. The method of claim 1, further comprising transferring heat from a hot and wet flue gas stream produced by combustion or any industrial process to the first stream of the first liquefied gas via the first heat exchanger in a two-stage process including convective and condensing cooling.

7. The method of claim 6, further comprising reheating of the dried and cooled flue gas existing the condensing stage by the incoming flow of the hot and wet flue gas stream in the convective cooling process and releasing thusly preheated dried flue gas stream to the atmosphere at the temperature of around 100° F. to attain an adequate buoyancy.

8. The method in claim 1, further comprising supplying in total or in part solar energy to the first stream of the pressurized first liquified gas through the first heat exchanger upstream of the first prime mover.

9. The method in claim 1, further comprising supplying available energy from an ambient air and a solar energy to the first stream of the pressurized first liquified gas through a fourth heat exchanger disposed between the first and the third heat exchangers that are all disposed upstream of the first prime mover.

10. The method of claim 9, further comprising producing a low dew-point cooled air from the ambient air and transferring it to at least one of an electrical generator sub-cooling system, an air-conditioning system, or a compressed air supply, or for subcooling thermoelectric and photovoltaics assemblies for direct solar to power energy conversion.

11. The method in claim 10, further transferring a portion of the low dew point air for further cooling by a portion of the second stream of the second liquified gas to provide the excess of liquefied gas in a liquified gas storage when the said second stream is Air.

12. The method of claim 1, wherein expanding the second stream of the second cryogenic liquefied gas in the second prime mover and submitting thusly expanded second stream to the cryogenic regenerative system at the cryogenic temperature equal to or below a temperature that is adequate for liquification of the first or second stream of the expanded and liquified gases exhausted from the first and the second prime movers for a subsequent storage in the storage tank or reservoir.

13. The method in claim 1, further comprising separation of the second stream of the cryogenic liquified gas leaving the second prime mover in a phase separator and supplying the gas phase for isentropic expansion in a Joule-Thompson valve that is further pressurized by the liquid phase collected in the phase separator in at least one jet compressor to provide a sub-cooled stream of the first or the second stream of the liquified gas transferred to the liquified cryogenic gas storage or reservoir.

14. A system, comprising:
    a power generation system including:
        a first prime mover connected to an electrical generator,
        a first heat exchanger disposed upstream of the first prime mover, the first heat exchanger thermally connected to a heating source generated by combustion or industrial processes, or a circulating condenser water from a fossil or nuclear plant, a solar energy either regular or concentrated, or a geothermal source, and
        a first pressurized transfer assembly fluidly connecting the first prime mover and the first heat exchanger;
    a cryogenic regenerative system including:
        a second prime mover operably connected to the first prime mover and the electrical generator,
        a second heat exchanger disposed upstream of the second prime mover,
        a second pressurized transfer assembly fluidly connecting the second prime mover and the second heat exchanger,
        a tank or a reservoir of the liquified gaseous media fluidly connected to at least the second pressurized transfer assemblies,
        a cryogenic working fluid disposed in the reservoir and the first and second pressurized transfer assemblies,
        a multi-stage compressor fluidly connected on the suction side to the vent line of the tank or a reservoir and the end seals of the primary and secondary prime movers and the discharge side fluidly connected to the line upstream of the second prime mover; and
        a third heat exchanger in thermal communication with the first stream of the liquified gas stream line and the intercooling and discharge lines of the multi-stage compressor;
        wherein the second heat exchanger of the cryogenic regenerative assembly is thermally connected to the first pressurized transfer assembly at a location that is downstream of the first prime mover and upstream of the first heat exchanger.

15. The system of claim 14, wherein the first and second prime movers are each selected from the group that converts thermal and potential energies of a stream into mechanical work consisting of but not limited to a gas turbine, a radial gas turbine, a Tesla turbine, an expander, a reciprocating engine, and a rotary engine.

16. The system of claim 15, wherein the prime mover is of a mirrored design expander with a common high-pressure inlet and inlet guide vanes allowing working fluid to expand in opposite directions to compensate the trust loads and eliminate working fluid leakage at the high pressure inlet side.

17. The system of claim 14, further comprising the first heat exchanger including at least two heat exchangers thermally connected in parallel to a low temperature external heat supply whereas the first stream is fluidly connected to the first prime mover consisting of a high and a low pressure sections and the said stream undergoes preheat in said first heat exchangers and polytropic expansion through said prime mover section in series.

18. The system of claim 17, further comprising the high and the low pressure sections prime mover that are a prime movers of the different type.

* * * * *